(12) United States Patent
Matsuda et al.

(10) Patent No.: US 9,035,527 B2
(45) Date of Patent: May 19, 2015

(54) MOTOR

(75) Inventors: Masashi Matsuda, Kakegawa (JP); Tomohiro Aoyama, Kosai (JP)

(73) Assignee: ASMO CO., LTD., Shizuoka-pref. (JP)

( * ) Notice: Subject to any disclaimer, the term of this patent is extended or adjusted under 35 U.S.C. 154(b) by 395 days.

(21) Appl. No.: 13/542,790

(22) Filed: Jul. 6, 2012

(65) Prior Publication Data

US 2013/0026877 A1 Jan. 31, 2013

(30) Foreign Application Priority Data

Jul. 25, 2011 (JP) .................................. 2011-161926
Oct. 14, 2011 (JP) .................................. 2011-227229
Oct. 14, 2011 (JP) .................................. 2011-227230
Jun. 14, 2012 (JP) .................................. 2012-135132

(51) Int. Cl.
*H02K 23/04* (2006.01)
*H02K 1/17* (2006.01)
*H02K 1/27* (2006.01)
*H02K 21/14* (2006.01)
*H02K 29/03* (2006.01)

(52) U.S. Cl.
CPC ................ *H02K 23/04* (2013.01); *H02K 29/03* (2013.01); *H02K 1/17* (2013.01); *H02K 1/276* (2013.01); *H02K 2213/03* (2013.01); *H02K 21/14* (2013.01)

(58) Field of Classification Search
USPC ............ 310/190, 216.106, 216.076, 216.108, 310/154.01, 154.12, 154.44, 154.28, 310/154.29, 154.26, 154.27
See application file for complete search history.

(56) References Cited

U.S. PATENT DOCUMENTS

| | | | | |
|---|---|---|---|---|
| 4,587,449 A | * | 5/1986 | West ........................ | 310/154.27 |
| 4,707,630 A | * | 11/1987 | Tomite et al. ............ | 310/154.12 |
| 5,723,929 A | * | 3/1998 | Niimi ....................... | 310/154.43 |
| 2008/0024026 A1 | | 1/2008 | Aoyama et al. | |

* cited by examiner

*Primary Examiner* — Burton Mullins
(74) *Attorney, Agent, or Firm* — Posz Law Group, PLC

(57) ABSTRACT

A motor has a plurality of permanent magnet pieces aligned is such a manner as to surround an armature core and a magnetic-flux guide ring disposed between the permanent magnet pieces and the armature core for introducing a magnetic flux from the permanent magnet pieces to the armature core. The magnetic-flux guide ring has a confronting portion confronting each of the magnet pieces, an aperture formed in the confronting portion, and a connecting portion connecting adjacent two confronting portions. The aperture is formed in such a manner as to confront a boundary of adjacent magnet pieces.

10 Claims, 50 Drawing Sheets

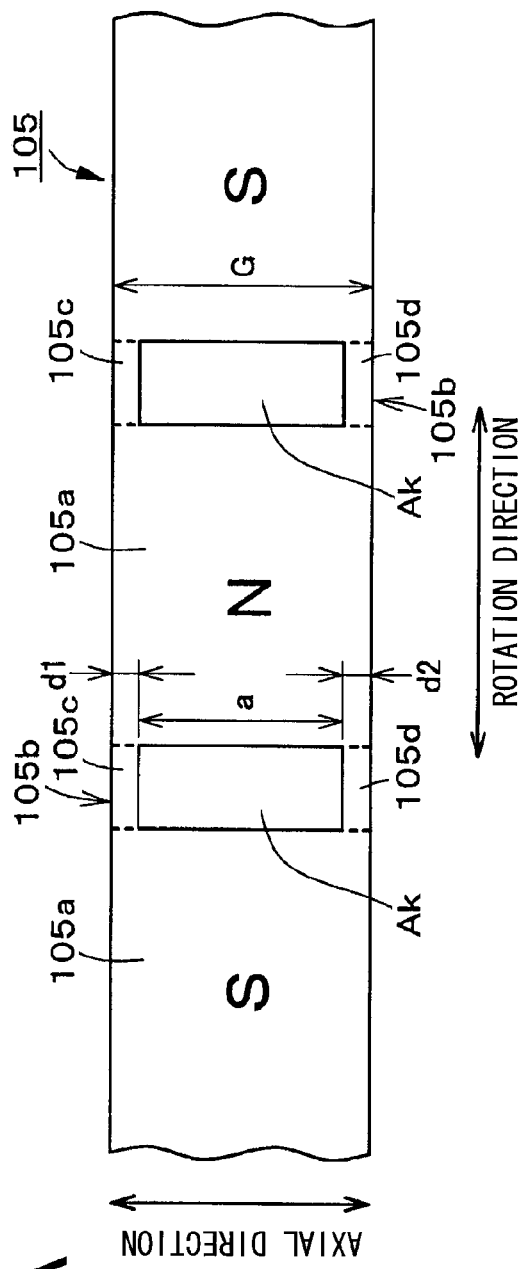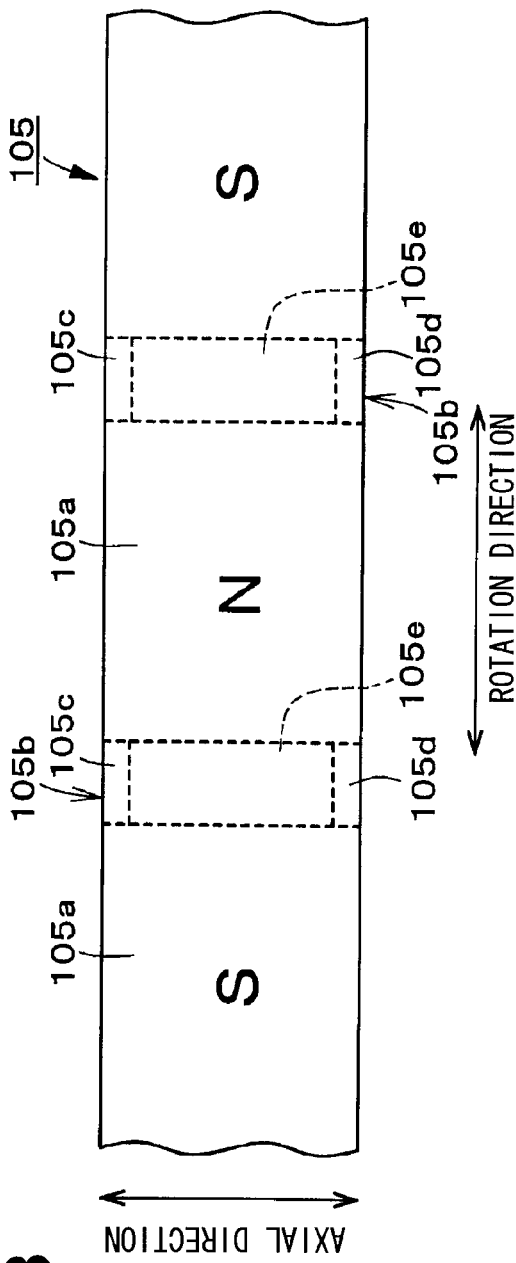
FIG. 26A
FIG. 26B

MOTOR

CROSS-REFERENCE TO RELATED APPLICATIONS

This application is based on Japanese Patent Applications No. 2011-161926 filed on Jul. 25, 2011, No. 2011-227230 filed on Oct. 14, 2011, No. 2011-227229 filed on Oct. 14, 2011, and No. 2012-135132 filed on Jun. 14, 2012, the disclosures of which are incorporated herein by reference.

TECHNICAL FIELD

The present disclosure relates to a motor provided with a magnetism guiding portion which is positioned between an armature core and a permanent magnet for guiding a magnetic flux from the permanent magnet to the armature core.

BACKGROUND

Regarding a motor having an armature core and a permanent magnet, it is required that a magnetic flux from the permanent magnet is effectively utilized with a simple configuration. In order to satisfy this requirement, JP-2008-35639A (US-2008/0024026A1) proposes a motor having a soft magnetic material between an armature core and a permanent magnet. The soft magnetic material, which is referred to as a magnetism guiding portion, is disposed on an inner surface of the permanent magnet. Thereby, the magnetic flux from a permanent magnet flows through the soft magnetic material and is introduced into the armature core.

Generally, in a motor, an axial length of a permanent magnet is longer than that of an armature core. Thus, the magnetic flux generated from a portion of the permanent magnet located outside of the armature core is likely more reduced than the magnetic flux generated from the other portion of the permanent magnet. Meanwhile, in the motor disclosed in JP-2008-35639A (US-2008/0024026A1), since the soft magnetic material is fixed on the permanent magnet, the magnetic flux can be appropriately introduced into the armature core even if generated from a portion of the permanent magnet located outside of the armature core. FIG. 50 is a chart showing a magnetic flux flowing through the soft magnetic material.

In order to miniaturize a motor, the pole number of a motor is increased. That is, a plurality of permanent magnets is arranged along a rotation direction of the motor in such a manner that N-pole magnetic regions and S-pole magnetic regions are alternately positioned. As shown in FIG. 51, the soft magnetic material (magnetism guiding portion) is provided to each of the magnetic regions, whereby the magnetic flux easily flows into the armature core through the corresponding soft magnetic material. As a result, even if a plurality of permanent magnets is provided, the magnetic flux from the permanent magnets is effectively utilized.

However, in a case that the soft magnetic material (magnetism guiding portion) is provided to every permanent magnet, the number of the soft magnetic material is increased. As a result, the number of parts of the motor is increased and manufacturing step of the motor is also increased.

SUMMARY

It is an object of the present disclosure to provide a motor in which magnetic fluxes generated from a plurality of permanent magnets are effectively utilized and of which assemble-characteristics is improved.

According to the present disclosure, a motor includes an armature core, a permanent magnet confronting the armature core, and a magnetism guiding portion disposed between the permanent magnet and the armature core for introducing a magnetic flux from the permanent magnet to the armature core. The permanent magnet has a plurality of magnetic fields which are aligned in such a manner that a magnetic pole alternately changes along a rotation direction of the motor. The magnetism guiding portion includes a confronting portion which confront each of the magnetic fields and a connecting portion which connects adjacent two confronting portions in the rotation direction of the motor.

BRIEF DESCRIPTION OF THE DRAWINGS

The above and other objects, features and advantages of the present disclosure will become more apparent from the following detailed description made with reference to the accompanying drawings. In the drawings:

FIG. 26A is a developed view showing a magnetic-flux guide portion according to the eighth embodiment;

FIG. 26B is a developed view showing a magnetic-flux guide portion according to a modification of the eighth embodiment;

DETAILED DESCRIPTION

Figure 1:
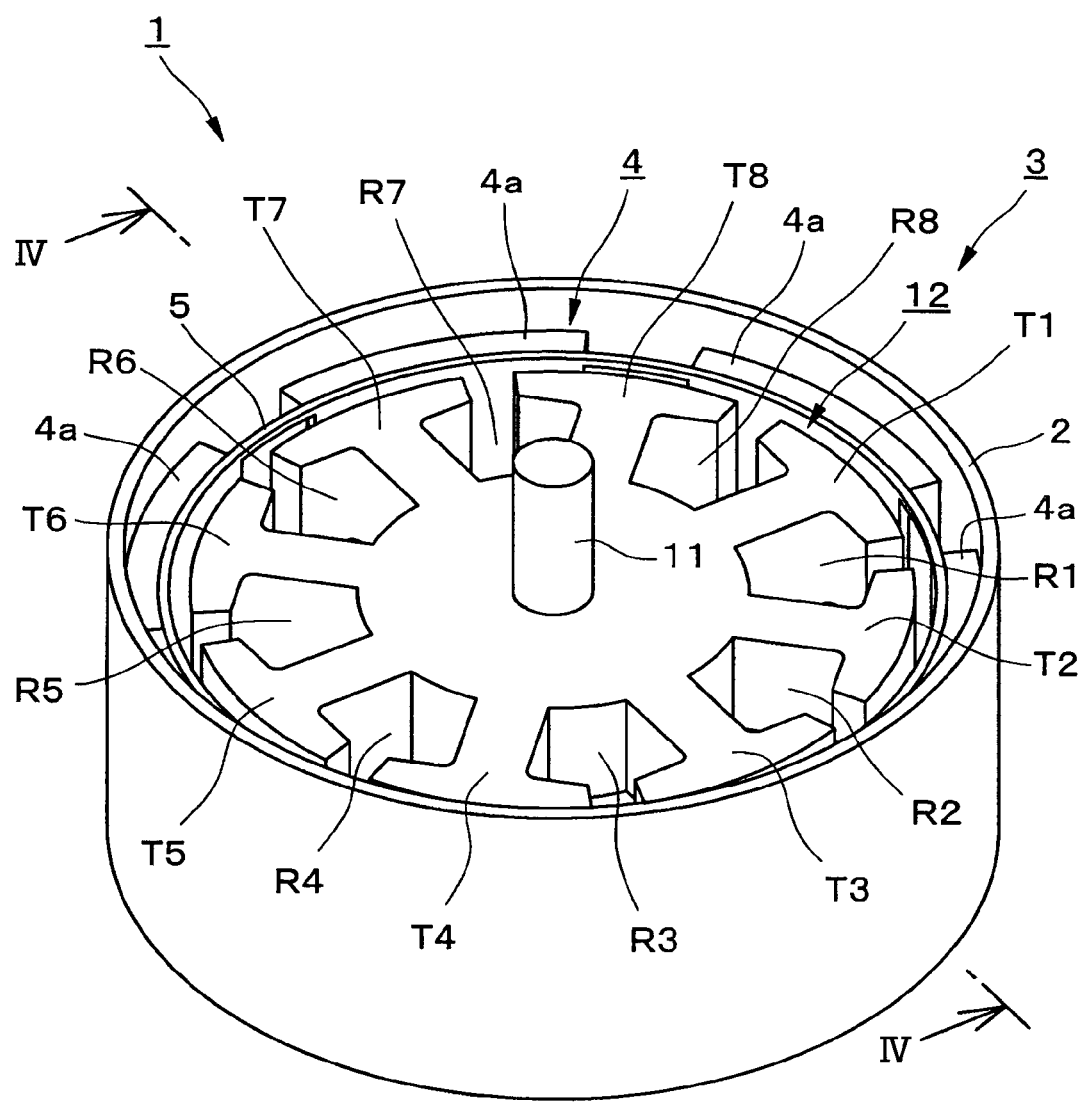
FIG. 1 is a perspective view of a motor according to a first embodiment.
Figure 2:
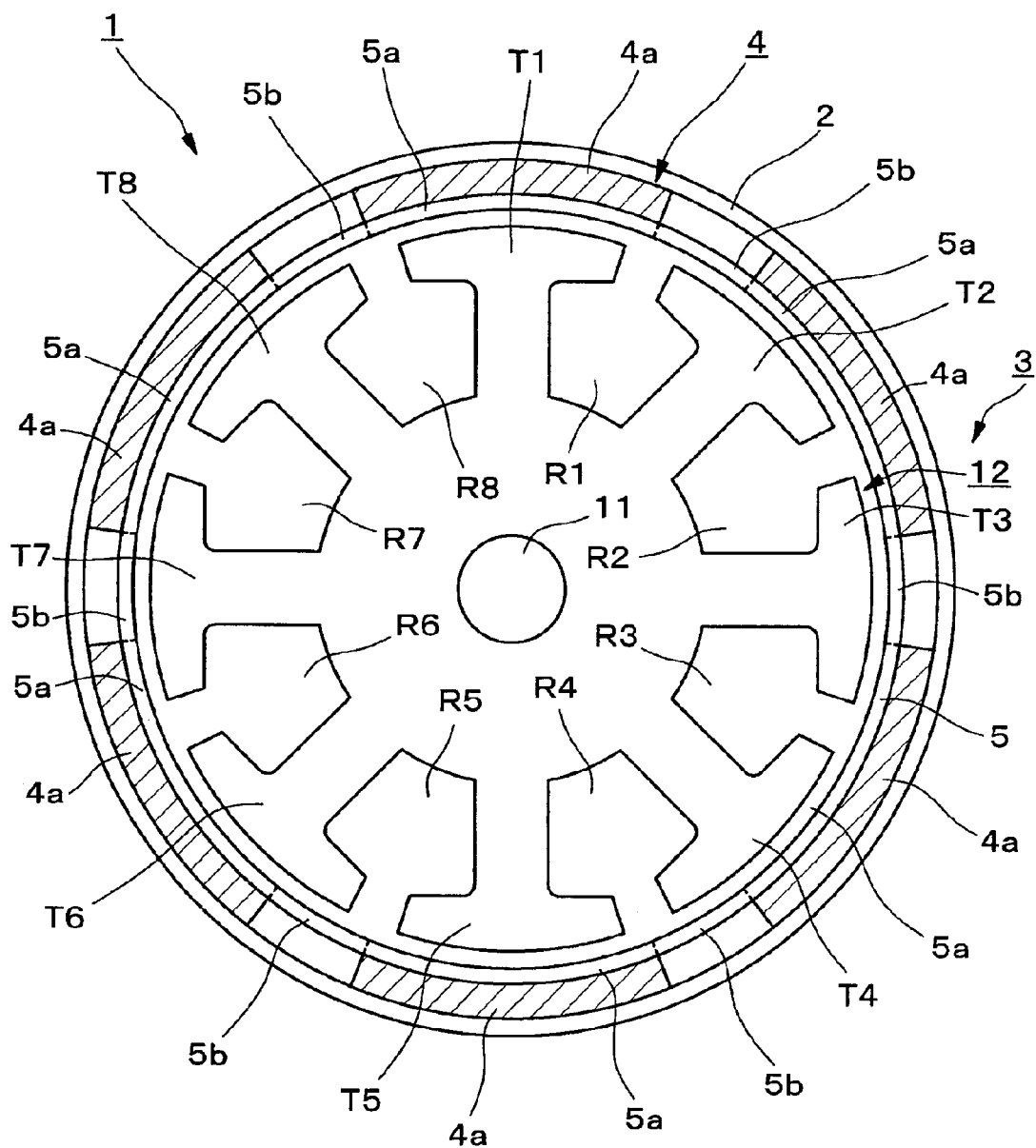
FIG. 2 is a plan view of a magnet yoke.
Figure 3:
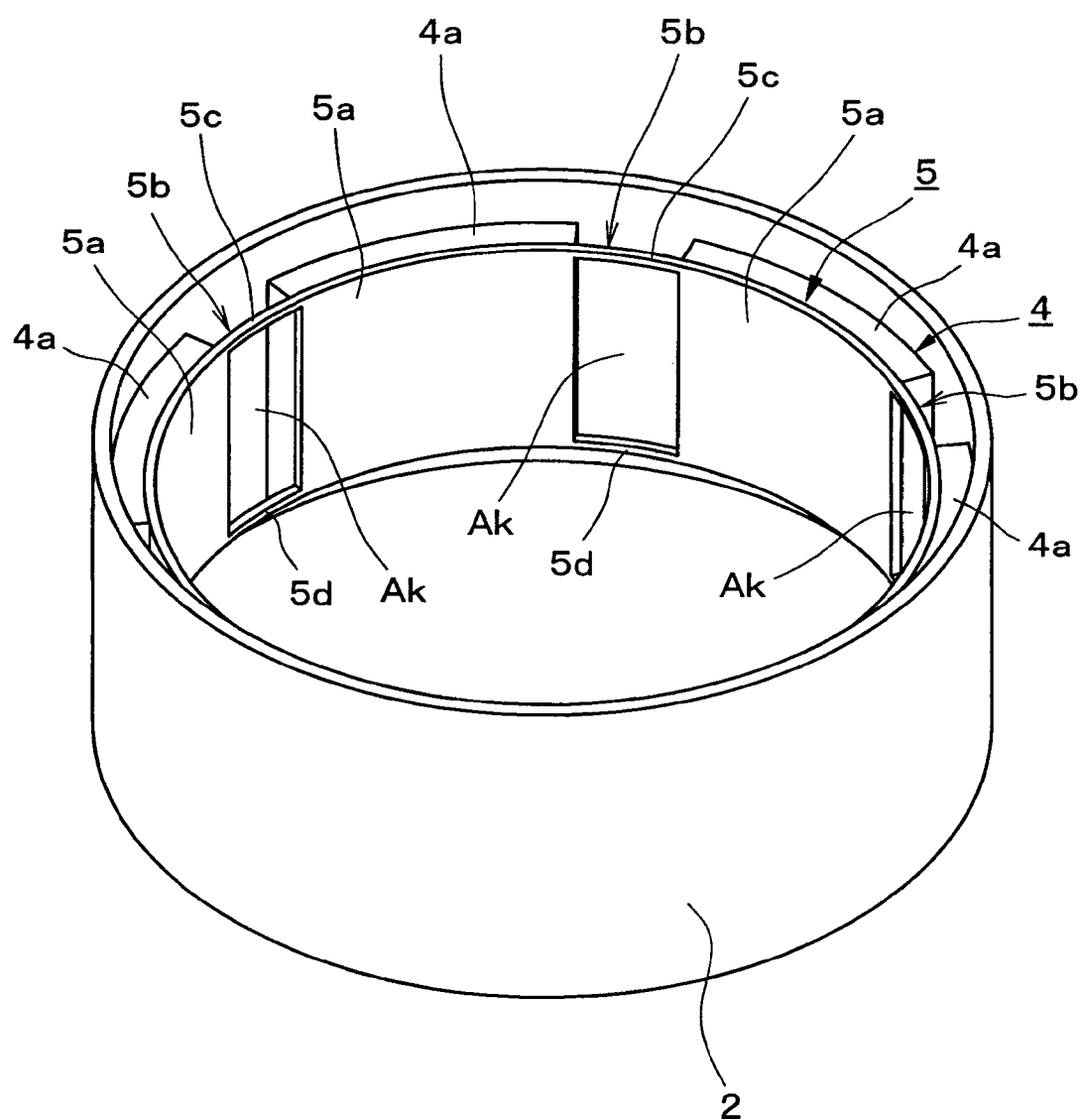
FIG. 3 is a perspective view of a magnet yoke from which an armature is removed.
Figure 4:
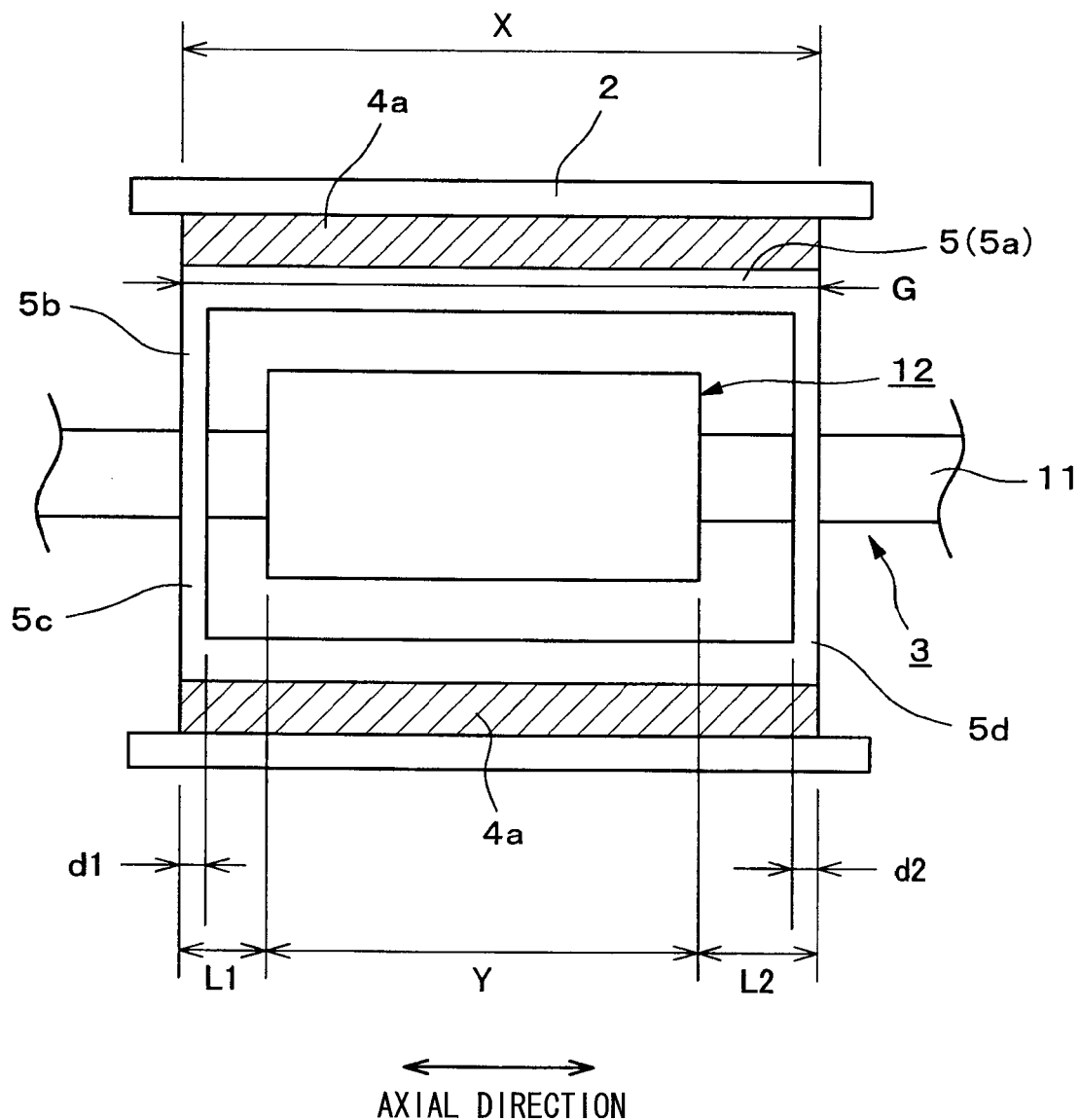
FIG. 4 is a cross sectional view taken along a line IV-IV of FIG. 1.
Figure 5:
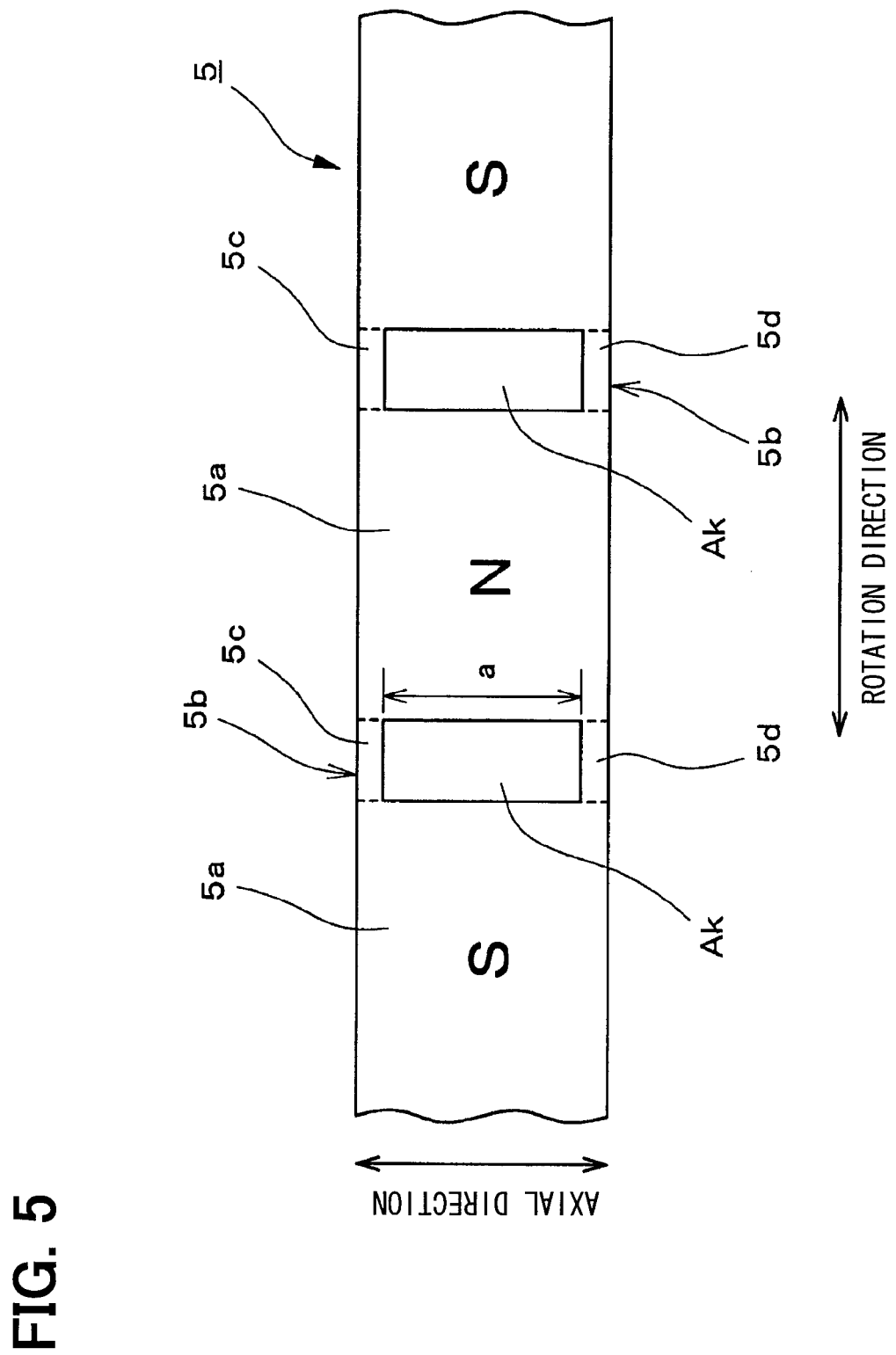
FIG. 5 is a developed view showing a magnetic-flux guide portion.

Referring to FIGS. 1 to 5, a first embodiment will be described hereinafter. FIG. 1 is a perspective view of a motor according to a first embodiment. FIG. 2 is a plan view of a magnet yoke. FIG. 3 is a perspective view of a magnet yoke from which an armature core is removed. FIG. 4 is a cross sectional view taken along a line IV-IV of FIG. 1. FIG. 5 is a developed view showing a magnetic-flux guide ring. It should be noted that FIG. 1 shows only an interior of magnet yoke.

A motor 1 is a direct-current motor having multi-polar multi-slot configuration. This motor 1 is employed as a micro motor for automatically opening and closing a window of an automobile. The motor 1 has a well-know configuration except a magnetic-flux guide ring (magnetism guiding portion) 5.

That is, the motor 1 has a cylindrical magnet yoke 2 which accommodates an armature (rotor) 3 and a stator 4.

The armature 3 is arranged in a center portion in a radial direction of the magnet yoke 2. As shown in FIGS. 1 and 2, the armature 3 has a shaft 11 and an armature core 12. The shaft 11 is made from metallic material and functions as an output shaft of the motor 1. Thus, a rotation direction of the shaft 11 corresponds to a rotation direction of the motor 1. The armature core 12 has a plurality of teeth T1-T8 which radially outwardly extend and a plurality of slots R1-R8. In this embodiment, the armature core has eight teeth T1-T8 and eight slots R1-R8. The number of the teeth and the slots can be arbitrarily established.

A coil (not shown) is wound around each of teeth T1-T8. When this coil is energized, the armature core 12 and the shaft 11 rotate. The coil is energized by well know method using a brush and a commutator.

The stator 4 is a permanent magnet which surrounds the armature 3 including the armature core 12 in the magnet yoke 2. In the present embodiment, the stator 4 is comprised of a plurality of magnet pieces 4a each of which has N-pole and S-pole respectively. These magnet pieces are arranged on an inner wall of the magnet yoke 2. Thereby, the stator 4 generates a plurality of magnetic fields of which magnetic pole alternately changes along a rotation direction of the armature 3. The magnetic fields generate magnetic flux toward the armature core 12.

The magnet piece 4a having N-pole and the magnet piece 4a having S-pole are alternately arranged in a ring shape along the rotation direction of the armature 3. Between adjacent magnet pieces 4a, a specified clearance is generated. When arranging the magnet pieces 4a, the magnet pieces 4a may be arranged in an ellipse-shape or a rectangular-shape.

In the present embodiment, six magnet pieces 4a are arranged along the rotation direction of the armature 3 at 60° interval. That is, the magnet pieces 4a are arranged so that the magnetic pole changes at regular intervals along the rotation direction of the armature 3.

Furthermore, according to the present embodiment, an axial length of the magnet pieces 4a along the shaft 11 is longer than that of the armature core 12. That is, as shown in FIG. 4, in the axial direction of the shaft 11, a center portion of the magnet pieces 4a confront the armature core 12 (specifically, each of teeth T1-T8). Both ends of the magnet pieces 4a are located outside of the armature core 12 in the axial direction. The armature core 12 is formed by laminating a plurality of core sheets seats in such a manner that the axial laminating length of the armature core 12 is not longer than the axial length of the magnet pieces 4a, so that the magnetic flux is efficiently obtained.

As shown in FIG. 4, a length L1 of the magnet pieces 4a located outside of the armature core 12 in one direction is substantially equal to a length L2 of the magnet pieces 4a located outside of the armature core 12 in another direction It should be noted that the axial length of the magnet pieces 4a may be equal to the axial length of the armature core 12 or may be shorter than that of the armature core 12.

A magnetic-flux guide ring (magnetism guiding portion) 5 is provided in the magnet yoke 2. This magnetic-flux guide ring 5 corresponds to a magnetic-flux guide portion and is arranged between the magnet pieces 4a and the armature core 12. That is, the magnetic-flux guide ring 5 functions as an auxiliary core, so that the magnetic flux is effectively introduced into the armature core 12 from each magnet piece 4a. The magnetic-flux guide ring 5 is made of soft magnetic materials by compression molding of soft magnetic material powder.

More specifically, the magnetic-flux guide ring 5 is fixed on an inner surface of the magnet pieces 4a, whereby each of the magnet pieces 4a is protected, the magnetic flux from each magnet pieces is uniformized and anti-demagnetization can be improved. Besides, the magnetic-flux guide ring 5 is fixed on the magnet pieces 4a with adhesive agent or other fixing member, such as a bolt nut.

Although the both ends of the magnet pieces 4a are located outside of the armature core 12 as described above, the magnetic-flux guide ring 5 introduces the magnetic flux into the armature core 12 from both ends of the magnetic pieces 4a.

It should be noted that the magnetic-flux guide ring 5 is a ring member consisting of only one component. That is, in present embodiment, since only one magnetic-flux guide ring 5 having no end is provided, the number of parts can be decreased rather than a case where a magnetic-flux guide portion is provided to each of magnet pieces 4a. As a result, the magnetic-flux guide ring 5 can be easily attached to the motor 1.

More specifically, the magnetic-flux guide ring 5 has a confronting portion 5a and a connecting portion 5b which are arranged alternately in a circumferential direction. The confronting portion 5a confronts each magnet piece 4a. That is, the confronting portion 5a is fixed on the inner surface of each magnet piece 4a. The magnetic flux from each magnet piece 4a is appropriately introduced into the armature core 12 through the confronting portion 5a.

In the present embodiment, an axial length of the magnetic-flux guide ring 5 is equal to that of the magnet pieces 4a. Specifically, the confronting portion 5a has almost the same shape as the magnet piece 4a. The entire inner surface of the magnet piece 4a is covered with the confronting portion 5a. Thereby, the magnetic flux from each magnet piece 4a can be introduced into the armature core 12 more appropriately. The magnetic flux generated from the both ends of the magnet pieces 4a as well as the magnetic flux generated from center portion of the magnet pieces 4a are introduced into the armature core 12.

Further, the magnetic-flux guide ring 5 has a rectangular aperture "Ak" between adjacent confronting portions 5a. The rectangular aperture "Ak" corresponds to the clearance between the adjacent confronting portions 5a. When the magnetic-flux guide ring 5 is installed in a specified position, the above rectangular aperture "Ak" is positioned between the adjacent magnet pieces 4a.

The connecting portion 5b connects adjacent confronting portions 5a. The multiple confronting portions 5a are connected by the connecting portion 5b to become ring-shape. As shown in FIGS. 3 to 5, the connecting portion 5b is comprised of a first connecting portion 5c and a second connecting portion 5d.

Specifically, the first connecting portion 5c connects axial first end portions of adjacent confronting portions 5a. The second connecting portion 5d connects axial second end portions of adjacent confronting portions 5a. Since the adjacent confronting portions 5a are connected with each other by two connecting portions 5c, 5d, it can be avoided that the magnetic-flux guide ring 5 is twisted.

Further, a width of the first connecting portion 5c is substantially equal to a width of the second connecting portion 5d. The width of the first and the second connecting portion 5c, 5d is defined to ensure mechanical strength for connecting the confronting portions 5a. In other words, as long as the mechanical strength for connecting the confronting portions 5a is ensured, the width of the first and the second connecting portion 5c, 5d can be narrower. Thus, a leakage of the magnetic flux from the confronting portion 5a to the connecting portion 5b can be reduced.

More specifically, an axial length of the magnetic-flux guide ring 5, which is denoted by "G" in FIG. 4, is equal to an axial length of the magnet piece 4a, which is denoted by "X" in FIG. 4. The widths d1, d2 of the first and the second connecting portion 5c, 5d is less than half of a difference between the length "X" and an axial length "Y" of the armature core 12. That is, the width d1 of the first connecting portion 5c and the width d2 of the second connecting portion 5d satisfy following formulas:

$$d1 \leq (X-Y)/2 \quad (1)$$

$$d2 \leq (X-Y)/2 \quad (2)$$

It is preferable that the widths d1, d2 of the first and the second connecting portion 5c, 5d are narrow as much as possible in order to prevent a magnetic flux leakage.

Also, the rectangular aperture "Ak" is formed in such a manner as to satisfy the above formulas (1) and (2). The rectangular aperture "Ak" is formed between the first connecting portion 5c and the second connecting portion 5d.

An axial width "a" of the rectangular aperture "Ak", which is shown in FIG. 5, satisfies a following formula (3):

$$G = X = a + d1 + d2 \quad (3)$$

Moreover, the axial width "a" of the aperture "Ak" is preferably greater than the length "Y" of the armature core 12.

$$a \geq Y \quad (4)$$

The magnetic-flux guide ring 5 is formed by punching a ring material to satisfy the above formulas. The magnetic-flux guide ring 5 is disposed between the magnet pieces 4a and the armature core 12.

Thereby, the magnetic flux can be appropriately introduced from each magnet piece 4a into the armature core 12 as well as a case where every magnet piece 4a is independently equipped with a magnetic-flux guide portion. Also, the number of parts can be reduced. The magnetic-flux guide ring 5 can be easily assembled to the motor 1. The manufacturing cost can be also reduced.

As describe above, the magnetic-flux guide ring 5 is formed from single piece. Even if the number of the permanent magnets 4a is increased, or if a size of magnet piece 4a is decreased, the magnetic-flux guide ring 5 is easily attached into the motor 1. Thus, the magnetic-flux guide ring 5 is effective for miniaturizing the motor 1 and reducing its weight.

In a second and the successive embodiments, the same parts and components as those in the first embodiment are indicated with the same reference numerals and the same descriptions will not be reiterated.

Second Embodiment

Figure 6:
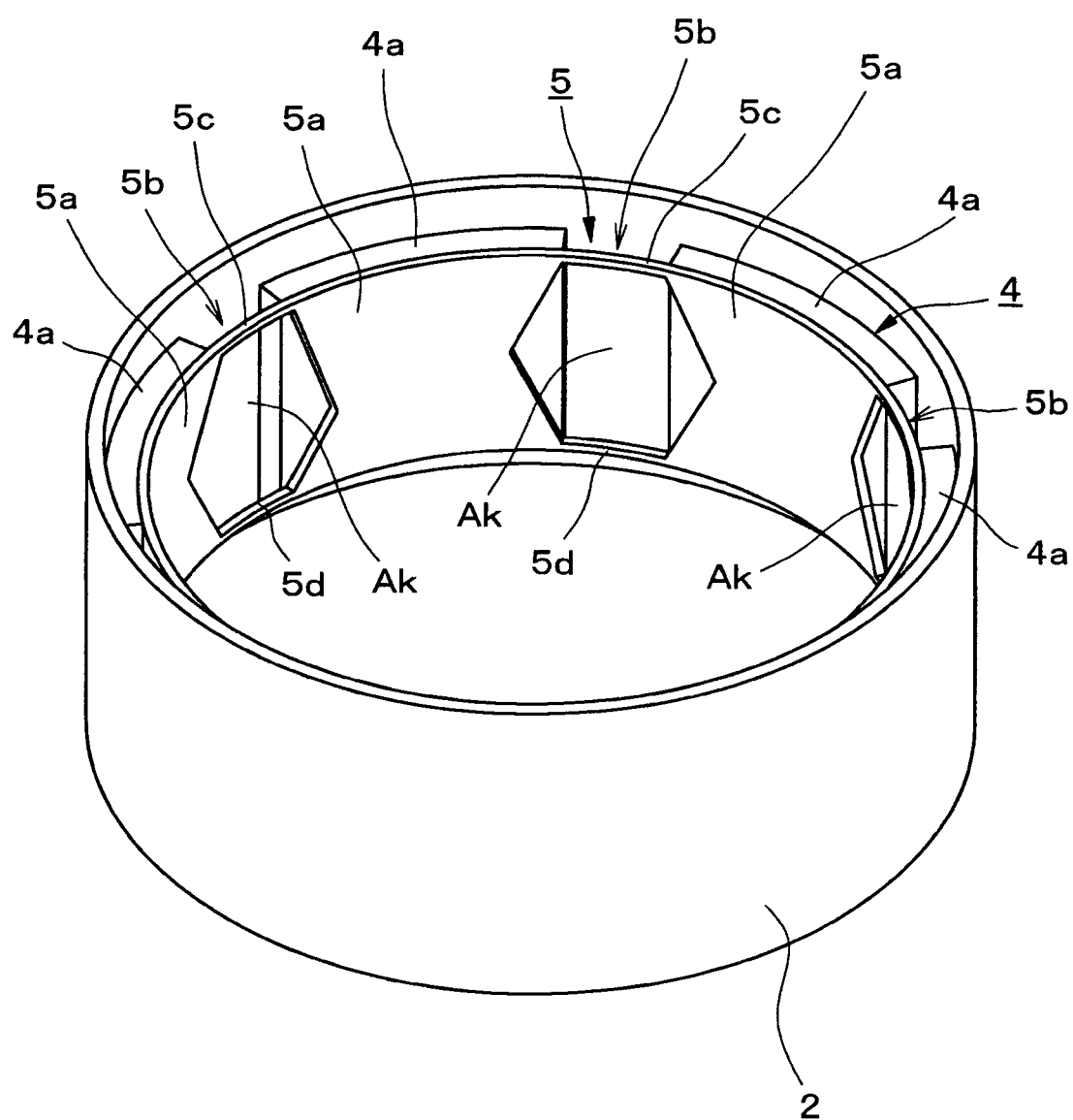
FIG. 6 is a perspective view of a magnet yoke according to a second embodiment.
Figure 7:
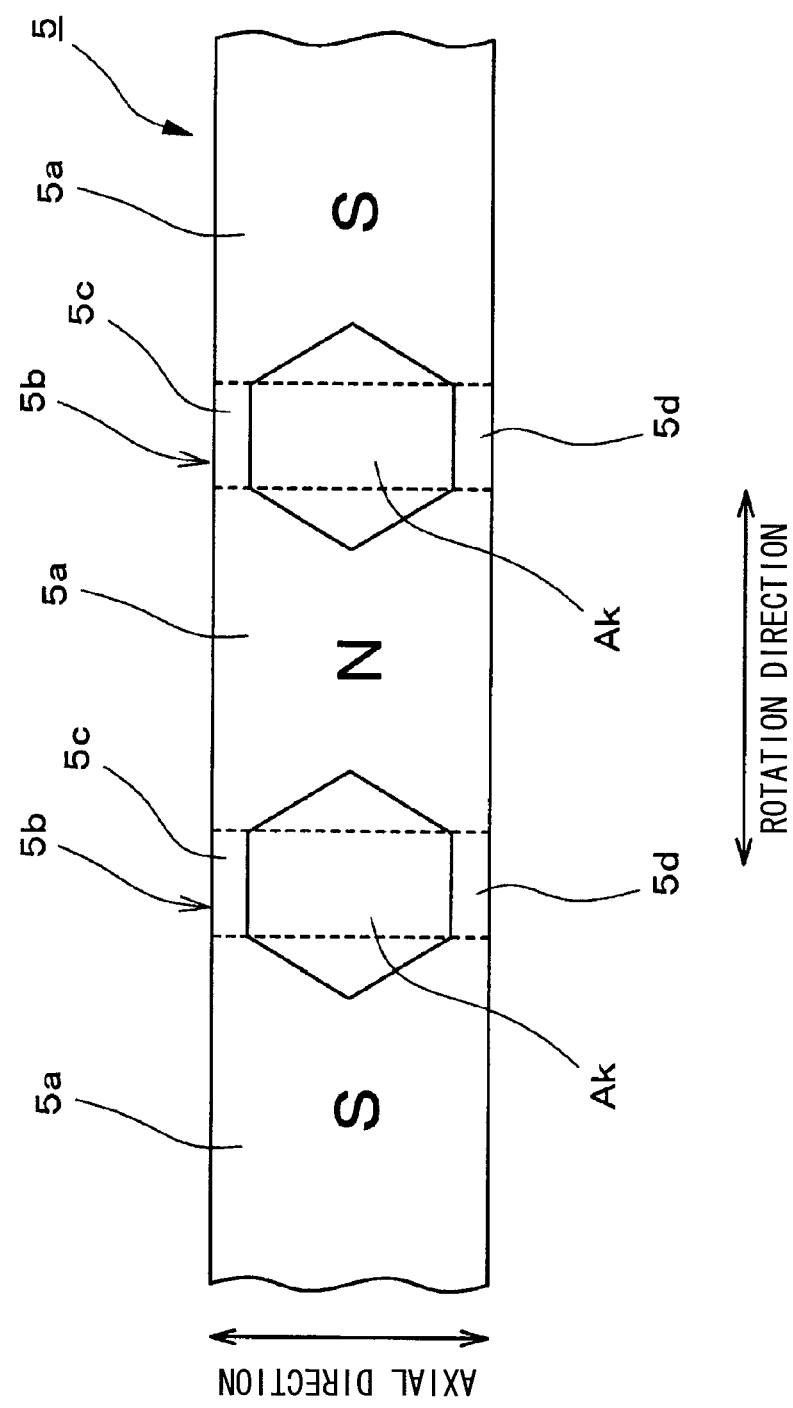
FIG. 7 is a developed view showing a magnetic-flux guide portion according to the second embodiment.

In a second embodiment, a shape of the aperture "Ak" is different from the first embodiment. Referring to FIGS. 6 and 7, a shape of the aperture "Ak" will be described. FIG. 6 is a perspective view of a magnet yoke according to the second embodiment. FIG. 7 is a developed view showing a magnetic-flux guide portion according to the second embodiment.

The aperture "Ak" is shaped as hexagon. As shown in FIG. 7, the shape of the aperture "Ak" is a hexagon which is obtained by shrinking a regular hexagon in a rotation direction of the armature 3. A diagonal line connecting a first apex and a second apex, which are positioned at both ends in the rotation direction, is orthogonal to a center line of the shaft 11.

An axial length of the aperture "Ak" becomes longer from the first and the second apex to a center portion of the aperture "Ak". In other words, the opening area of the aperture "Ak" gradually changes from the both apexes toward its center.

The magnetic flux passing through the magnetic-flux guide ring 5 is also changed along a rotation direction of the armature 3, whereby a function of skew is obtained. The function of skew can restrict a magnetic variation along with a rotation of the armature core, so that vibrations (cogging) and noises can be restricted.

As long as the axial length of the aperture "Ak" becomes longer from the first and the second apex to a center portion of the aperture "Ak", the shape of the aperture "Ak" is not limited to the hexagon shown in FIGS. 6 and 7.

Third Embodiment

Figure 8:
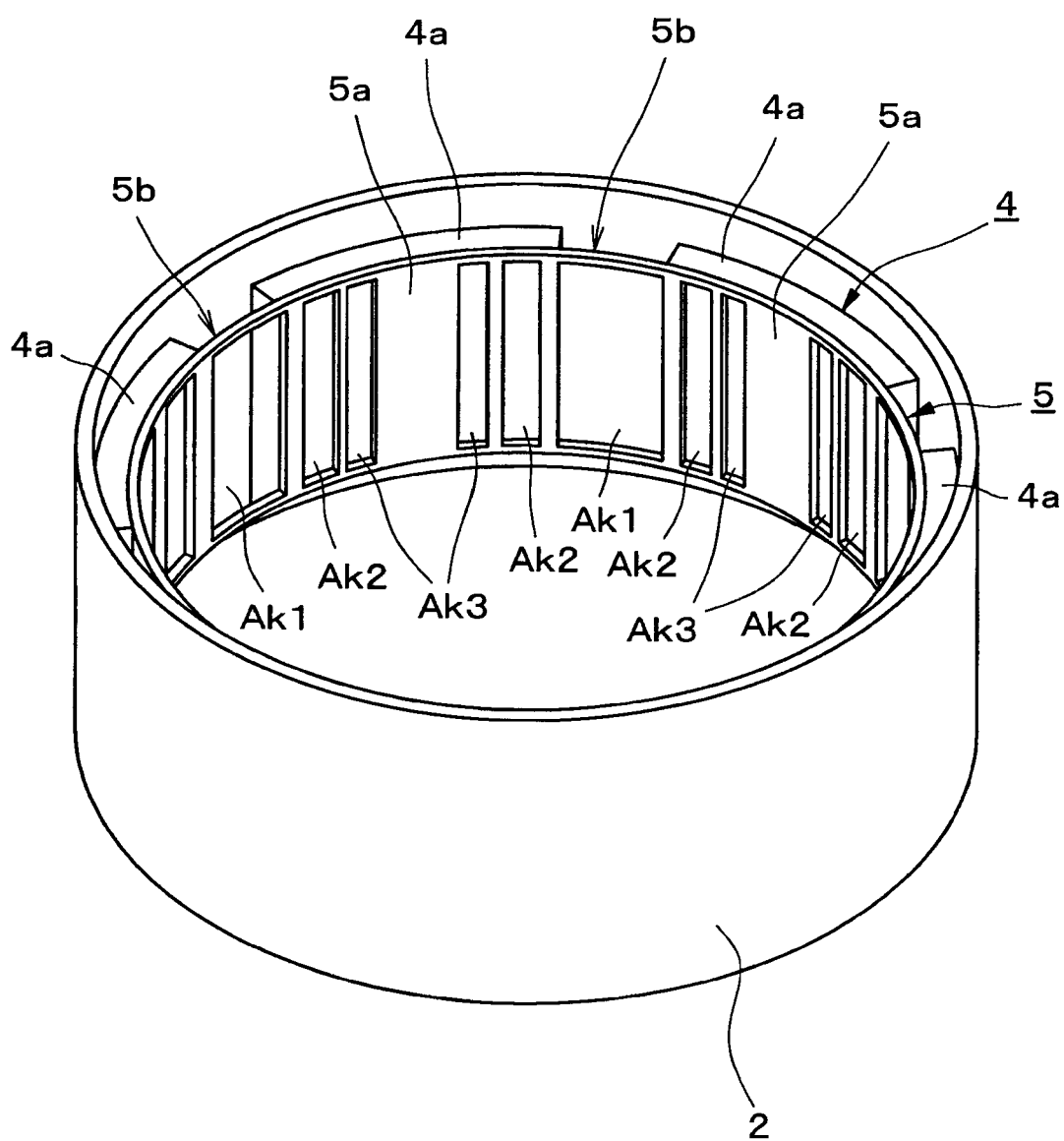
FIG. 8 is a perspective view of a magnet yoke according to a third embodiment.
Figure 9:
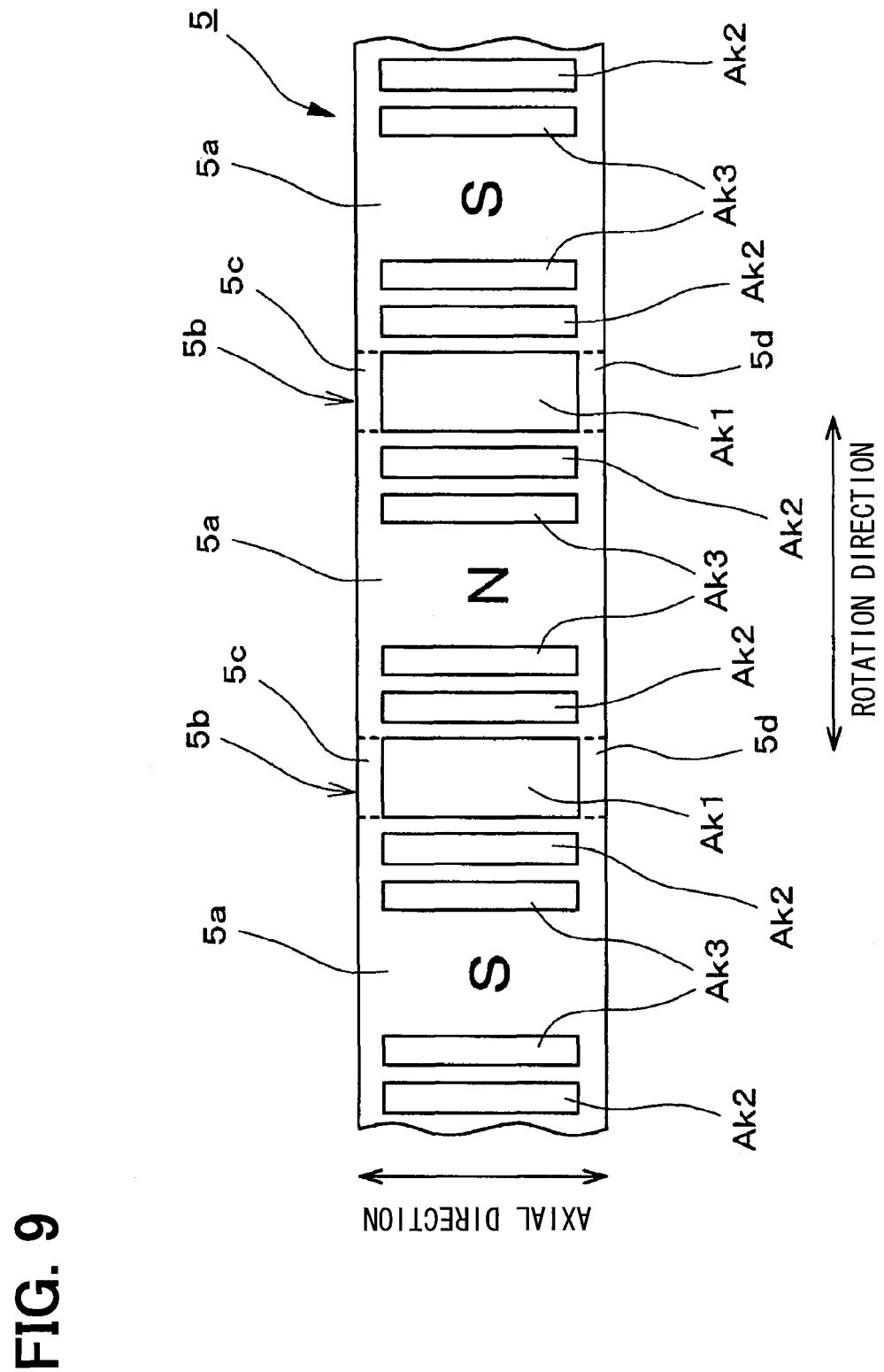
FIG. 9 is a developed view showing a magnetic-flux guide portion according to the third embodiment.

According to a third embodiment, the magnetic-flux guide ring 5 has three kinds of apertures "Ak1", "Ak2" and "Ak3". Referring to FIGS. 8 and 9, shapes of the apertures "Ak1", "Ak2" and "Ak3" will be described. FIG. 8 is a perspective view of a magnet yoke according to the third embodiment. FIG. 9 is a developed view showing a magnetic-flux guide portion according to the third embodiment.

As shown in FIG. 9, a first rectangular aperture "Ak1" is formed between the first connecting portion 5c and the second connecting portion 5d. Further, second rectangular apertures "Ak2" are formed adjacent to the first rectangular aperture "Ak1" in the rotation direction of the armature 3. A width of the second rectangular apertures "Ak2" in the rotation direction is narrower than that of the first rectangular aperture "Ak1".

Moreover, third rectangular apertures "Ak3" are formed adjacent to the second rectangular apertures "Ak2". A width of the third rectangular apertures "Ak3" in the rotation direction is narrower than that of the second rectangular aperture "Ak2".

As above, three kinds of apertures "Ak1", "Ak2", "Ak3" are aligned regularly in the rotation direction of the armature 3. Thus, the total opening areas of the apertures are gradually changed along the rotation direction of the armature 3. The magnetic flux passing through the magnetic-flux guide ring 5 is also changed along a rotation direction of the armature 3, whereby a function of skew is obtained. Also in the third embodiment, the function of skew can restrict a magnetic variation along with a rotation of the armature core, so that vibrations (cogging) and noises can be restricted.

Fourth Embodiment

Figure 10:
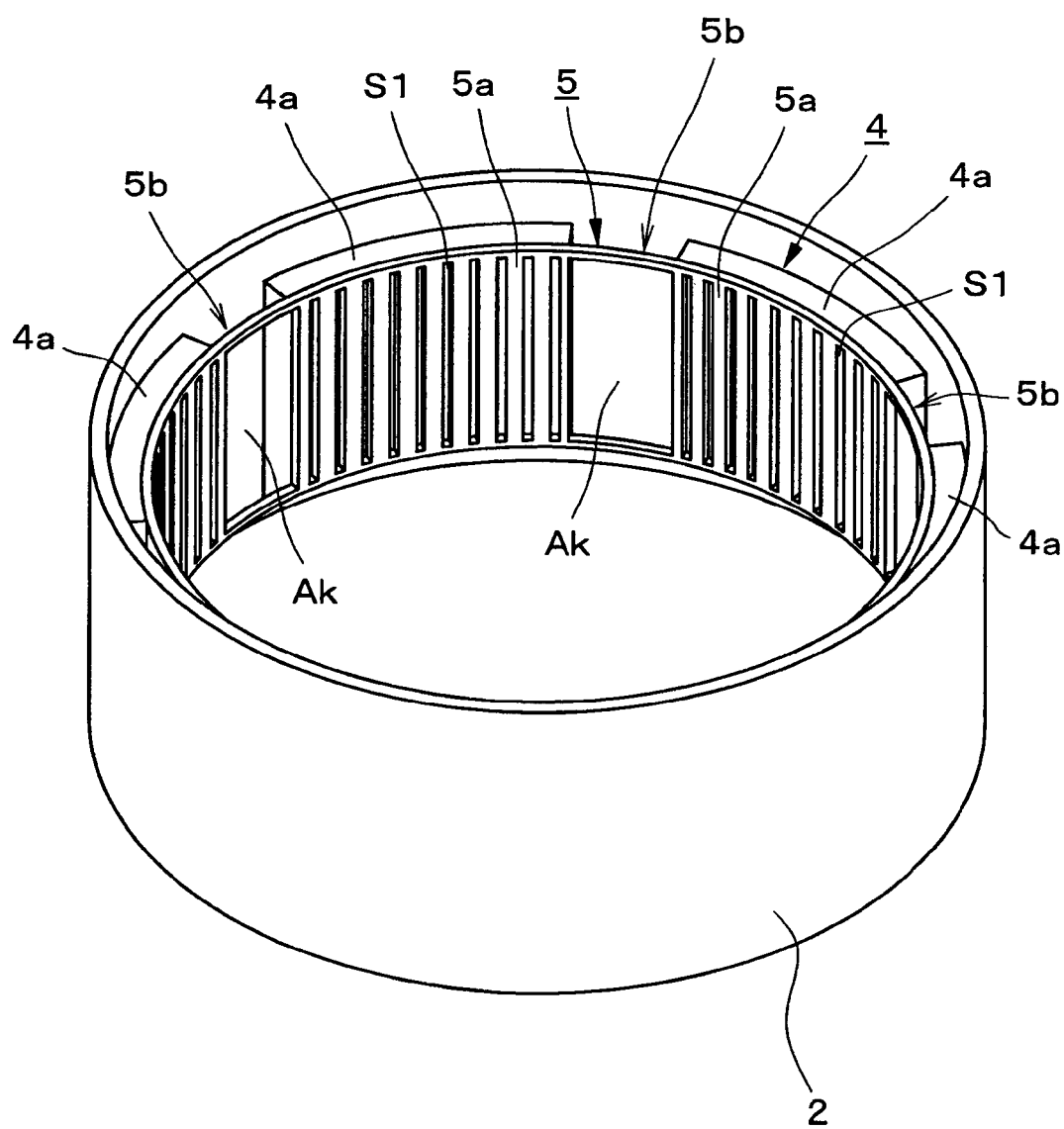
FIG. 10 is a perspective view of a magnet yoke according to a fourth embodiment.
Figure 11:
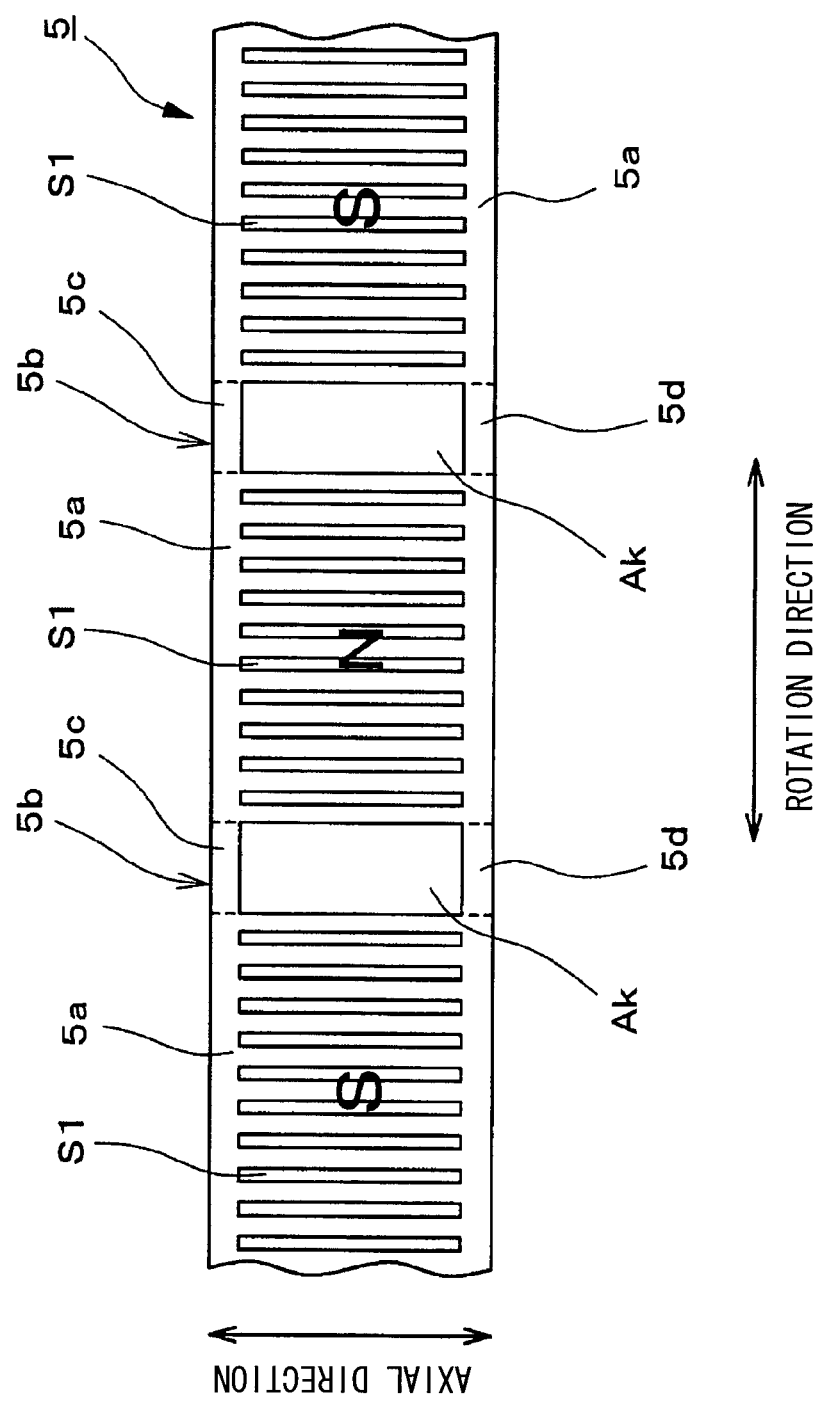
FIG. 11 is a developed view showing a magnetic-flux guide portion according to the fourth embodiment.

According to a fourth embodiment, a slit "S1" is formed in the confronting portion 5a of the magnetic-flux guide ring 5. Referring to FIGS. 10 and 11, a shape of the magnetic-flux guide ring 5 will be described. FIG. 10 is a perspective view of a magnet yoke according to the fourth embodiment. FIG. 11 is a developed view showing a magnetic-flux guide portion according to the fourth embodiment.

The magnetic-flux guide ring 5 has the slit "S1" at the confronting portion 5a. The rectangular slit "S1" extends in an axial direction of the shaft 11. This slit "S1" improves a rotation efficiency of the armature 3.

Specifically, when the armature 3 rotates, a magnetic field is generated in a vicinity of the magnetic-flux guide ring 5, whereby an eddy current arises in the confronting portion 5a. The eddy current generates heat in the confronting portion 5a. As a result, an energy loss corresponding to the generated heat occurs, whereby an input energy for rotating the armature 3 is reduced (eddy current loss). According to the fourth embodiment, an eddy current path is intercepted by the slit "S1", so that the eddy current is reduced and the eddy current loss is also reduced.

As shown in FIGS. 10 and 11, as the number of the slit "S1" is more increased, the above advantage (eddy current path interception) becomes more effective. As long as the slit "S1" intercepts the eddy current path, the slit "S1" may be formed in such a manner as to extend in the rotation direction of the armature 3. That is, the slit "S1" may extends in the axial direction or the rotation direction.

Fifth Embodiment

Figure 12:
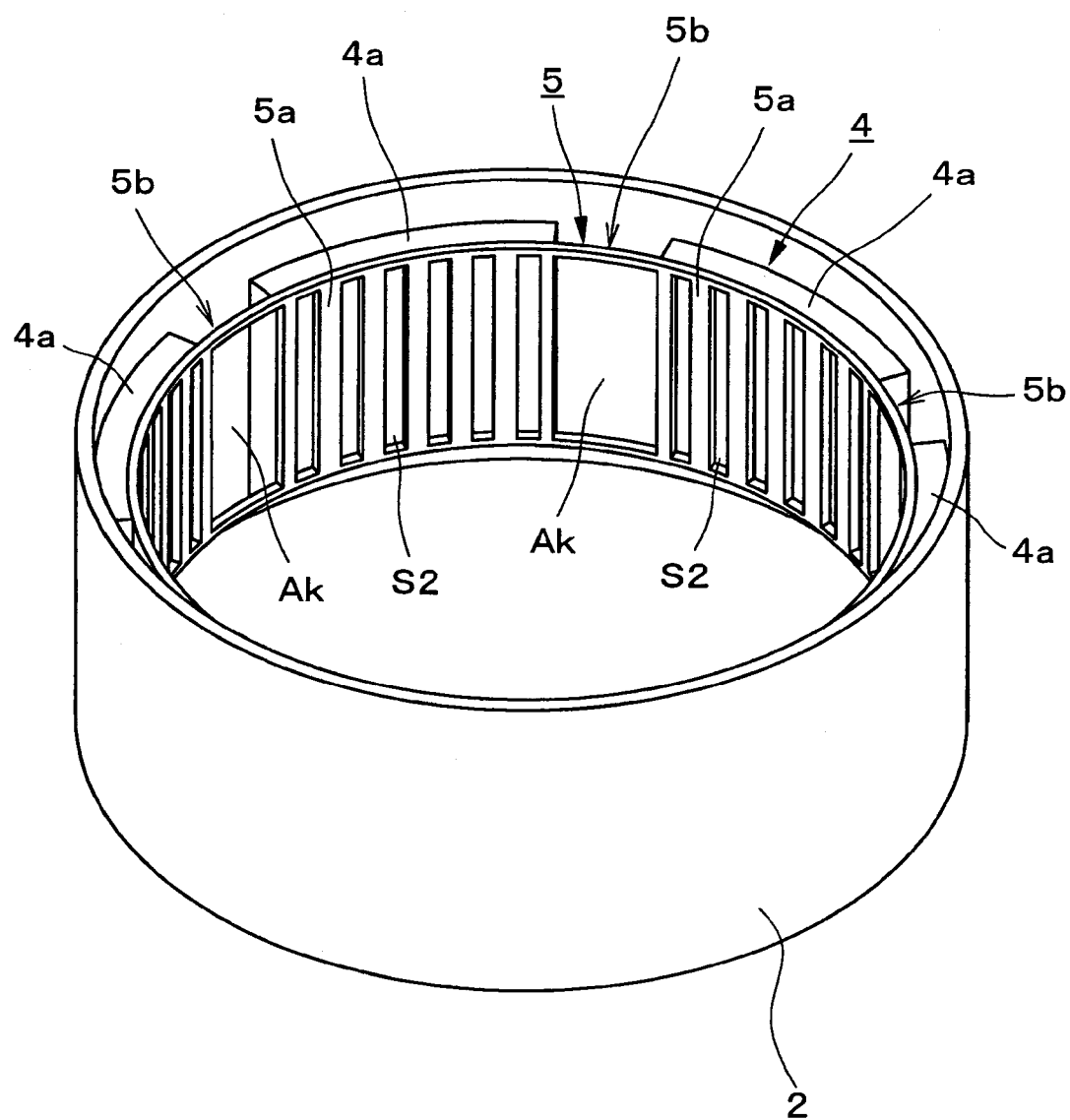
FIG. 12 is a perspective view of a magnet yoke according to a fifth embodiment.
Figure 13:
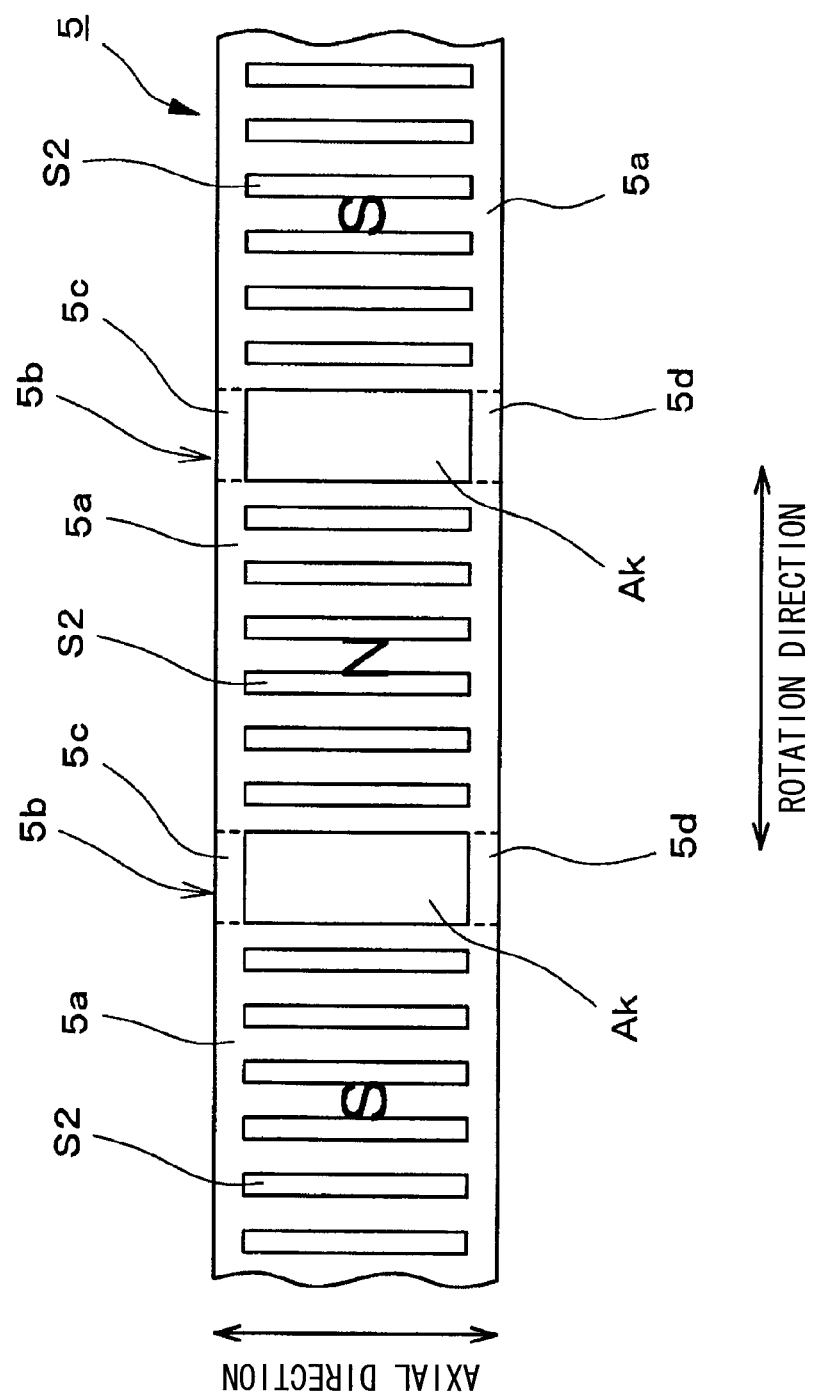
FIG. 13 is a developed view showing a magnetic-flux guide portion according to the fifth embodiment.
Figure 14:
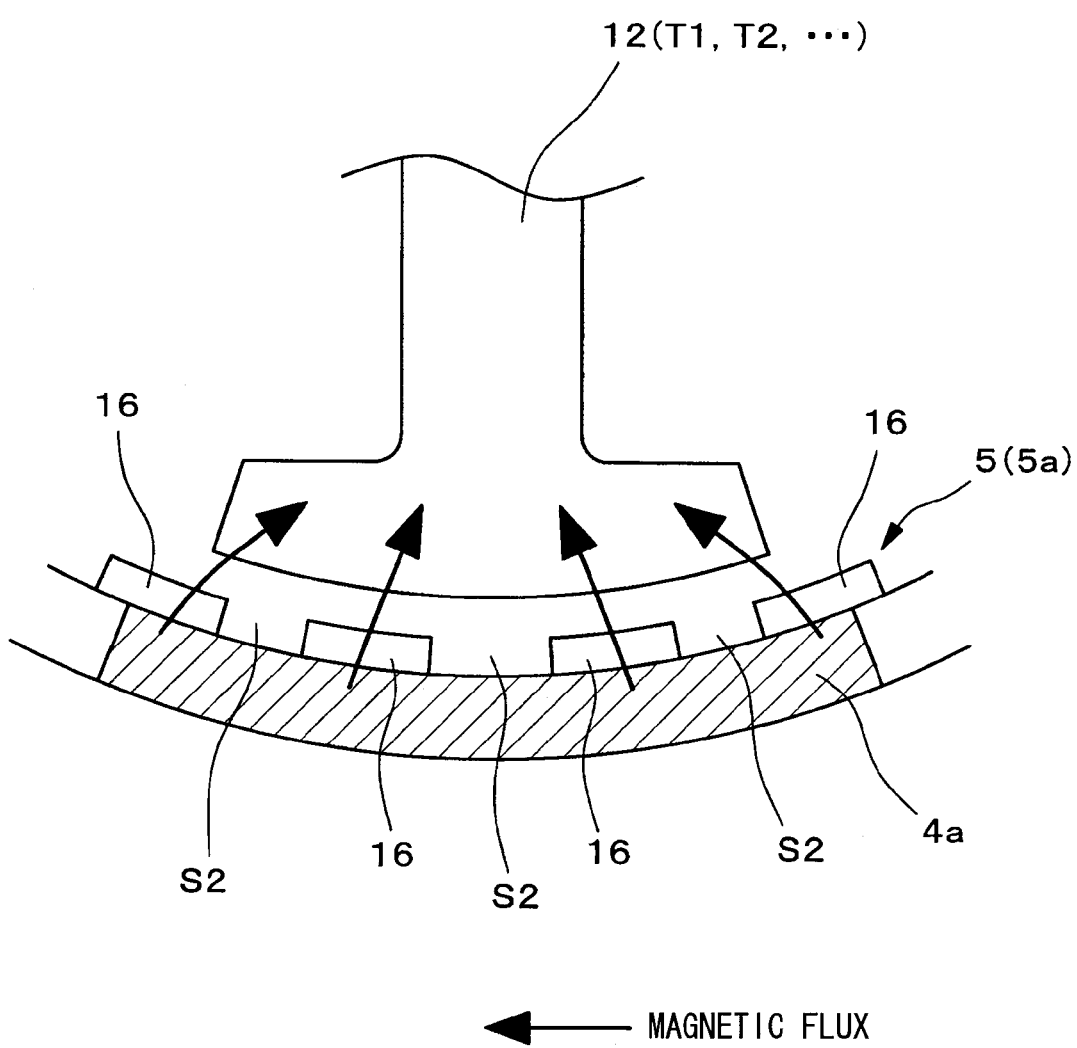
FIG. 14 is a chart for explaining an advantage of the fifth embodiment.

As shown in FIGS. 12 and 13, a plurality of slits "S2" is formed in the confronting portion 5a at regular intervals. Referring to FIGS. 12 to 14, a shape of the magnetic-flux guide ring 5 will be described. FIG. 12 is a perspective view of a magnet yoke according to the fifth embodiment. FIG. 13 is a developed view showing a magnetic-flux guide portion according to the fifth embodiment. FIG. 14 is a chart for explaining an advantage of the fifth embodiment.

As shown in FIGS. 12 and 13, a plurality of slits "S2" is formed in the confronting portion 5a at regular intervals along the axial direction of the shaft 11. That is, the magnetic-flux guide ring 5 has a plurality of slits "S2" and regular unevenness on its surface confronting the armature core 12. In this regular unevenness, convex portions function as quasi-salient poles 16 (refer to FIG. 14).

As above, according to the fifth embodiment, the salient poles 16 are formed in the confronting portion 5a which are aligned in the rotation direction of the armature 3. As a result, the magnetic flux passes through each salient pole 16. The density of magnetic flux passing through the confronting portion 5a is made uniform. If the magnetic flux is locally converged in the confronting portion 5a, the magnetic flux which the coil crosses may fluctuate, which generates a vibration and a noise. On the other hand, according to the fifth embodiment, since the density of magnetic flux passing through the confronting portion 5a is made uniform, a magnetic balance in the motor 1 is improved, so that the vibration and the noise can be restricted.

Besides, as the salient pole 16 becomes higher, the mechanical strength of the salient pole 16 becomes greater and the magnetic flux quantity is more ensured.

Sixth Embodiment

In the above embodiments, a certain amount of magnetic flux leaks from the confronting portion 5a to the connecting portion 5b.

Figure 15:
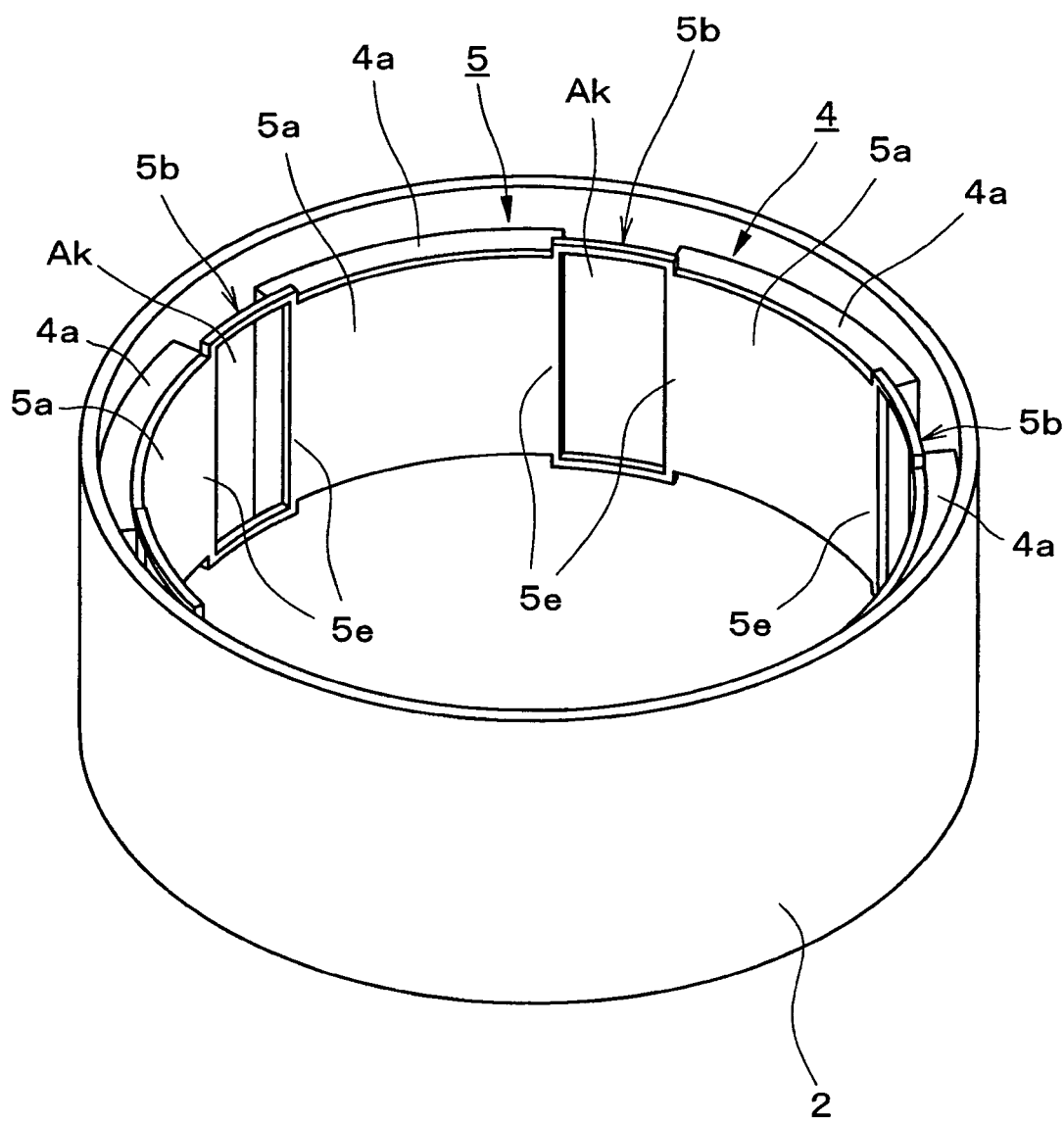
FIG. 15 is a perspective view of a magnet yoke according to a sixth embodiment.
Figure 16:
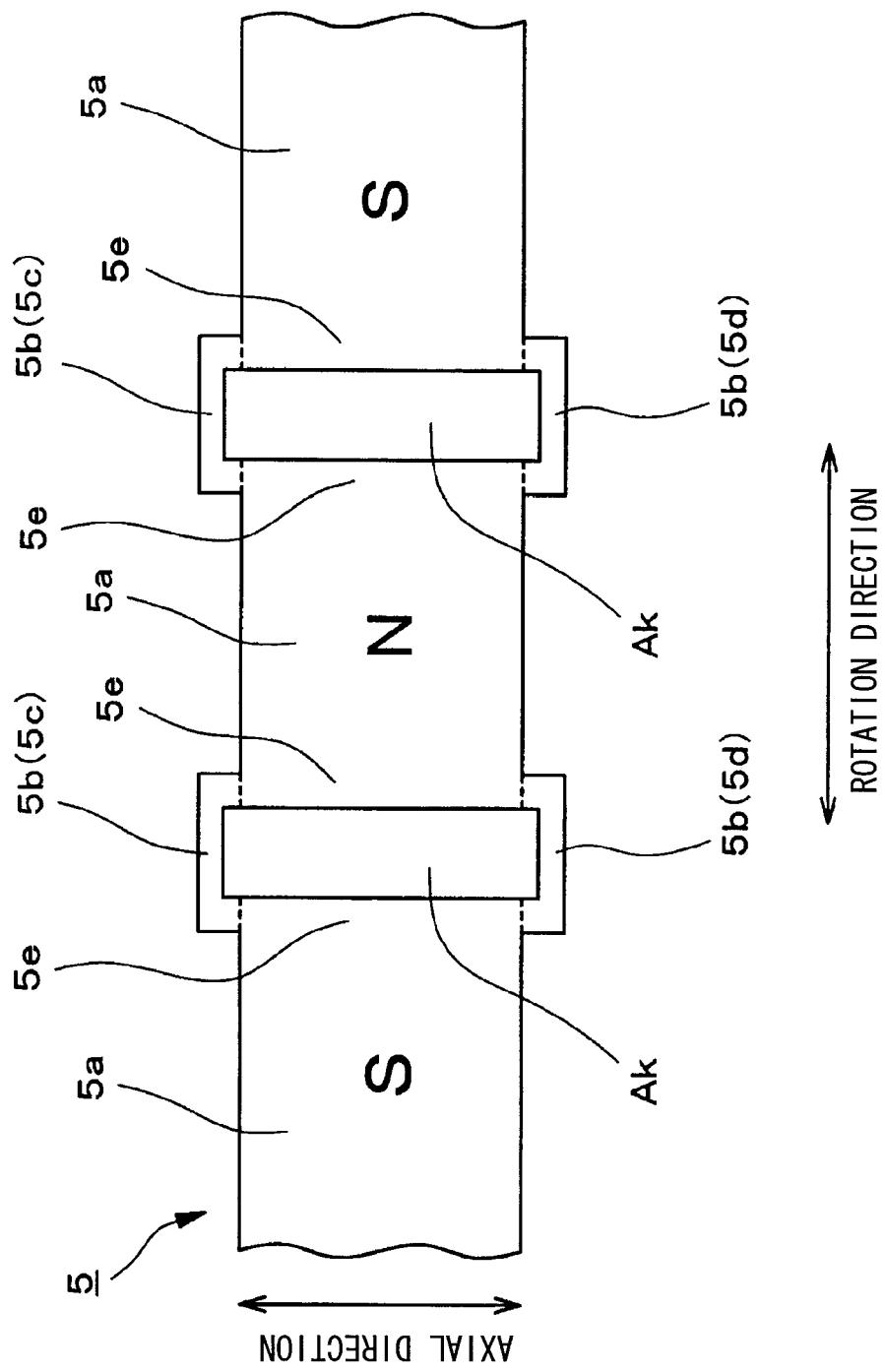
FIG. 16 is a developed view showing a magnetic-flux guide portion according to the sixth embodiment.
Figure 17:
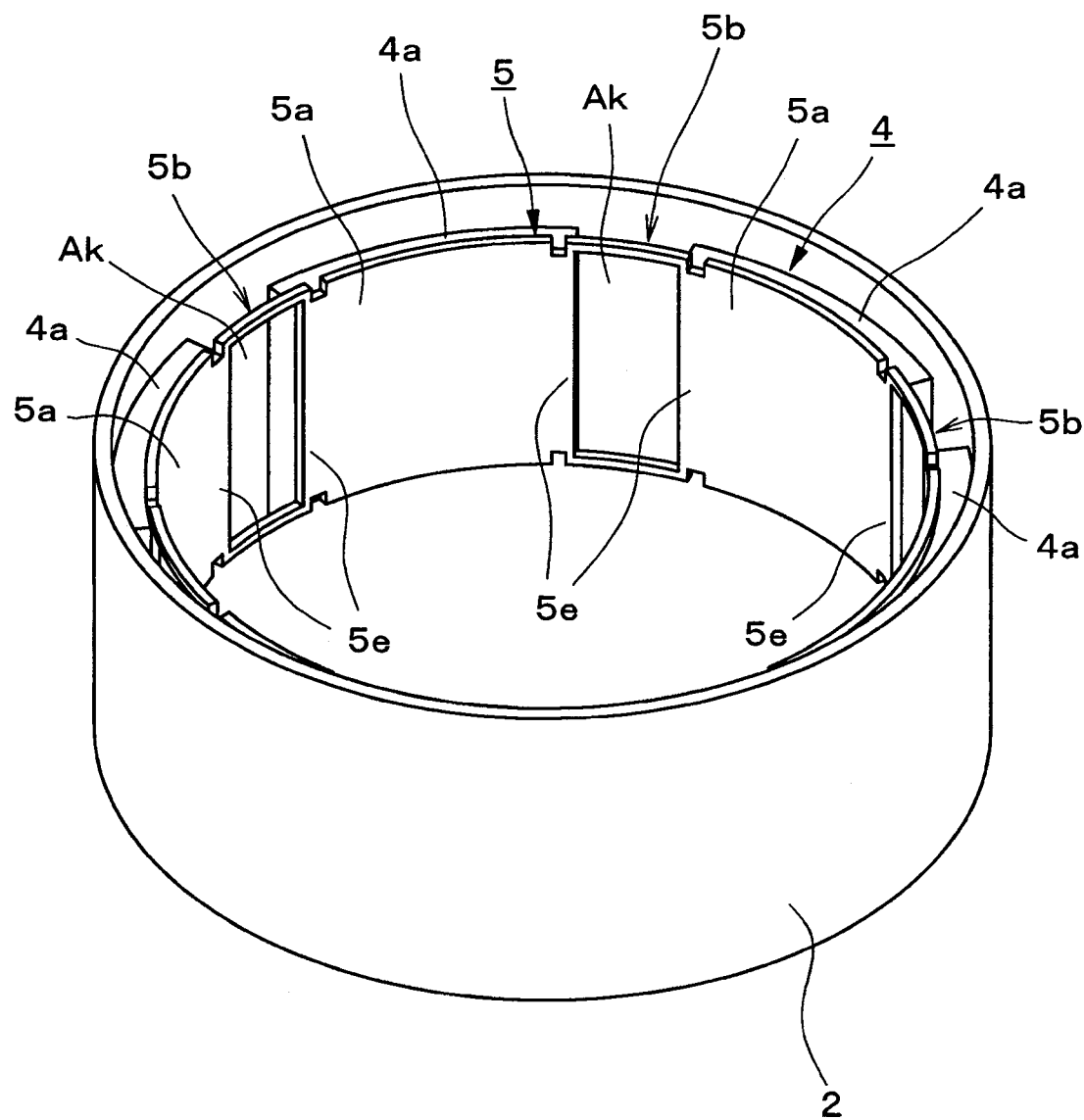
FIG. 17 is a perspective view of a magnet yoke according to a modification of the sixth embodiment.
Figure 18:
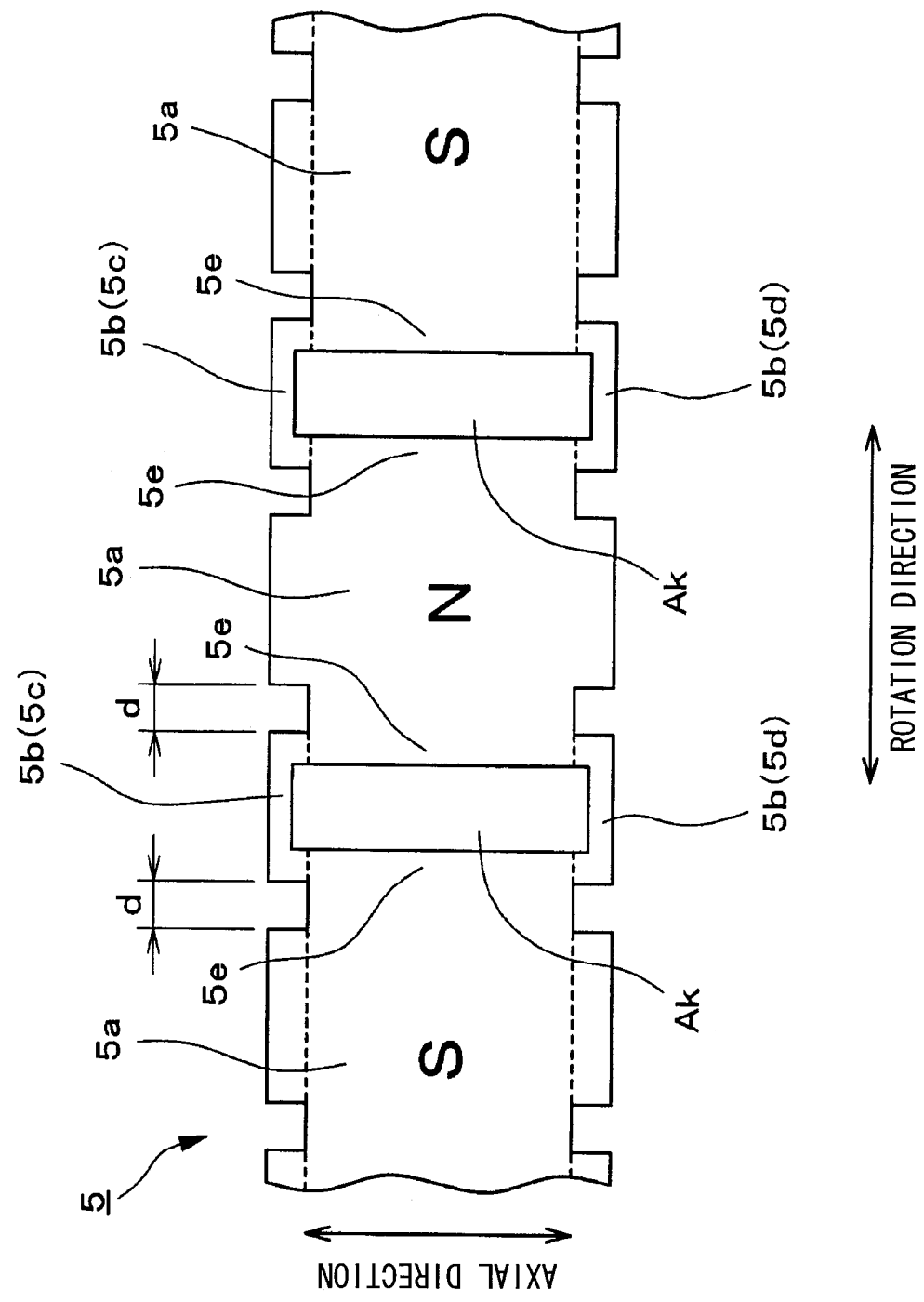
FIG. 18 is a developed view showing a magnetic-flux guide portion according to the modification shown in FIG. 17.

According to the sixth embodiment, the connecting portion 5b is configured as follows in order to reduce the magnetic flux leakage. Referring to FIGS. 15 to 18, a shape of the magnetic-flux guide ring 5 will be described. FIG. 15 is a perspective view of a magnet yoke according to the sixth embodiment. FIG. 16 is a developed view showing a magnetic-flux guide portion according to the sixth embodiment. FIG. 17 is a perspective view of a magnet yoke according to a modification of the sixth embodiment. FIG. 18 is a developed view showing a magnetic-flux guide portion according to the modification shown in FIG. 17.

As shown in FIGS. 15 and 16, the magnetic-flux guide ring 5 has the connecting portion 5b which connects adjacent confronting portions 5a. The axial length of the confronting portion 5a is substantially equal to that of the magnet piece 4a.

The connecting portion 5b is comprised of a first connecting portion 5c and a second connecting portion 5d which are located axially outside of the magnet pieces 4a. Specifically, the first and the second connecting portion 5c and 5d are U-shaped. Both edge portions of the confronting portion 5a are defined as adjacent regions 5e to which the connecting portions 5c and 5d are connected. That is, these adjacent regions 5e locate at both ends of the confronting portion 5a in the rotation direction of the armature 3.

The magnetic-flux guide ring 5 has an aperture "Ak" between adjacent confronting portions 5a. In other words, the adjacent confronting portions 5a and the first and second connecting portions 5a (5c, 5d) define the aperture "Ak". An end line of each of the adjacent regions 5e in the axial direction is located on an end line of the magnet piece 4a in the axial direction. The both end lines of the aperture "Ak" in the axial direction is located outside of the magnet piece 4a in the axial direction.

As described above, according to the sixth embodiment, the connecting portion 5b is located axially outside of the magnet piece 4a. Thus, the length of the connecting portion 5b becomes longer. That is, the magnetic resistance of the connecting portion 5b becomes greater. It can be restricted that the magnetic flux flows into the connecting portion 5a from the confronting portion 5a. The magnetic flux leakage can be restricted.

The above described magnetic-flux guide ring 5 is formed by punching a ring-shaped material having wide portions at regular intervals. The aperture "Ak" is formed in the wide portions by punching. The connecting portions 5b have widths sufficient to keep the magnetic-flux guide ring 5 in a ring-shape.

Alternatively, as shown in FIGS. 17 and 18, the magnetic-flux guide ring 5 is formed by punching a wide ring material. After the aperture "Ak" is formed by punching, the both sides of the connecting portion 5b are removed. The remaining portion has the same axial length as the magnet pieces 4a. As shown in FIG. 18, the remove portion has a width "d" in the rotation direction, and the width "d" is preferably more than double of an air gap, which is a clearance gap between the stator and the rotor.

Seventh Embodiment

Figure 19:
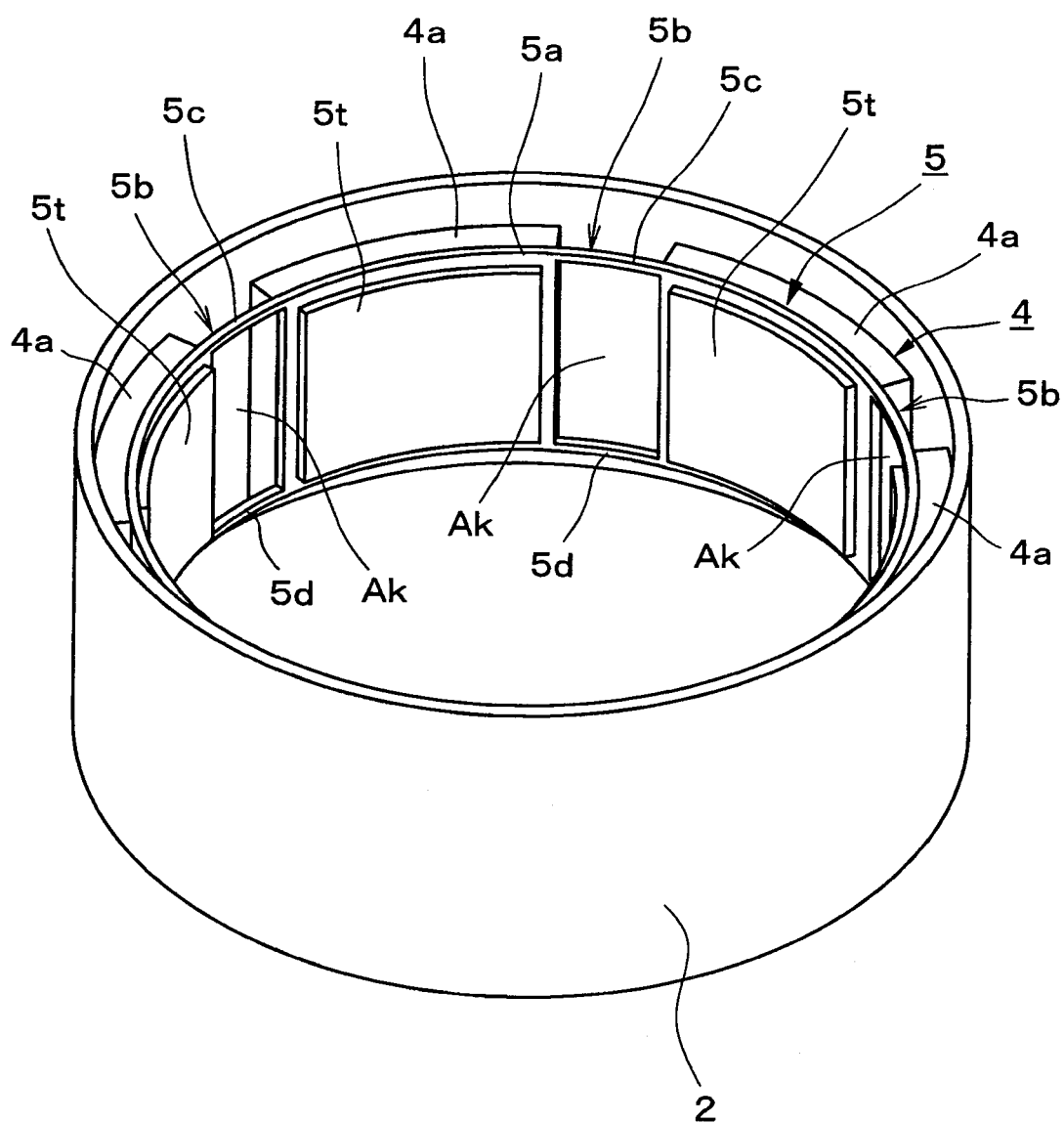
FIG. 19 is a perspective view of a magnet yoke according to a seventh embodiment.

FIG. 19 is a perspective view of a magnet yoke according to the seventh embodiment. As shown in FIG. 19, the confronting portion 5a has a protruding portion 5t on its inner surface. This protruding portion 5t protrudes radially inward and has a rectangular shape. The magnet piece 4a is located radially outside of the protruding portion 5t.

Since the protruding portion 5t is close to the armature core 12, the magnetic flux is effectively introduced into the armature core 12 from each of the magnet pieces 4a. It is preferable that the axial length of the protruding portion 5t is substantially equal to the axial length of the armature core 12.

Figure 20:
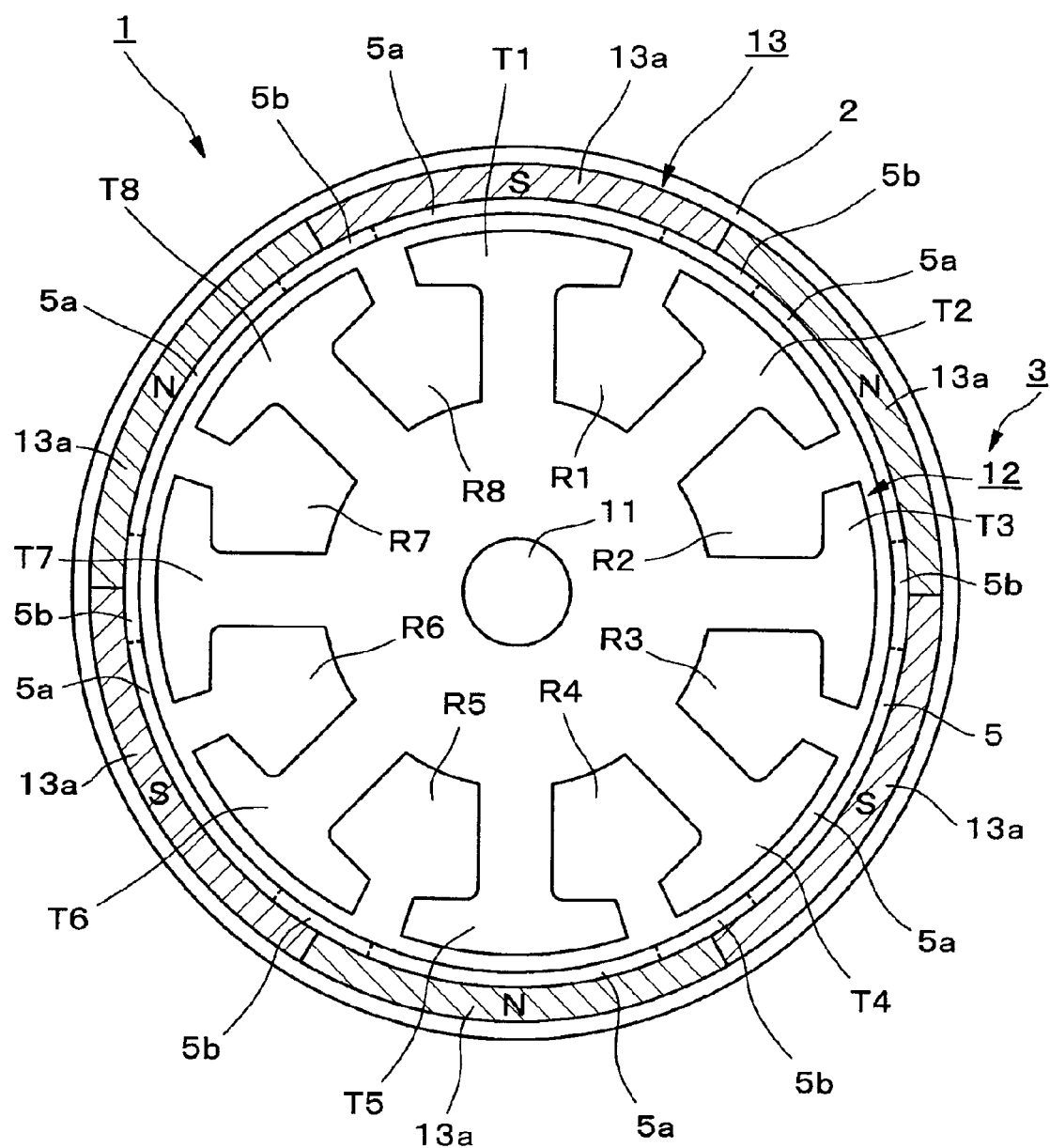
FIG. 20 is a plan view of a magnet ring.
Figure 21:
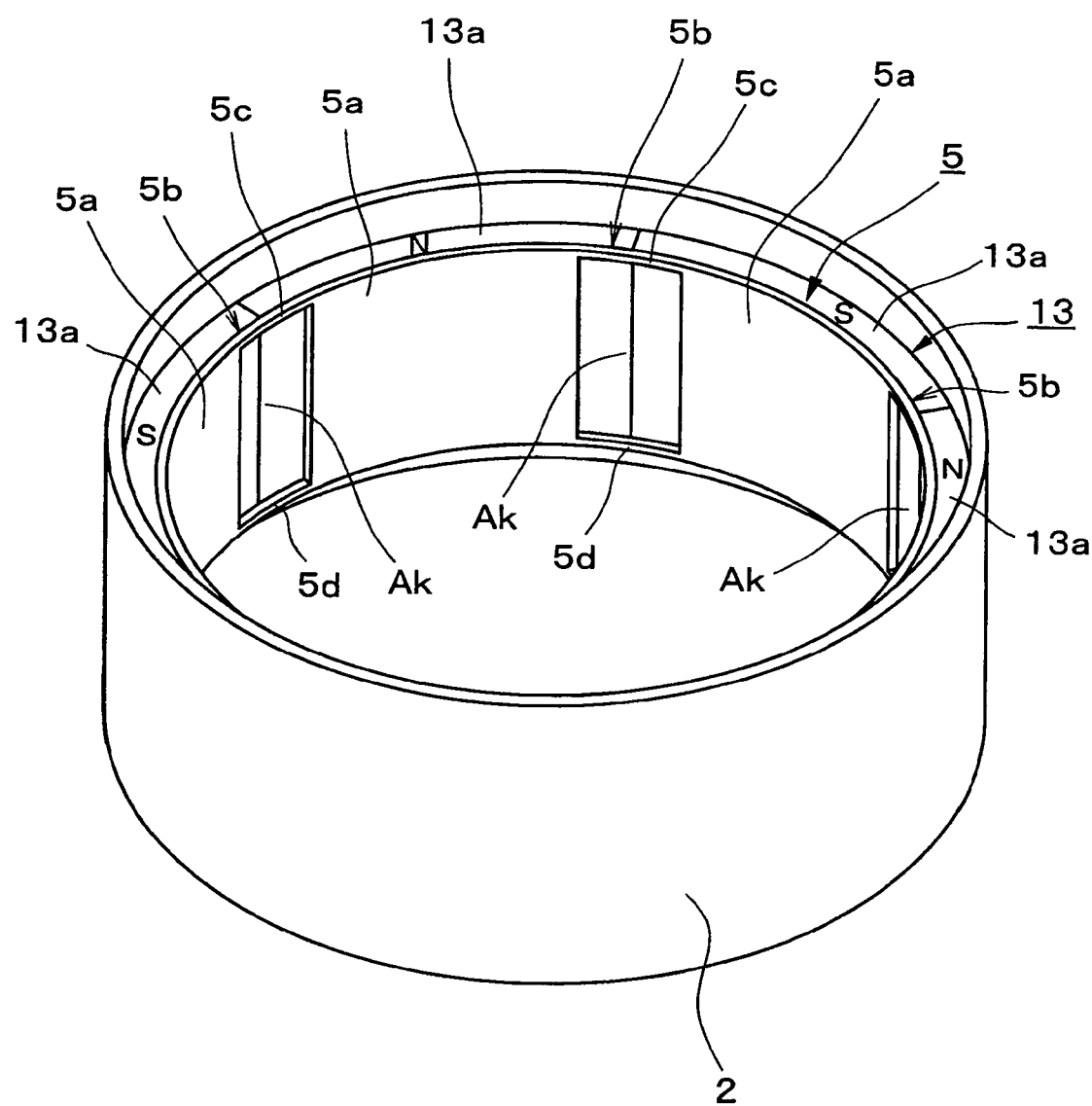
FIG. 21 is a perspective view of the magnet ring.

FIGS. 20 and 21 show another modification. As shown in FIGS. 20 and 21, the stator 13 is configured by a magnetic ring.

The magnetic ring (stator 13) has a magnetic region 13a of N-pole and a magnetic region 13a of S-pole, which are formed alternately in the circumferential direction (rotation direction of the armature 3). The magnetic-flux guide ring 5 can be provided to the above configuration. When providing the magnetic-flux guide ring 5, the aperture "Ak" is positioned in such a manner as to confront a boundary of the S-pole region and N-pole region of the magnet ring 13.

In the above embodiments, the motor 1 has the armature core 12 as a rotor and the permanent magnet 13 as stator. The armature core 12 is arranged inside of the permanent magnet 13. In the following embodiment, the motor has an armature core as a stator and a permanent magnet as a rotor. The armature core is arranged outside of the permanent magnet.

Eighth Embodiment

Figure 22:
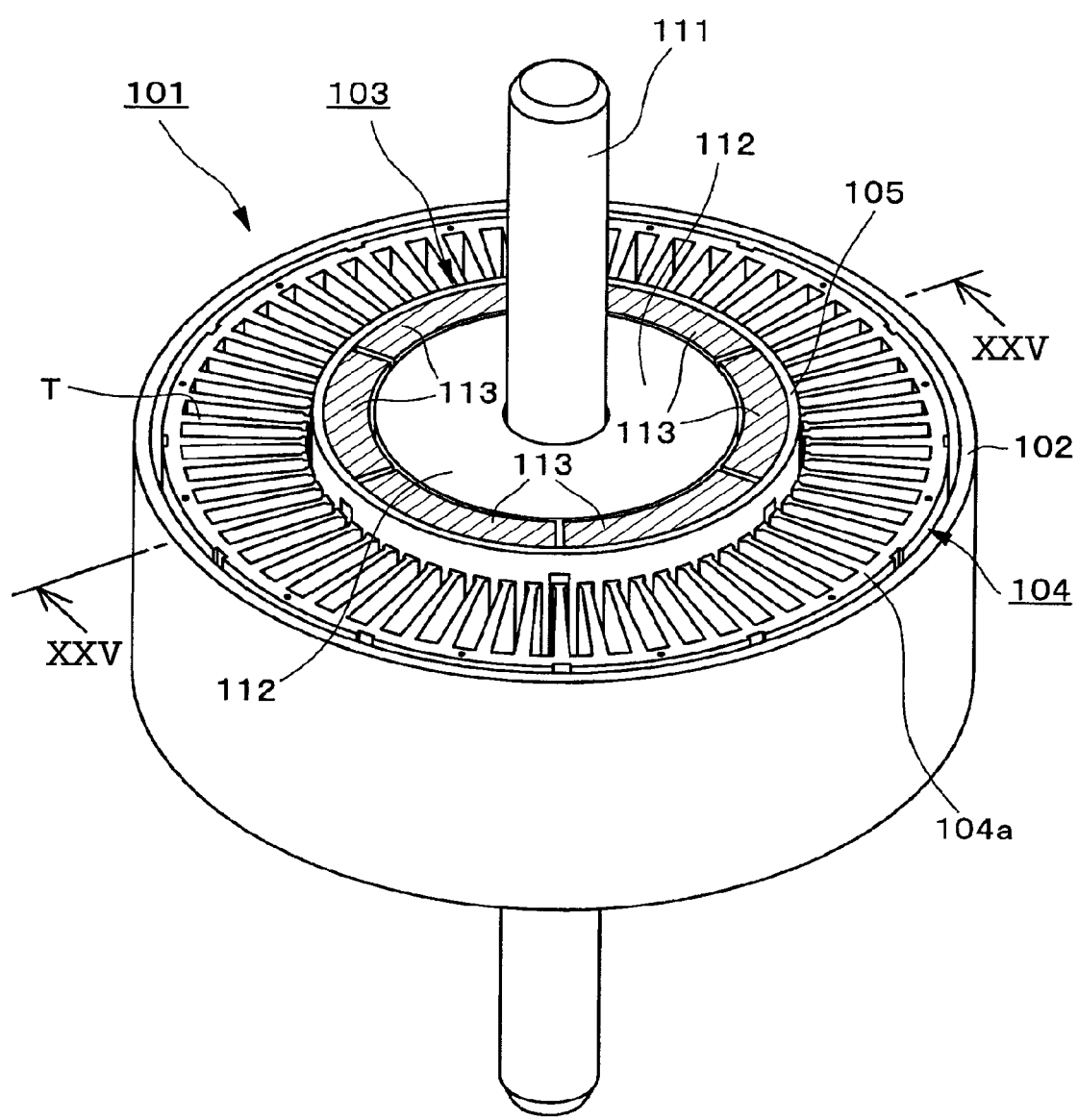
FIG. 22 is a perspective view of a motor according to an eighth embodiment.
Figure 23:
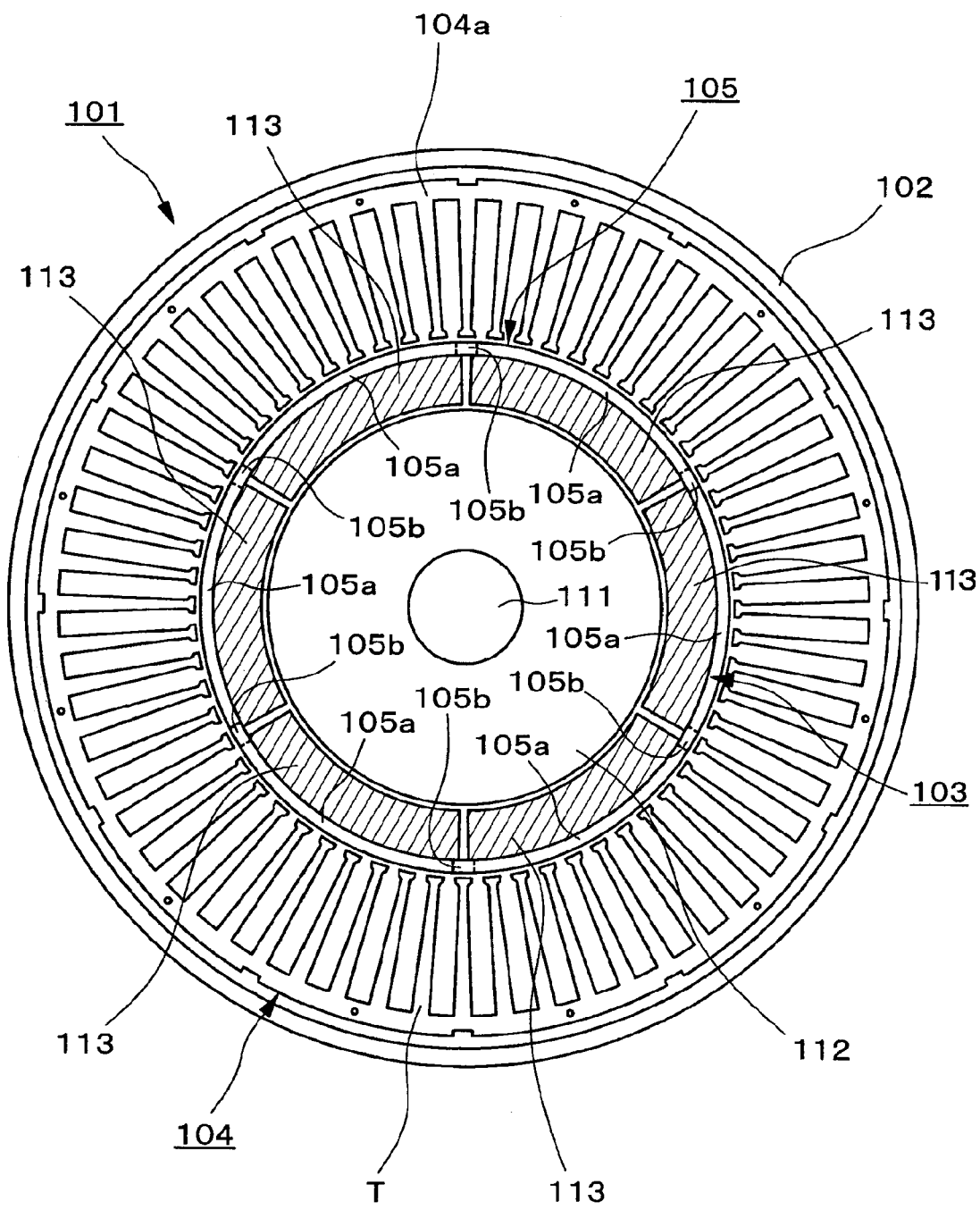
FIG. 23 is a plan view of a magnet yoke.
Figure 24:
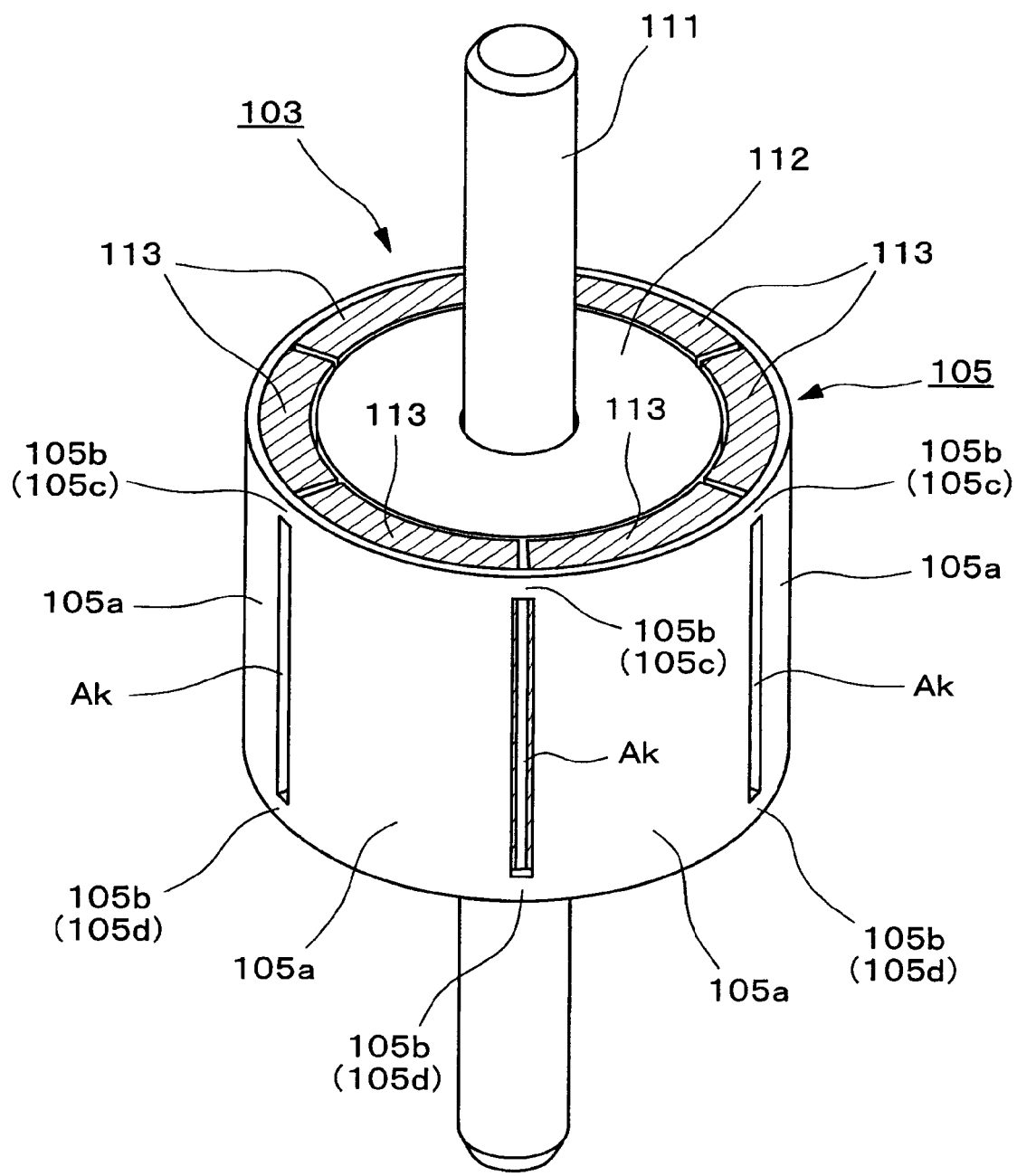
FIG. 24 is a perspective view of a rotor according to the eighth embodiment.
Figure 25:
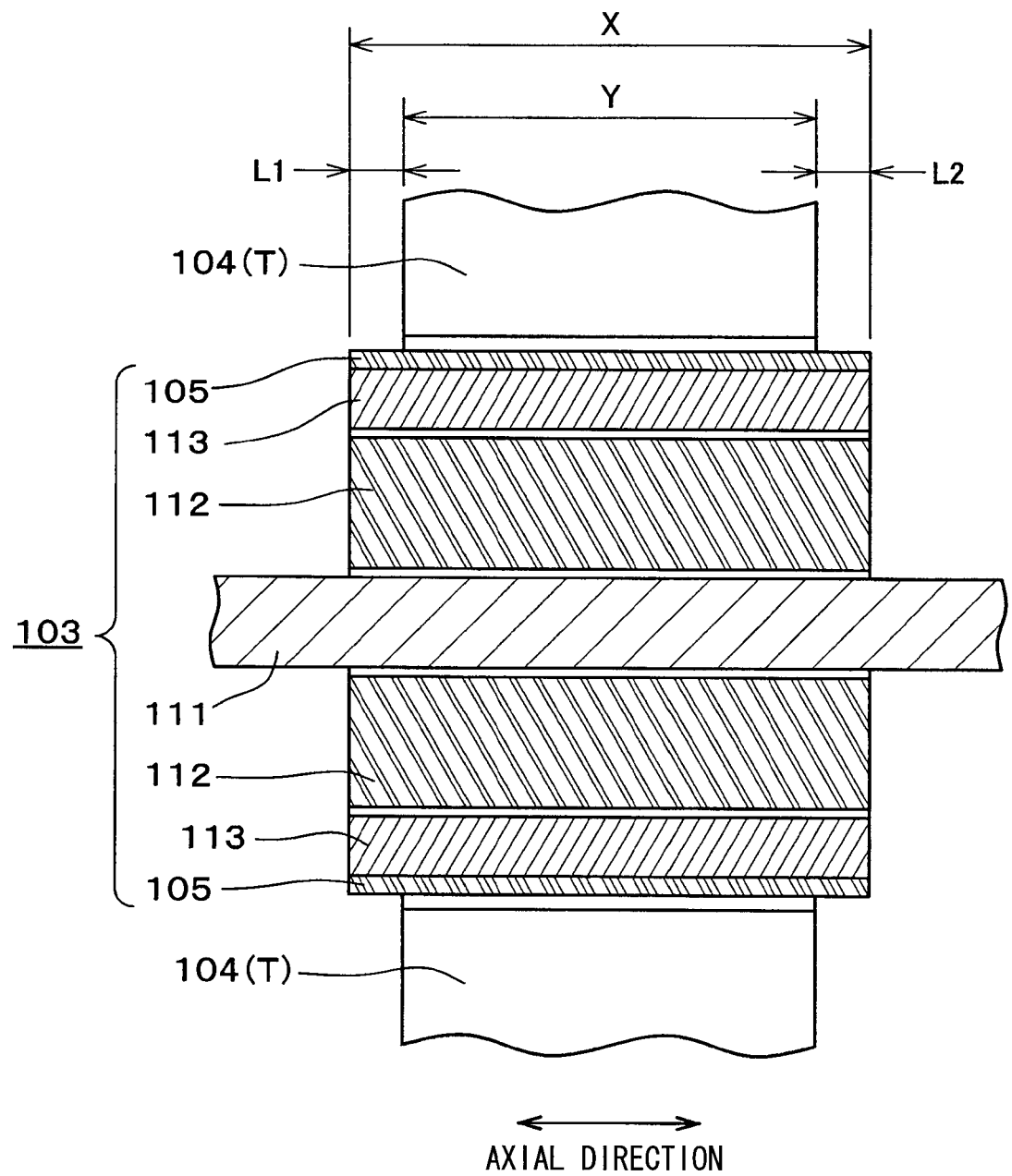
FIG. 25 is a cross sectional view taken along a line XXV-XXV of FIG. 22.

Referring to FIGS. 22 to 22A, a configuration of a motor 101 will be described. FIG. 22 is a perspective view of a motor 101 according to an eighth embodiment. FIG. 23 is a plan view of a magnet yoke. FIG. 24 is a perspective view of a rotor according to the eighth embodiment. FIG. 25 is a cross sectional view taken along a line XXV-XXV of FIG. 22. FIG. 26A is a developed view showing a magnetic-flux guide portion according to the eighth embodiment. It should be noted that a coil wound around the teeth is not shown in FIGS. 22 and 23.

The motor 101 is a brushless DC for an automobile. The configuration of the motor 101 is the same as a well known brushless motor except a magnetic-flux guide ring 105, which will be described later.

That is, the motor 101 has a cylindrical housing case 102 in which a rotor 103 and a stator core 104 as an armature core are accommodated. Furthermore, a plurality of magnet pieces 113 is arranged circumferentially on a cylindrical portion 112 of the rotor 103. Besides, the shape and the arrangement of the magnet pieces 113 are not limited to this.

The rotor 103 is arranged in a center portion in a radial direction of the housing case 102. As shown in FIGS. 22 and 23, the rotor 103 includes a shaft 111 and the cylindrical portion 112. The shaft 111 corresponds to an output shaft of the motor 101. The rotation direction of the shaft corresponds to the rotation direction of the rotor 103. The cylindrical portion 112 is supported by the shaft 11 to rotate therewith.

As mentioned above, a plurality of magnet pieces 113 are disposed on an outer surface of the cylindrical portion 112. The magnet pieces 113 generate magnetic flux toward the stator core 104 so that the rotor 103 rotates in the housing case 102. The magnet pieces 113 are arranged in such a manner that the N-pole and the S-pole alternately appear in the circumferential direction.

In the present embodiment, the magnet pieces 113 are arranged in regular intervals with a space therebetween.

The stator core 104 is arranged in the housing case 102 and is located outside of the magnet pieces 113 in such a manner as to surround the rotor 103. As shown in FIGS. 22 and 23, the stator core 104 has a plurality of teeth "T" and an outer ring portion 104a. Each of the teeth "T" is T-shaped and radially protrudes toward the rotor 103. Tip ends of the teeth "T" are arranged in such a manner as to surround the rotor 103. A coil (not shown) is wound around each of the teeth "T". When the coil is energized, the rotor 103 starts to rotate.

The number of the teeth "T" can be arbitrarily established.

An axial length of the magnet pieces 113 is longer than that of the stator core 104. As shown in FIG. 25, each of the magnet pieces 113 confronts the stator core 104. Both ends of the magnet piece 113 are located outside of the stator core 104 in its axial direction. The stator core 104 is formed by laminating a plurality of core sheets seats in such a manner that the axial laminating length of the stator core 104 is not greater than the axial length of the magnet pieces 113.

As shown in FIG. 25, a length L1 of the magnet piece 113 located outside of the stator core 104 in one direction is substantially equal to a length L2 of the magnet piece 113 located outside of the stator core 104 in another direction Besides, the axial length of the magnet piece 113 may be equal to the axial length of the stator core 104, or may be shorter than the axial length of the stator core 104.

A magnetic-flux guide ring 105 is provided in the housing case 102. This magnetic-flux guide ring 105 corresponds to a magnetic-flux guide portion and is arranged between the magnet pieces 113 and the stator core 104, whereby the magnetic flux can be easily introduced into the stator core 104 from the magnet pieces 113.

The magnetic-flux guide ring 105 has the same function as the magnetic-flux guide ring 5 in the first to the seventh embodiments. Further, since the magnetic-flux guide ring 105 covers the magnet pieces 113, the magnetic-flux guide ring 105 functions as a protector for the magnet pieces 113. The magnetic-flux guide ring 105 is made of soft magnetic materials by compression molding of soft magnetic material powder.

The magnetic-flux guide ring 105 is fixed on an inner surface of each magnet piece 113, whereby each of the magnet pieces 113 is protected, the magnetic flux from each magnet pieces 113 is uniformized and an anti-demagnetization can be improved. Besides, the magnetic-flux guide ring 105 may be fixed on the magnet pieces 113 with adhesive agent or other fixing member, such as a bolt nut.

Although the both ends of the magnet pieces 113 are located outside of the stator core 104 as described above, the magnetic-flux guide ring 105 introduces the magnetic flux into the stator core 104 from both ends of the magnetic pieces 4a.

Since the magnetic-flux guide ring 105 is a single piece, the number of parts can be reduced. The magnetic-flux guide ring 105 can be easily assembled to the motor 101.

The other configuration and advantages of the magnetic-flux guide ring 105 are substantially the same as the magnetic-flux guide ring 5 in the first embodiment.

The axial length of the magnetic-flux guide ring 105 is equal to that of the magnet pieces 113. The magnetic flux generated from the both ends of the magnet pieces 113 as well as the magnetic flux generated from center portion of the magnet pieces 113 are introduced into the stator core 104.

As shown in FIGS. 24 to 26A, the connecting portion 5b is comprised of a first connecting portion 105c and a second connecting portion 105d. Thus, it is restricted that the magnetic-flux guide ring 105 is twisted.

Further, a width of the first connecting portion 105c is substantially equal to a width of the second connecting portion 105d.

The widths d1, d2 of the first and the second connecting portion 105c, 105d are less than half of a difference between an axial length "X" of the magnet pieces 113 and an axial length "Y" of the stator core 104, as shown in FIG. 25. As long as the mechanical strength for connecting the confronting portions 105a is ensured, the width of the first and the second connecting portion 105c, 105d can be narrower. Thus, a leakage of the magnetic flux from the confronting portion 105a to the connecting portion 105b can be reduced.

The magnetic-flux guide ring 105 has an aperture "Ak" between the first connecting portion 105c and the second connecting portion 105d. An axial length "a" of the aperture "Ak" and the widths d1, d2 of the first and the second connecting portion 105c, 105d satisfy following formula (5):

$$G=X=a+d1+d2 \quad (5)$$

wherein "G" represents an axial length of the magnetic-flux guide ring 105.

Moreover, the axial length "a" of the aperture "Ak" is preferably greater than the length "Y" of the stator core 104.

The magnetic-flux guide ring 105 is fixed to the rotor 103 in such a manner as to locate between the magnet pieces 113 and the stator core 104. After the magnetic-flux guide ring 105 is fixed to the rotor 103, the confronting portion 105a overlaps with each of the magnet pieces 113, and the aperture "Ak" overlaps with a boundary of the adjacent magnet pieces 113. The magnetic flux is appropriately introduced from each of the magnet pieces 113 to the stator core 104.

Since the aperture "Ak" overlaps with a boundary of the adjacent magnet pieces 113, it is restricted that the magnetic flux leaks into the connection portion 105b.

In the above embodiments, the aperture "Ak" is formed by punching the magnetic ring material. Instead of forming the aperture "Ak" by punching, the area corresponding to the aperture "Ak" may be made from non-magnetic material. That is, as shown in FIG. 26B, the magnetic-flux guide ring 105 has an intermediate portion 105e between the connecting portions 105c and 105d. The magnetic-flux guide ring 105 is made from soft magnetic material, and only the intermediate portion 105e is non-magnetized by thermal treatment. FIG. 26B is a developed view showing a magnetic-flux guide portion according to a modification of the eighth embodiment.

Since the magnetic-flux guide rings 105 is attached to the rotor 103 so that the intermediate portion 105e overlaps with the clearance between adjacent magnet pieces 113, it is well restricted that the magnetic flux flows into other than the confronting portion 105a. Moreover, since it is unnecessary to punch or cut the ring material, the magnetic-flux guide ring 105 can be easily obtained. The mechanical strength of the magnetic-flux guide ring 105 can be also maintained.

Ninth Embodiment

Figure 27:
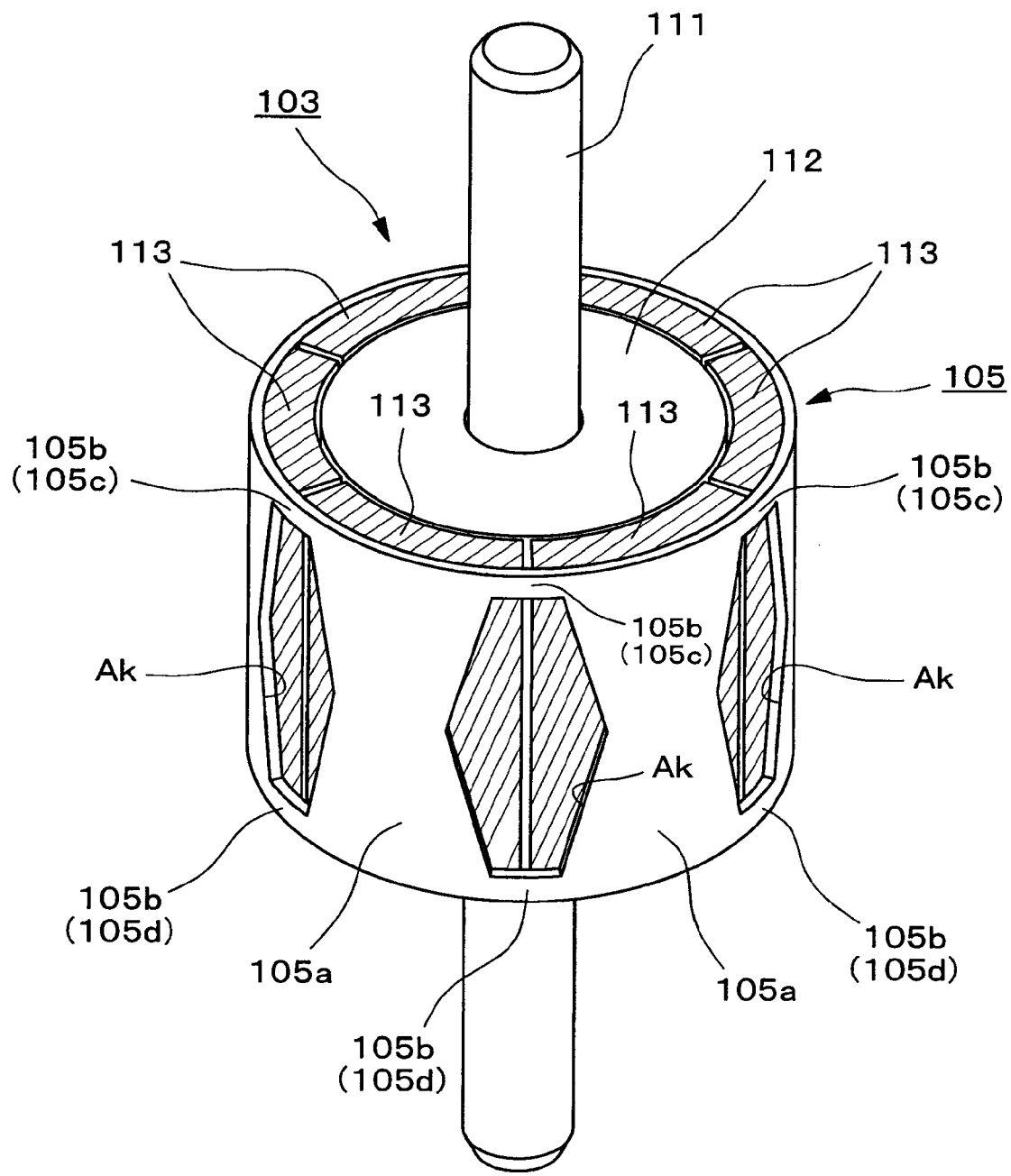
FIG. 27 is a perspective view of a rotor according to a ninth embodiment.
Figure 28:
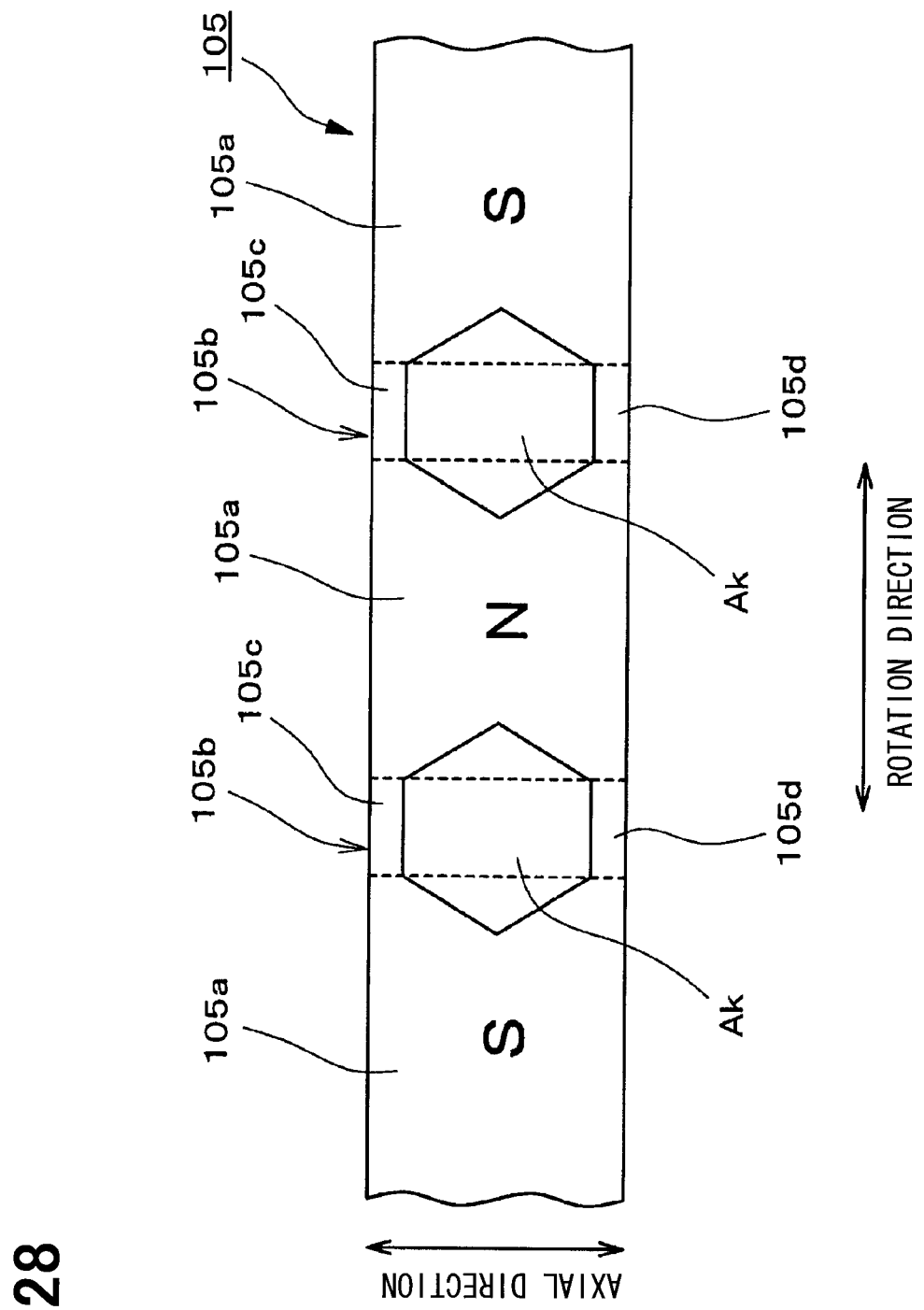
FIG. 28 is a developed view showing a magnetic-flux guide portion according to the ninth embodiment.

In a ninth embodiment, a shape of the aperture "Ak" is different from the eighth embodiment. Referring to FIGS. 27 and 28, a shape of the aperture "Ak" will be described. FIG. 27 is a perspective view of a rotor according to the ninth embodiment. FIG. 28 is a developed view showing a magnetic-flux guide portion according to the ninth embodiment.

The aperture "Ak" is hexagon. As shown in FIG. 28, the shape of the aperture "Ak" is a hexagon which is obtained by shrinking a regular hexagon in the rotation direction. A diagonal line connecting an end apex and another end apex in the rotation direction is orthogonal to a center line of the shaft 111.

An axial length of the aperture "Ak" becomes longer from the first and the second apex to a center portion of the aperture "Ak". In other words, the opening area of the aperture "Ak" gradually changes from the both apexes toward its center.

The magnetic flux passing through the magnetic-flux guide ring 105 is also changed along a rotation direction of the motor 101, whereby a function of skew is obtained. The function of skew can restrict a magnetic variation along with a rotation of motor 101, so that vibrations (cogging) and noises can be restricted.

As long as the axial length of the aperture "Ak" becomes longer from the first and the second apex to a center portion of the aperture "Ak", the shape of the aperture "Ak" is not limited to the hexagon shown in FIGS. 26 and 27.

Tenth Embodiment

Figure 29:
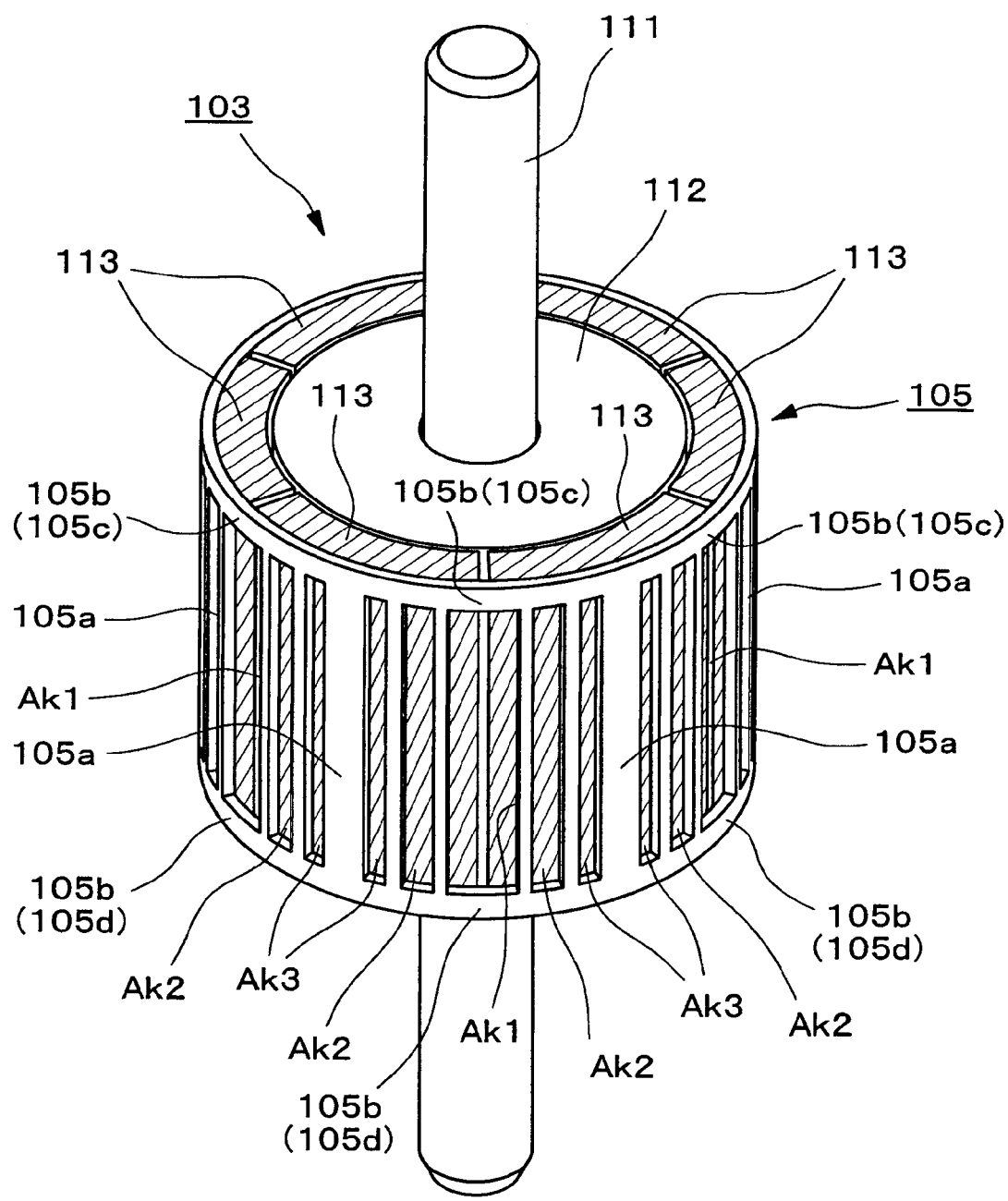
FIG. 29 is a perspective view of a rotor according to the tenth embodiment.
Figure 30:
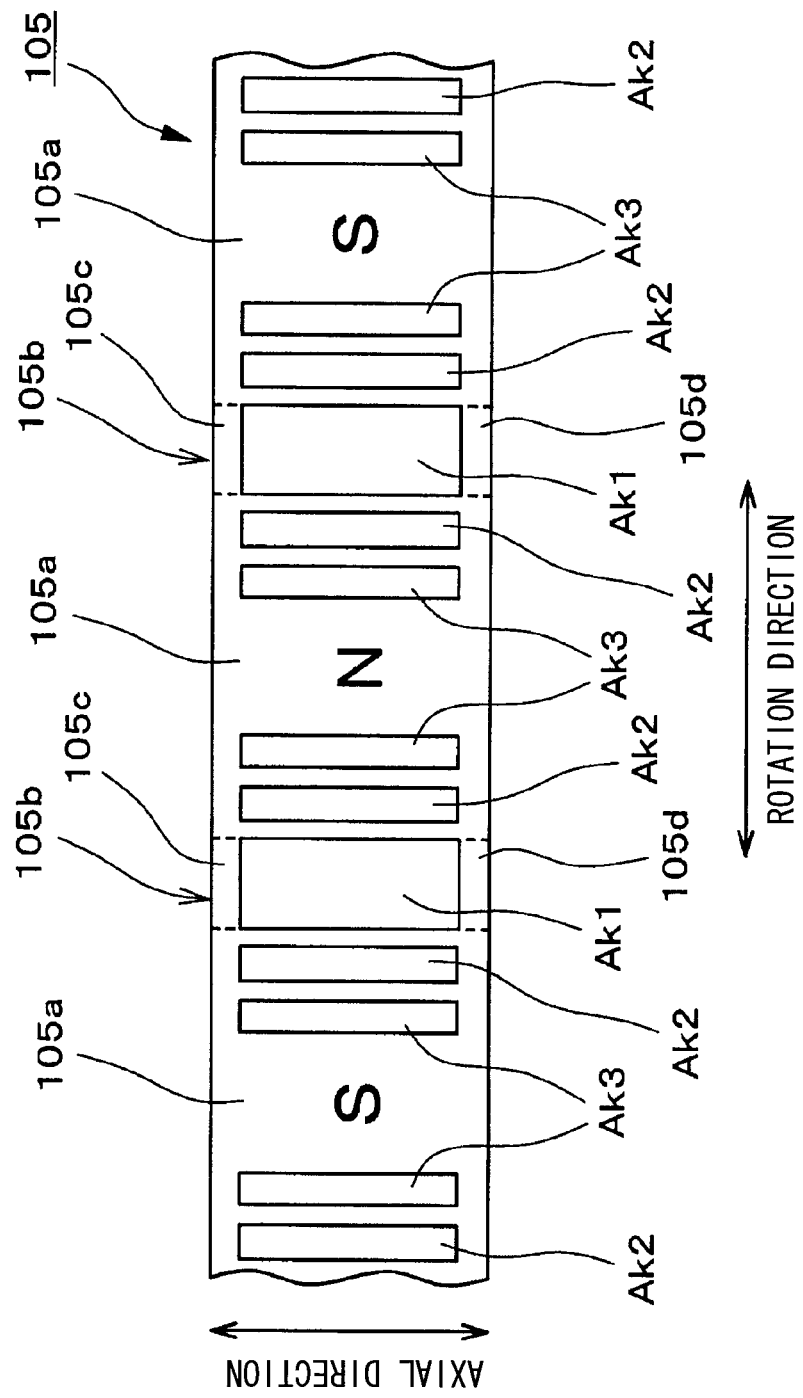
FIG. 30 is a developed view showing a magnetic-flux guide portion according to the tenth embodiment.

According to a tenth embodiment, the magnetic-flux guide ring 105 has three kinds of apertures "Ak1", "Ak2", "Ak3" to obtain the above described effect of skew. Referring to FIGS. 29 and 30, shapes of the apertures "Ak1", "Ak2" and "Ak3" will be described. FIG. 29 is a perspective view of a rotor according to the tenth embodiment. FIG. 30 is a developed view showing a magnetic-flux guide portion according to the tenth embodiment.

As shown in FIG. 30, a first rectangular aperture "Ak1" is formed between the first connecting portion 105c and the second connecting portion 105d. Further, second rectangular apertures "Ak2" are formed adjacent to the first rectangular aperture "Ak1" in the rotation direction of the motor 101. A width of the second rectangular apertures "Ak2" in the rotation direction is narrower than that of the first rectangular aperture "Ak1".

Moreover, third rectangular apertures "Ak3" are formed adjacent to the second rectangular apertures "Ak2". A width of the third rectangular apertures "Ak3" in the rotation direction is narrower than that of the second rectangular aperture "Ak2".

As above, three kinds of apertures "Ak1", "Ak2", "Ak3" are aligned regularly in the rotation direction of the motor 101. Thus, the total opening area of the apertures is gradually changed along the rotation direction of the motor 101. The magnetic flux amount passing through the magnetic-flux guide ring 105 is gradually changed. As the result, the effect of skew is obtained. A magnetic variation along with a rotation of motor 101, vibrations (cogging) and noises can be restricted.

Eleventh Embodiment

Figure 31:
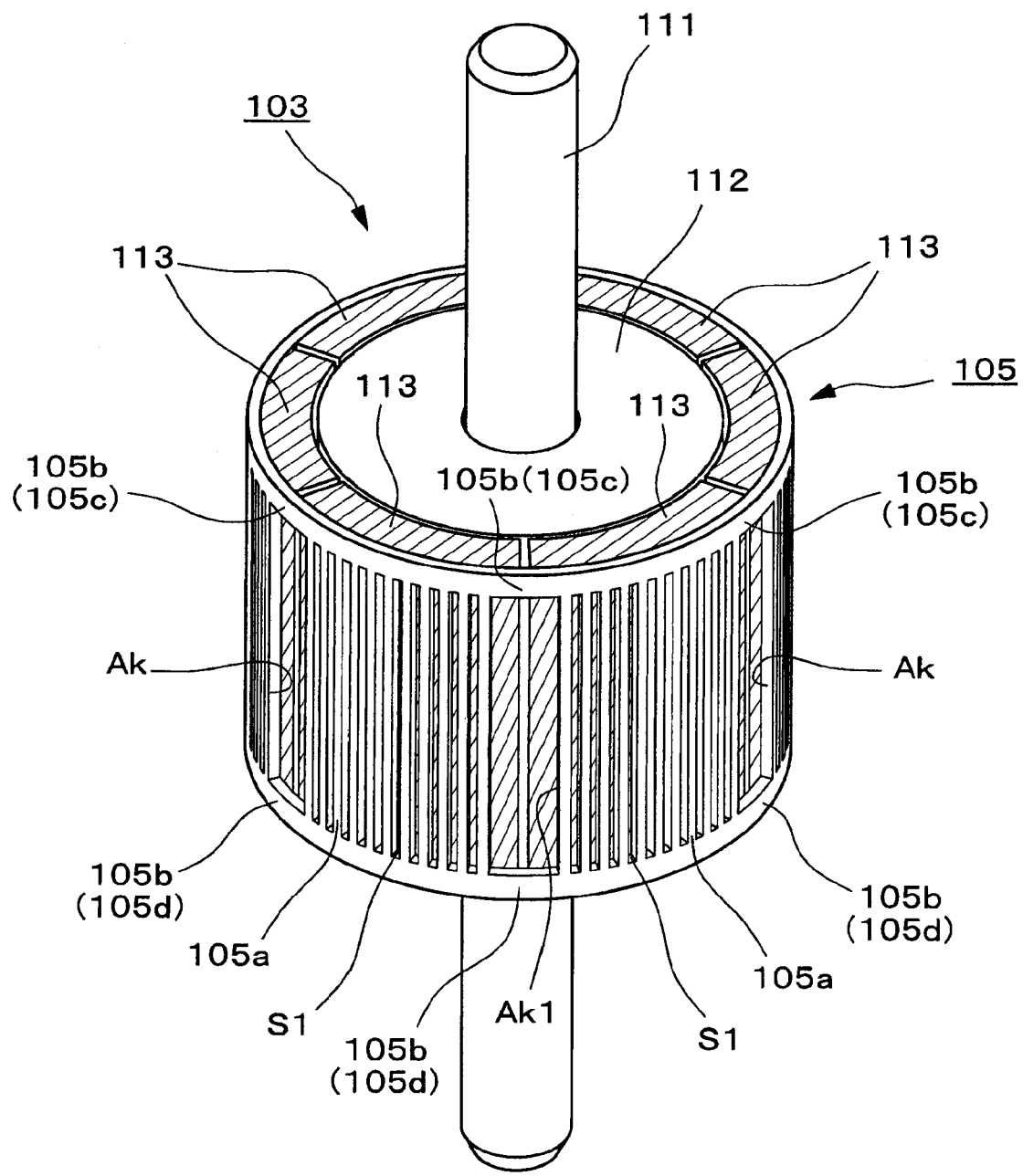
FIG. 31 is a perspective view of a rotor according to an eleventh embodiment.
Figure 32:
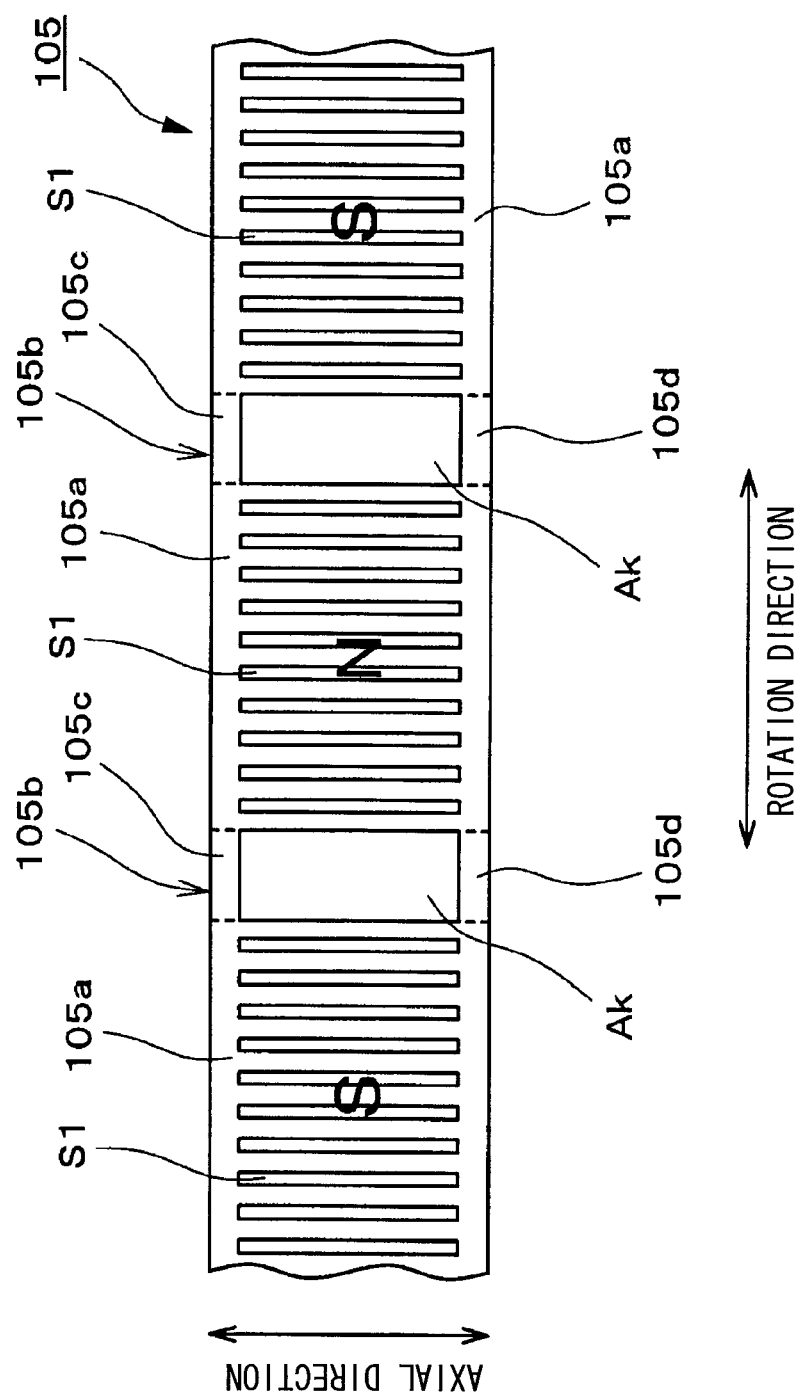
FIG. 32 is a developed view showing a magnetic-flux guide portion according to the eleventh embodiment.

According to an eleventh embodiment, the confronting portion 105a has a slit S1 to reduce its weight. Referring to FIGS. 31 and 32, a shape of the magnetic-flux guide ring 105 will be described. FIG. 31 is a perspective view of a rotor according to the eleventh embodiment. FIG. 32 is a developed view showing a magnetic-flux guide portion according to the eleventh embodiment.

Each of the confronting portions 105a has a rectangular slit "S1". The magnetic-flux guide ring 105 has the slit "S1" at the confronting portion 1055a. The rectangular slit "S1" extends in an axial direction of the shaft 111. This slit "S1" improves a rotation efficiency of the motor 101. In a similar way to the fourth embodiment, an eddy current path is intercepted by the slit "S1", so that the eddy current is reduced and the eddy current loss is also reduced.

As shown in FIGS. 31 and 32, as the number of the slit "S1" is more increased, the above advantage (eddy current path interception) becomes more effective. As long as the slit "S1" intercepts the eddy current path, the slit "S1" may be formed in such a manner as to extend in the rotation direction of the motor 101. That is, the slit "S1" may extends in the axial direction or the rotation direction.

Twelfth Embodiment

Figure 33:
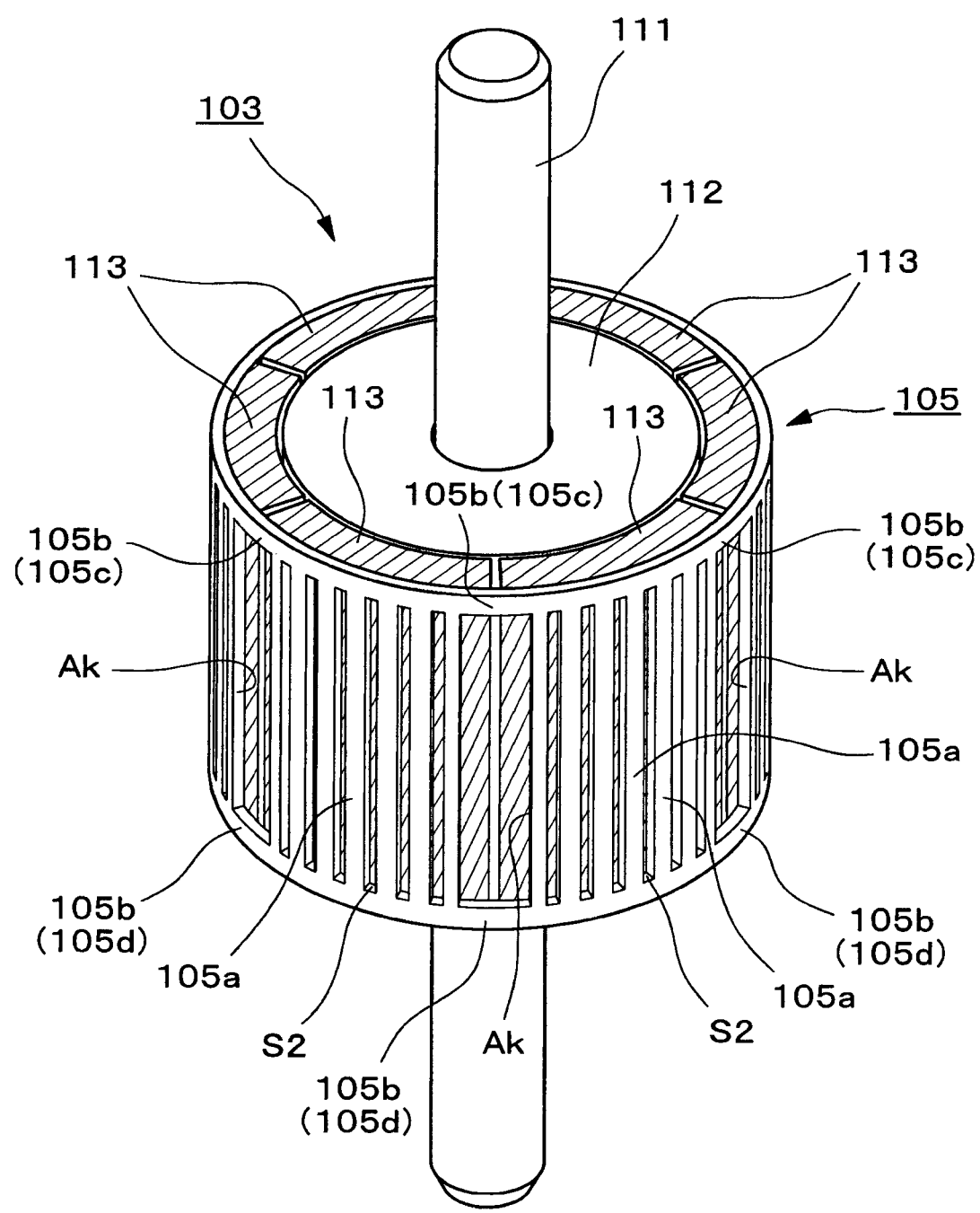
FIG. 33 is a perspective view of a rotor according to a twelfth embodiment.
Figure 34:
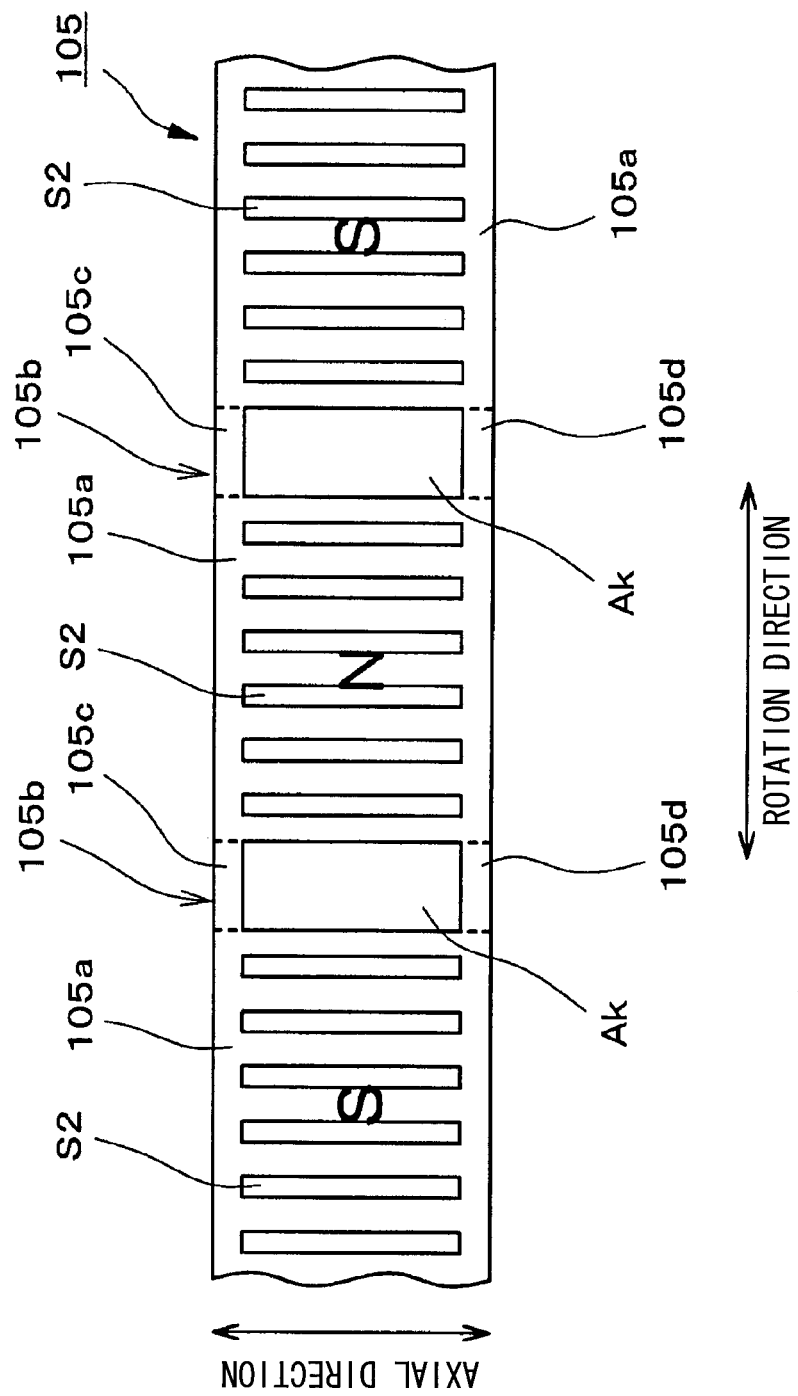
FIG. 34 is a developed view showing a magnetic-flux guide portion according to the twelfth embodiment.
Figure 35:
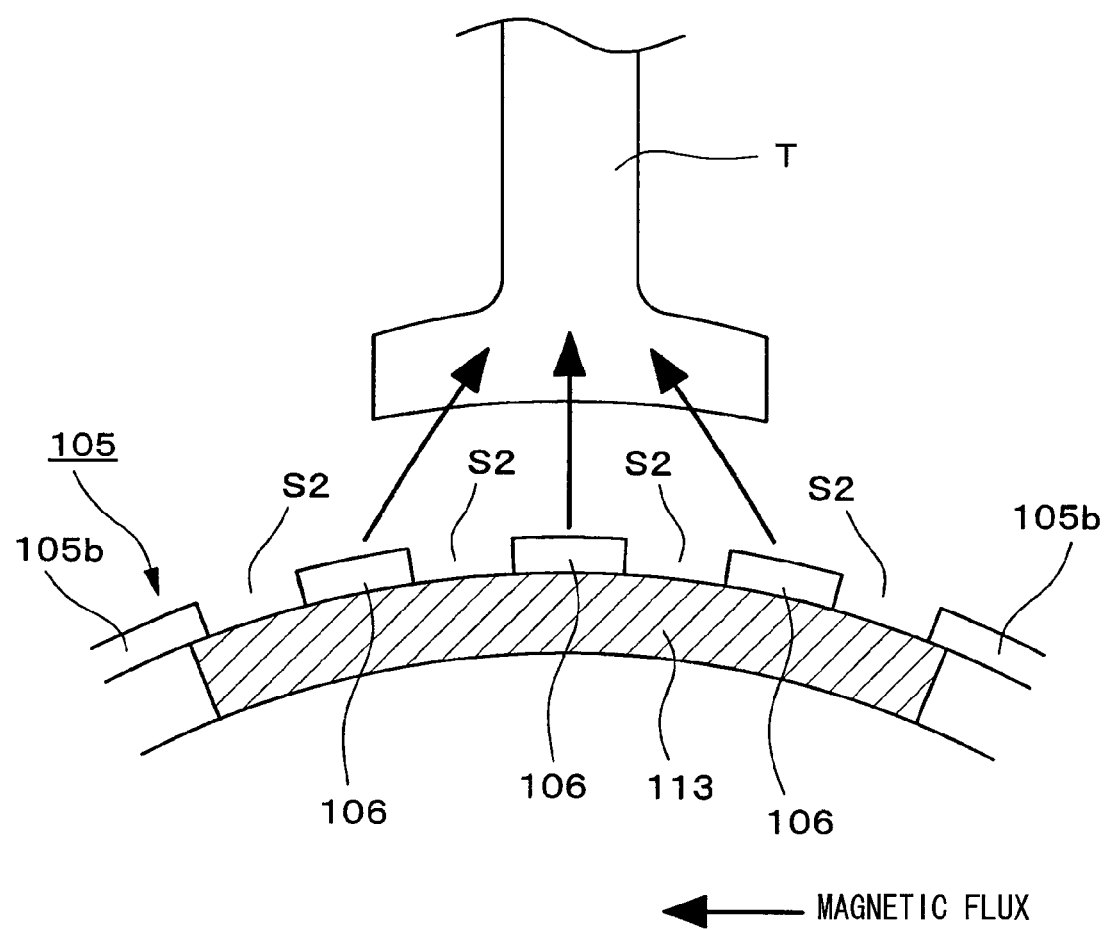
FIG. 35 is a chart for explaining an advantage of the twelfth embodiment.

As shown in FIGS. 33 and 34, a plurality of slits "S2" is formed in the confronting portion 105a at regular intervals along a rotation direction of the motor 101. Referring to FIGS. 33 to 35, a shape of the magnetic-flux guide ring 105 will be described. FIG. 33 is a perspective view of a rotor according to the twelfth embodiment. FIG. 34 is a developed view showing a magnetic-flux guide portion according to the twelfth embodiment. FIG. 35 is a chart for explaining an advantage of the twelfth embodiment.

As shown in FIGS. 33 and 34, a plurality of slits "S2" is formed in the confronting portion 105a at regular intervals along the axial direction of the shaft 111. That is, the magnetic-flux guide ring 105 has a plurality of slits "S2" and regular unevenness on its surface confronting the stator core 104. In this regular unevenness, convex portions function as salient poles 106 (refer to FIG. 35).

As above, according to the twelfth embodiment, the salient poles 106 are formed in the confronting portion 105a. The salient poles 106 are aligned in the rotation direction of the motor 101. These salient poles 106 have the same advantages as the salient pole 16 in the fifth embodiment. That is, as shown in FIG. 35, since the density of magnetic flux passing through the confronting portion 105a is made uniform, a magnetic balance in the motor 101 is improved, so that the vibration and the noise can be restricted.

Besides, as the salient pole 106 becomes taller, the mechanical strength of the salient pole 106 becomes greater and the magnetic flux quantity is more ensured.

Thirteenth Embodiment

Figure 36:
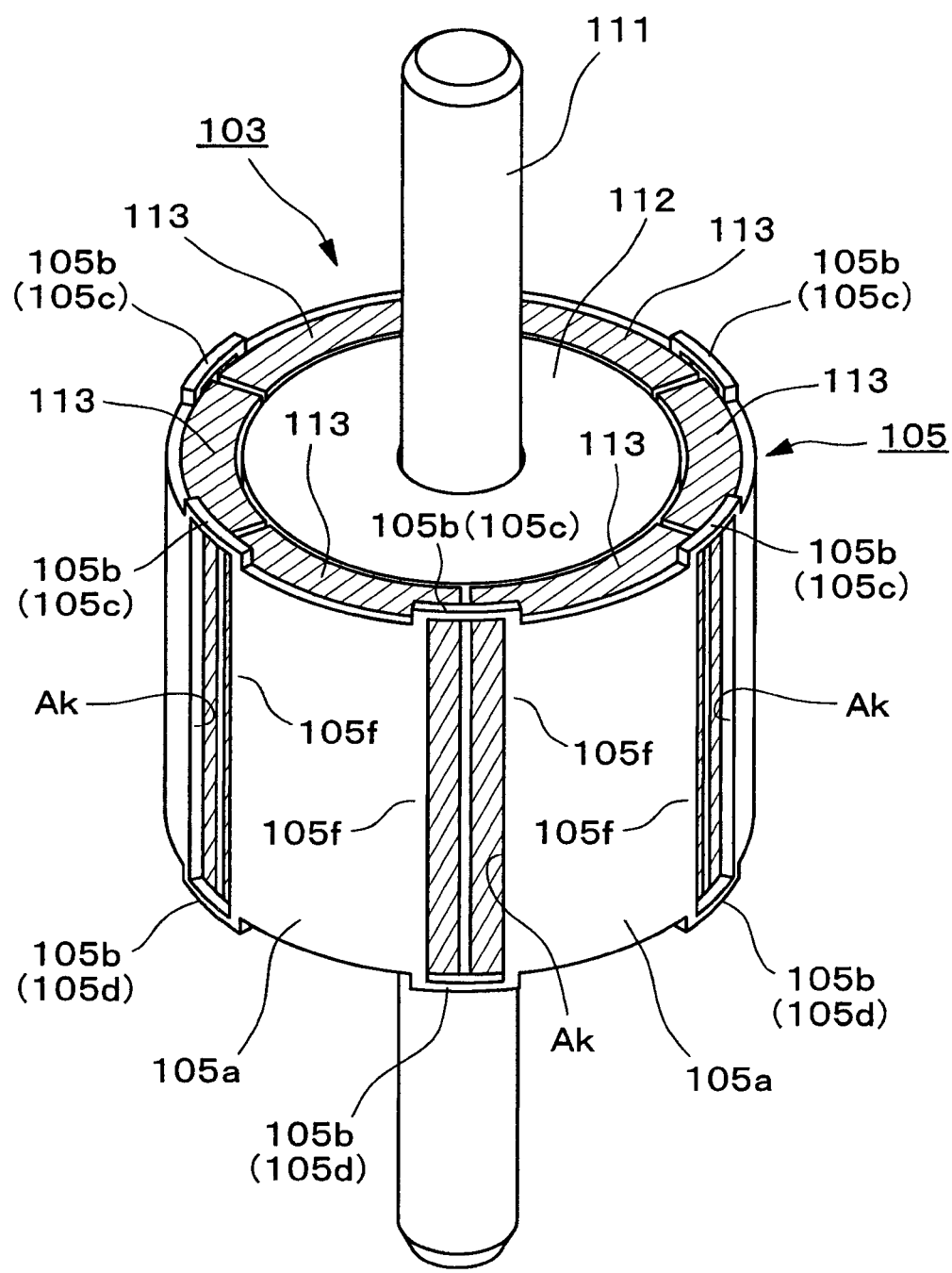
FIG. 36 is a perspective view of a rotor according to a thirteenth embodiment.
Figure 37:
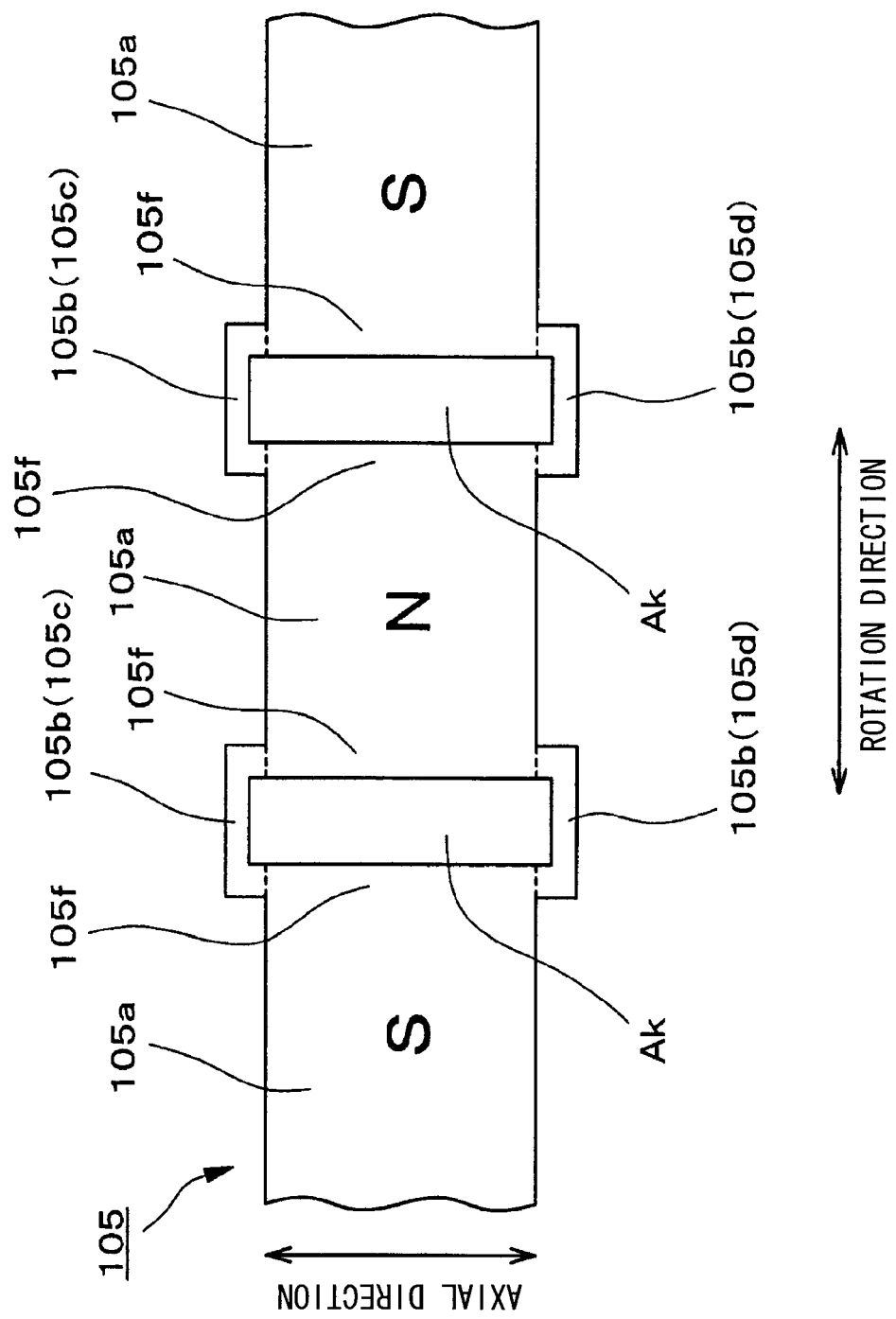
FIG. 37 is a developed view showing a magnetic-flux guide portion according to the thirteenth embodiment.
Figure 38:
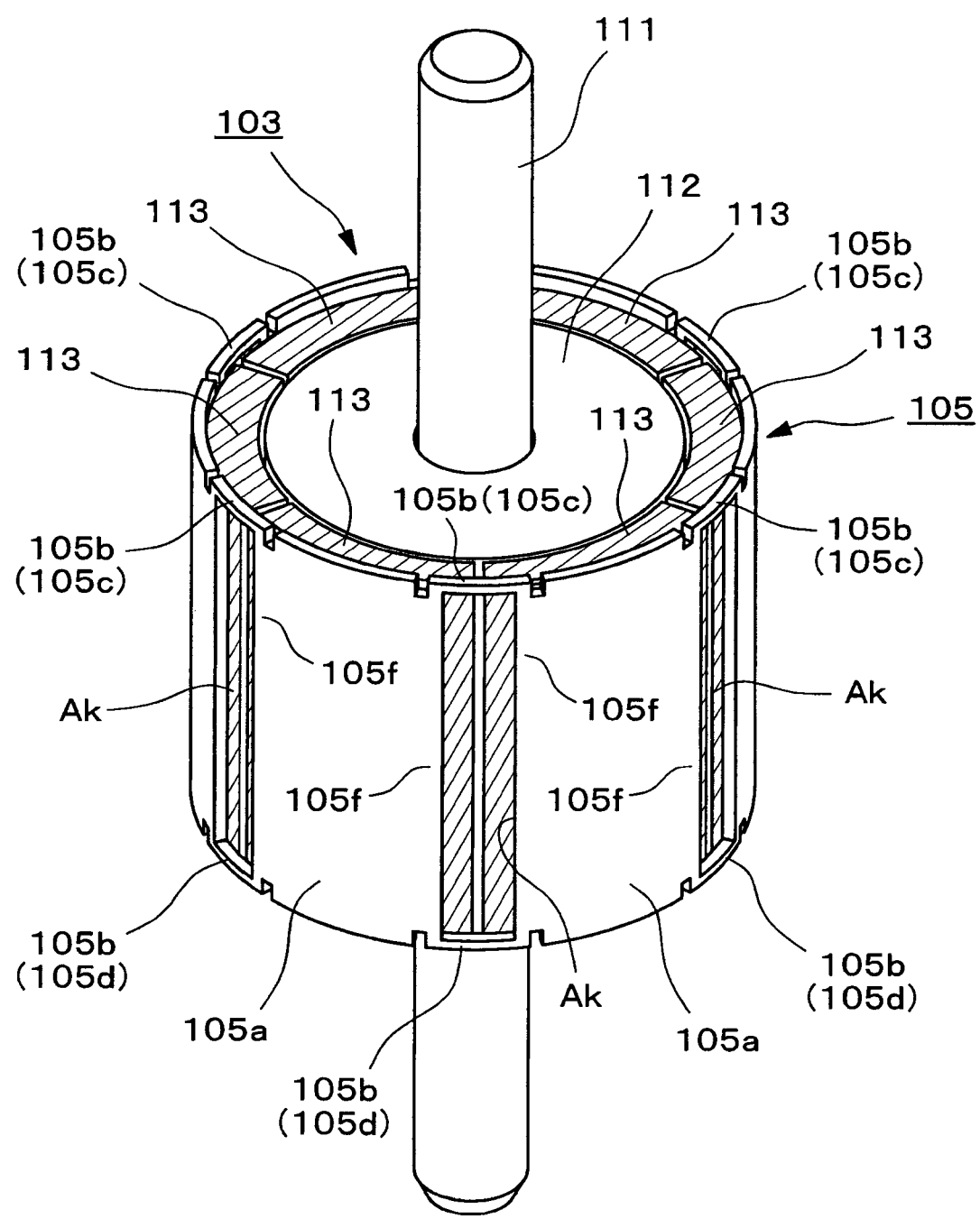
FIG. 38 is a perspective view of a rotor according to a modification of the thirteenth embodiment.
Figure 39:
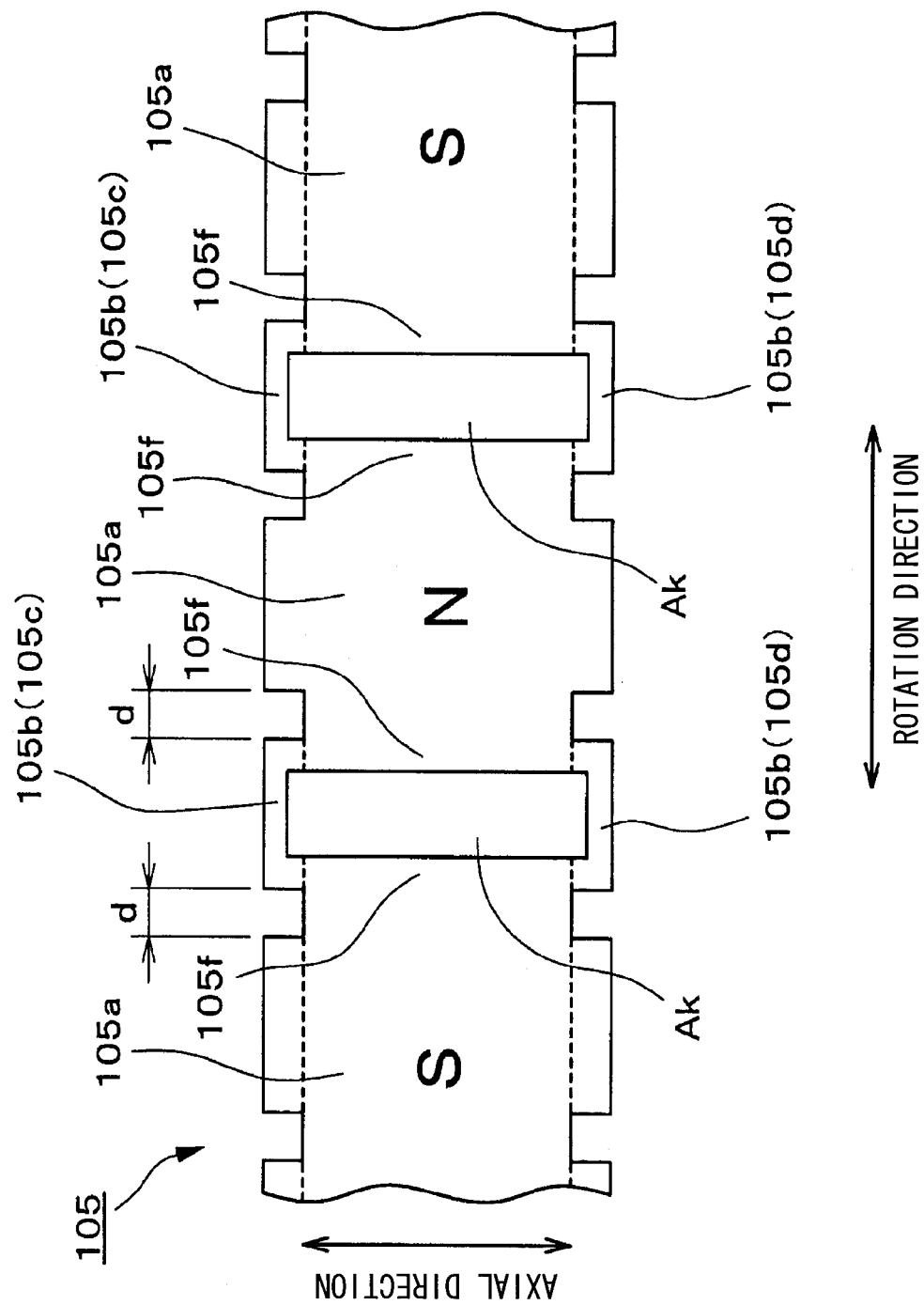
FIG. 39 is a developed view showing a magnetic-flux guide portion according to the modification shown in FIG. 38.

According to the thirteenth embodiment, the connecting portion 5b is configured as follows in order to reduce the magnetic flux leakage from the confronting portion 105a to the connecting portion 105b. Referring to FIGS. 36 to 39, a shape of the magnetic-flux guide ring 105 will be described. FIG. 36 is a perspective view of a rotor according to the thirteenth embodiment. FIG. 37 is a developed view showing a magnetic-flux guide portion according to the thirteenth embodiment. FIG. 38 is a perspective view of a rotor according to a modification of the thirteenth embodiment. FIG. 39 is a developed view showing a magnetic-flux guide portion according to the modification shown in FIG. 38.

The axial length of the confronting portion 105a is substantially equal to that of the magnet piece 113. The connecting portion 105b is comprised of a first connecting portion 105c and a second connecting portion 105d which are located axially outside of the magnet pieces 113. Specifically, the first and the second connecting portion 105c and 105d are U-shaped. Both edge portions of the confronting portion 105a are defined as adjacent regions 105f to which the connecting portions 105c and 105d are connected. That is, these adjacent regions 105f locate at both ends of the confronting portion 105a in the rotation direction of the motor 101.

The magnetic-flux guide ring 105 has an aperture "Ak" between adjacent confronting portions 105a. The adjacent confronting portions 105a and the first and second connecting portions 105a (105c, 105d) define the aperture "Ak". The adjacent regions 105f of each confronting portion 105a confront the both end portions of the magnet piece 113 in the axial direction. The axial both ends of the aperture "Ak" located outside of the magnet piece 113. The connecting portion 105b is located axially outside of the magnet piece 4a, whereby the length of the connecting portion 105b becomes longer. As a result, the magnetic resistance of the connecting portion 105b becomes greater. It can be restricted that the magnetic flux flows into the connecting portion 105a from the confronting portion 105a. The magnetic flux leakage can be restricted.

The above described magnetic-flux guide ring 105 is formed by punching a ring-shaped material having wide portions at regular intervals. The aperture "Ak" is formed in the wide portions by punching. The connecting portions 105b have widths sufficient to keep the magnetic-flux guide ring 105 in a ring-shape.

Alternatively, as shown in FIGS. 38 and 39, the magnetic-flux guide ring 105 is formed by punching a wide ring material. After the aperture "Ak" is formed by punching, the both sides of the connecting portion 105b are removed. The remaining portion has the same axial length as the magnet pieces 113. As shown in FIG. 39, the remove portion has a width "d" in the rotation direction, and the width "d" is preferably more than double of an air gap, which is a clearance gap between the stator and the rotor.

Fourteenth Embodiment

Figure 40:
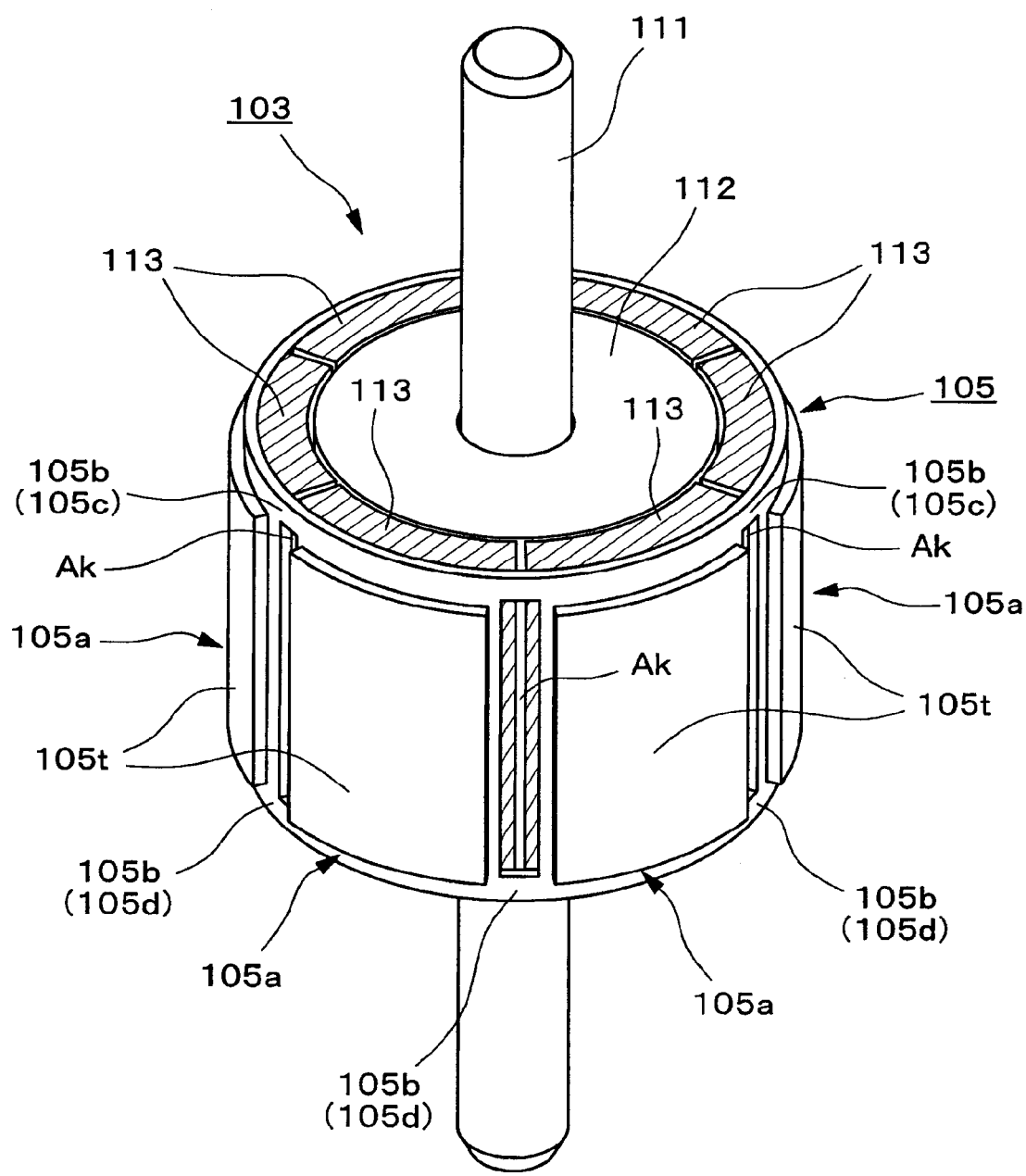
FIG. 40 is a perspective view of a rotor according to a fourteenth embodiment.

As shown in FIG. 40, the confronting portion 105a has a protruding portion 105t on its outer surface confronting the stator core 104. This protruding portion 105t protrudes radially outward and has a rectangular shape. The magnet piece 113 is located radially inside of the protruding portion 105t. FIG. 40 is a perspective view of a rotor according to the ninth embodiment.

Since the protruding portion 105t is close to the stator core 104, the magnetic flux is effectively introduced into the stator core 104 from each of the magnet pieces 113. It is preferable that the axial length of the protruding portion 105t is substantially equal to the axial length of the stator core 104.

Fifteenth Embodiment

Figure 41:
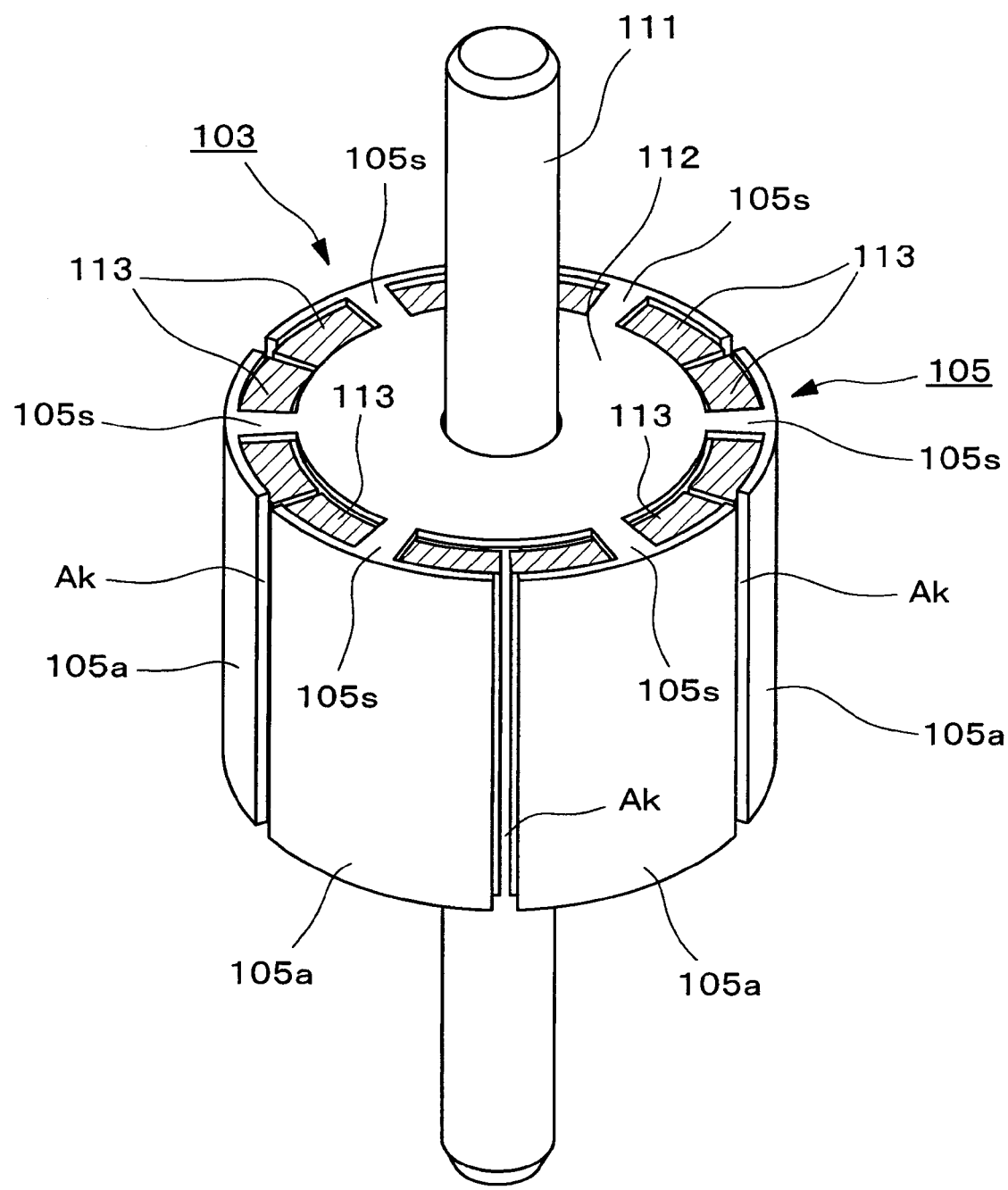
FIG. 41 is a perspective view of a rotor according to a fifteenth embodiment.

According to a fifteenth embodiment, as shown in FIG. 41, connecting portions 105s extend from the axial ends of the confronting portion 105a to the cylindrical portion 112 of the shaft 111. The connecting portions 105a are connected to end surfaces of the cylindrical portion 112. In other words, as shown in FIG. 41, the connecting portions 105a connects the end surfaces of the cylindrical portion 112 and each of the confronting portions 105a. Also, each of the confronting portions 105a is connected to each other through the cylindrical portion 112.

More specifically, the connecting portion 105s is formed at the axial end of the confronting portion 105a and the connecting portion 105s is located at a center portion of the end periphery of the confronting portion 105a. The connecting portion 105s protrudes at right angle from the confronting portion 10a, and its tip end is connected to the end surface of the cylindrical portion 112. Thereby, each of the confronting portions 105a is connected to each other through the cylindrical portion 112. Further, the magnet piece 113 is disposed between adjacent connecting portions 105s. The connecting portions 105s function as a holder which holds the magnet pieces 113.

In the above eighth to fifteenth embodiments, there are provided a plurality of magnet pieces 113. These magnet pieces 113 may be configured in a ring shape. The magnetic ring has a magnetic region of N-pole and a magnetic region of S-pole, which are formed alternately in the circumferential direction. The magnetic-flux guide ring 105 is arranged in such a manner that the aperture "Ak" in the magnetic-flux guide ring 105 overlaps the boundary of the magnetic regions.

Figure 42:
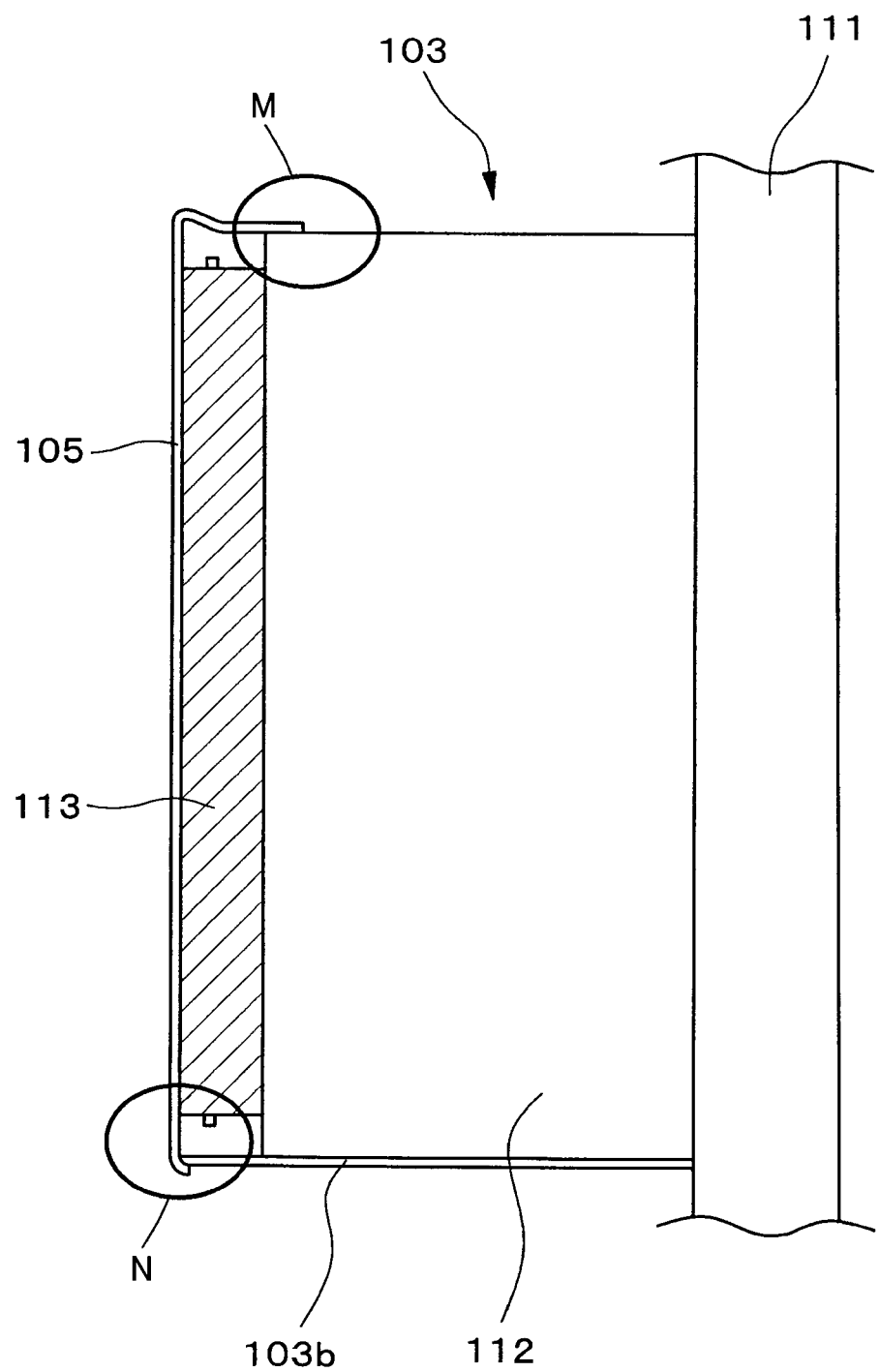
FIGS. 42 and 43 show a first method for fixing the magnetic-flux guide ring.
Figure 43:
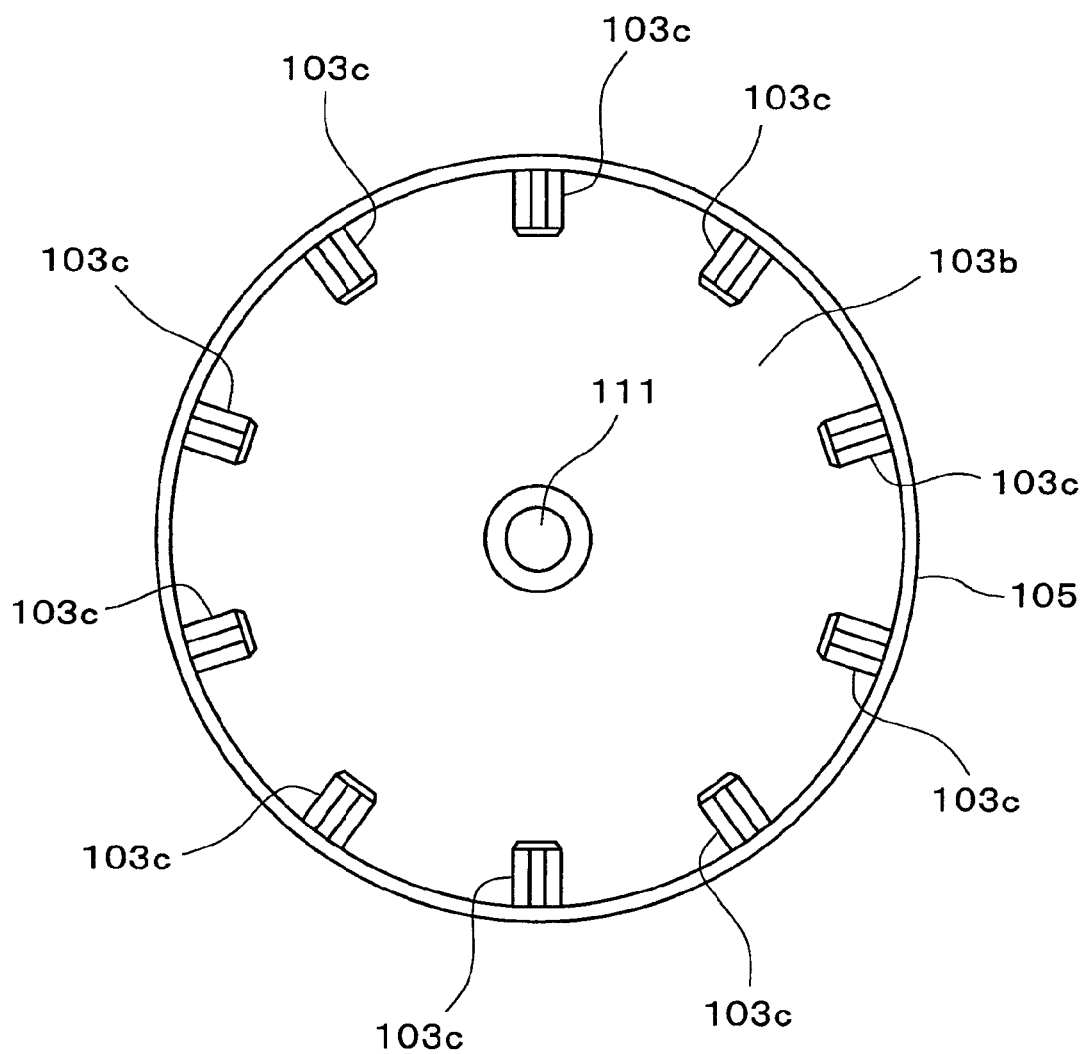
Figure 44:
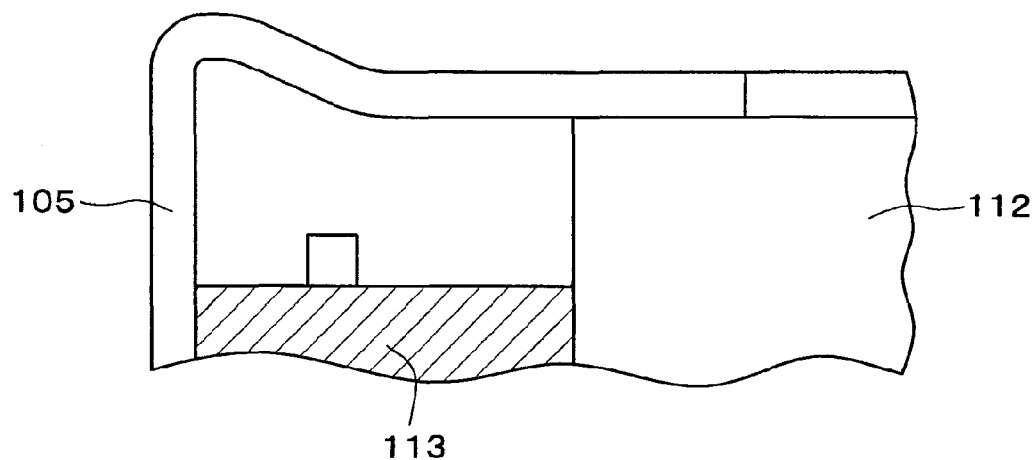
FIG. 44 is an enlarged view of an area "M" in FIG. 42.
Figure 45:
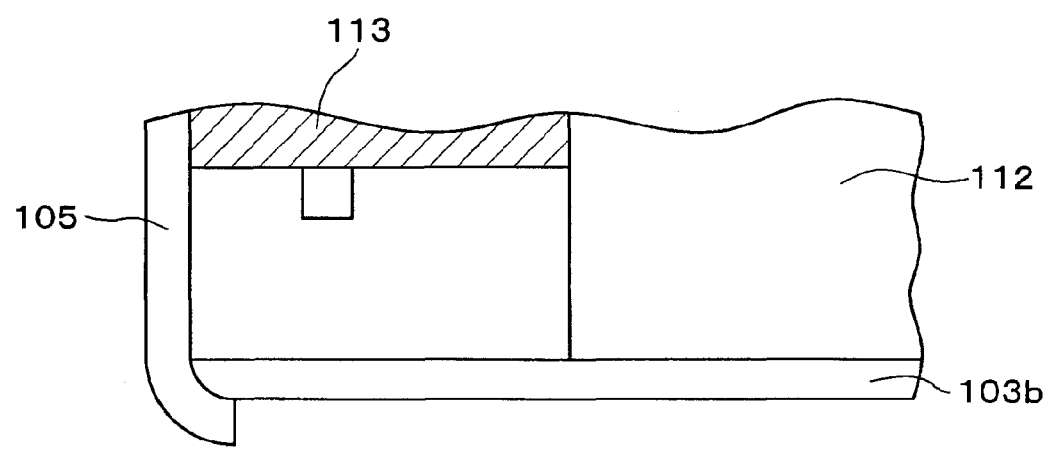
FIG. 45 is an enlarged view of an area "N" in FIG. 42.
Figure 46:
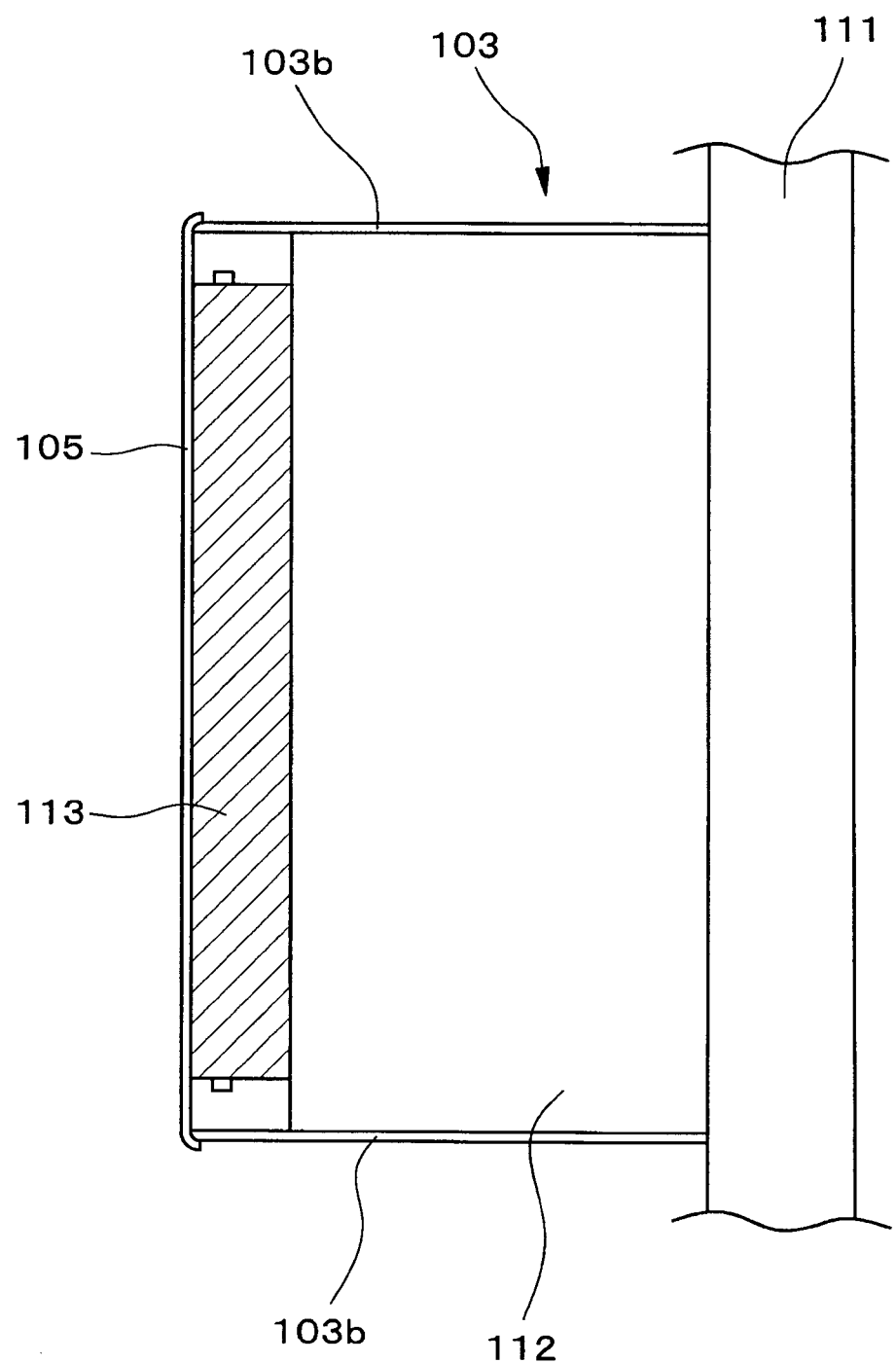
FIG. 46 shows a second method for fixing the magnetic-flux guide ring 105.
Figure 47:
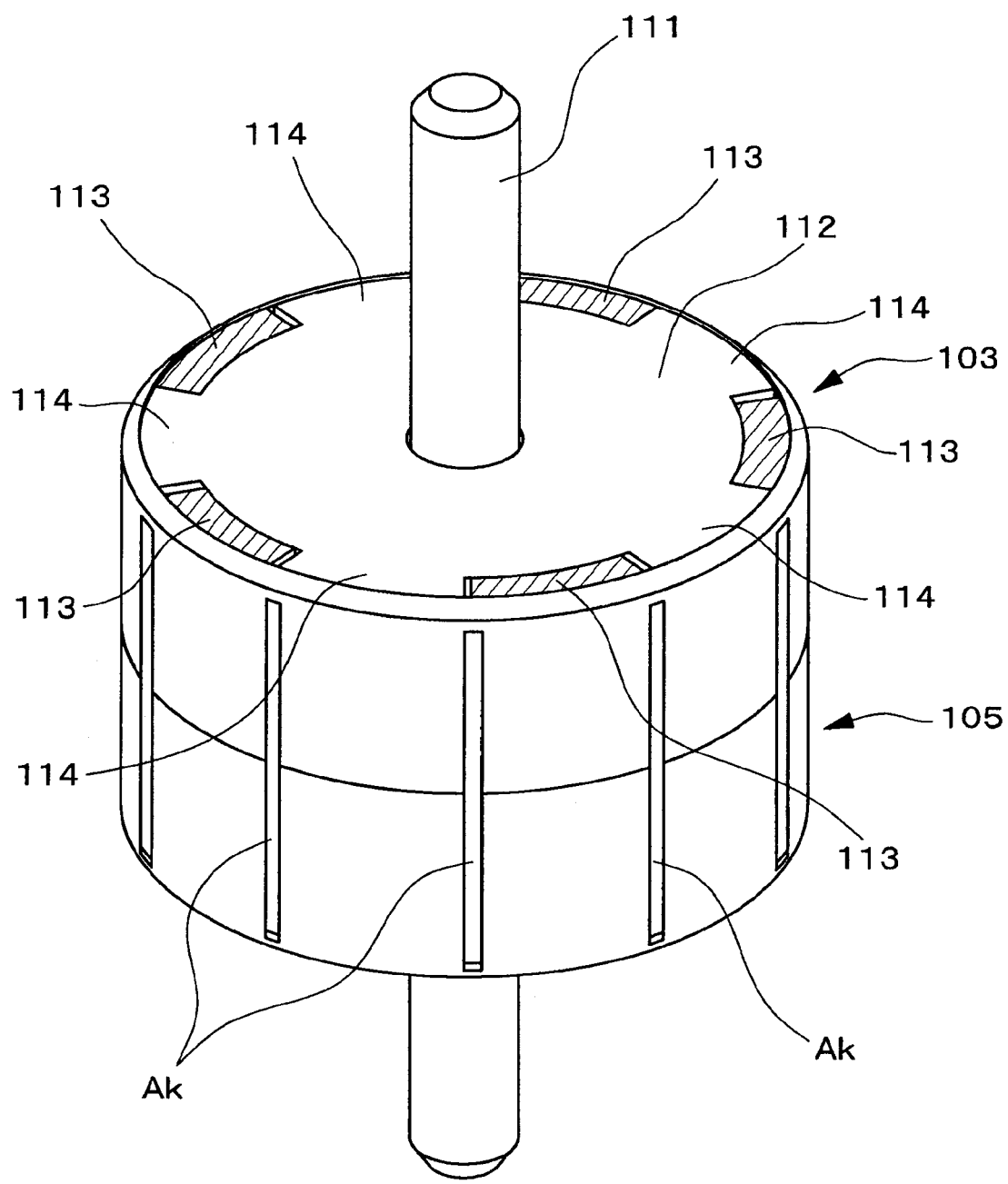
FIGS. 47, 48 and 49 show a third method for fixing the magnetic-flux guide ring 105.
Figure 48:
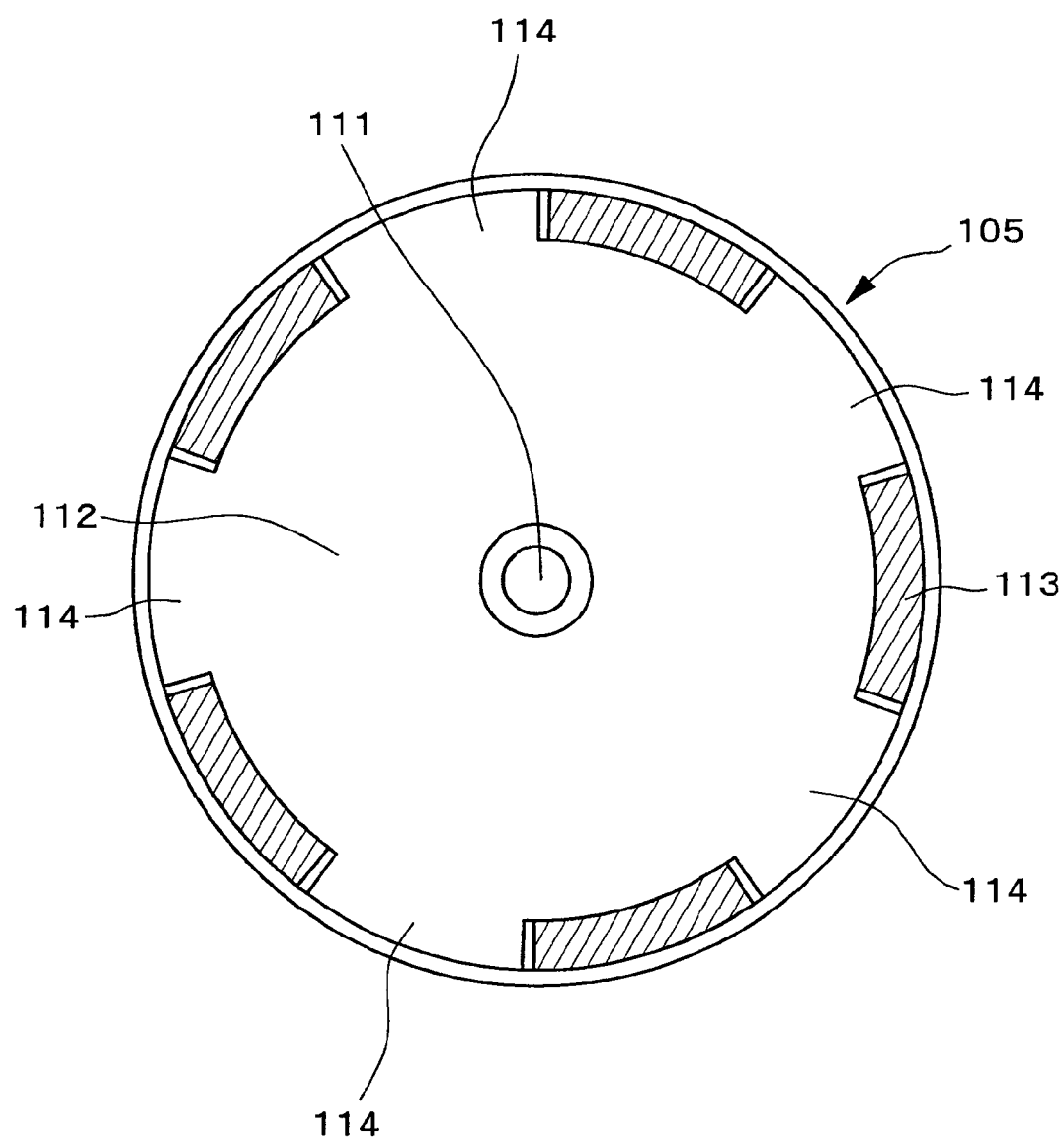
Figure 49:
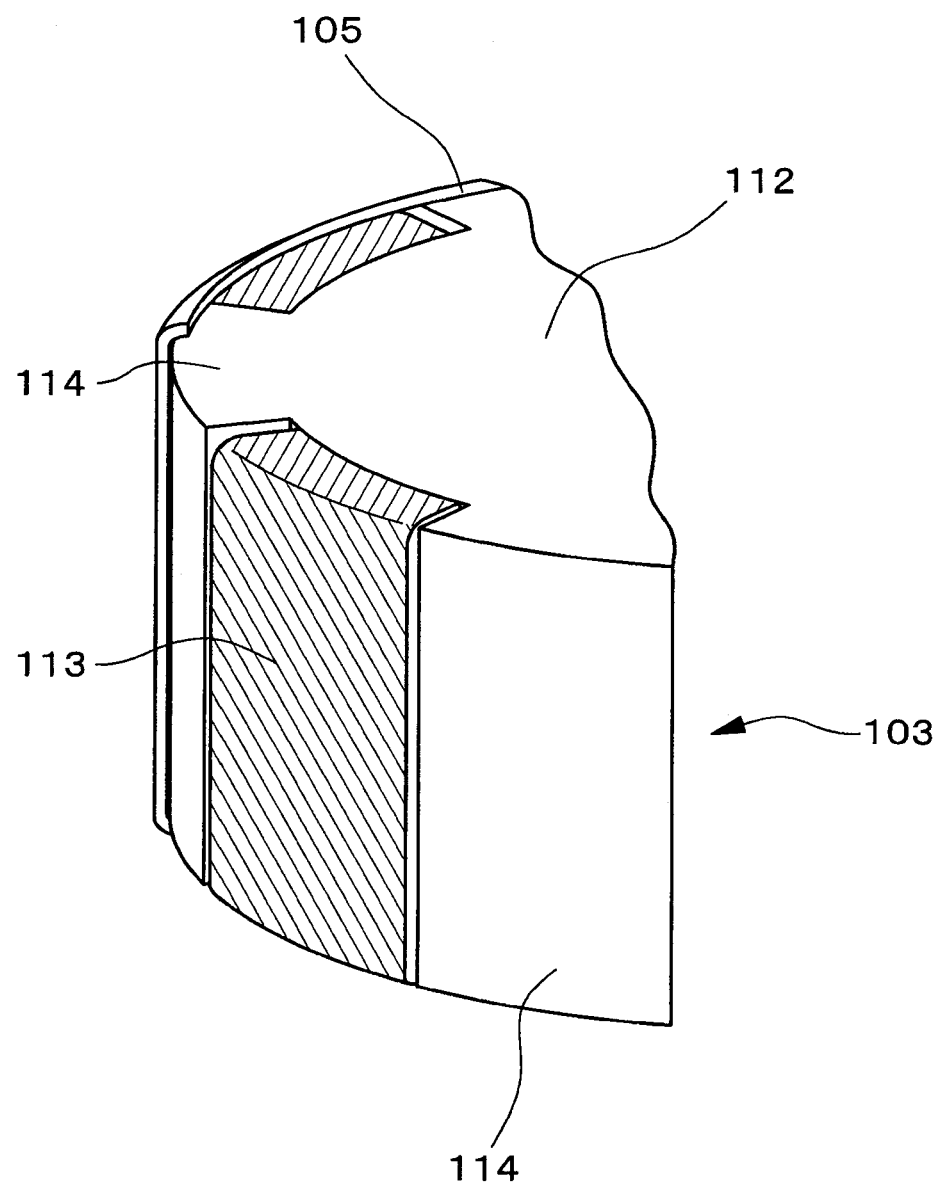
Figure 50:
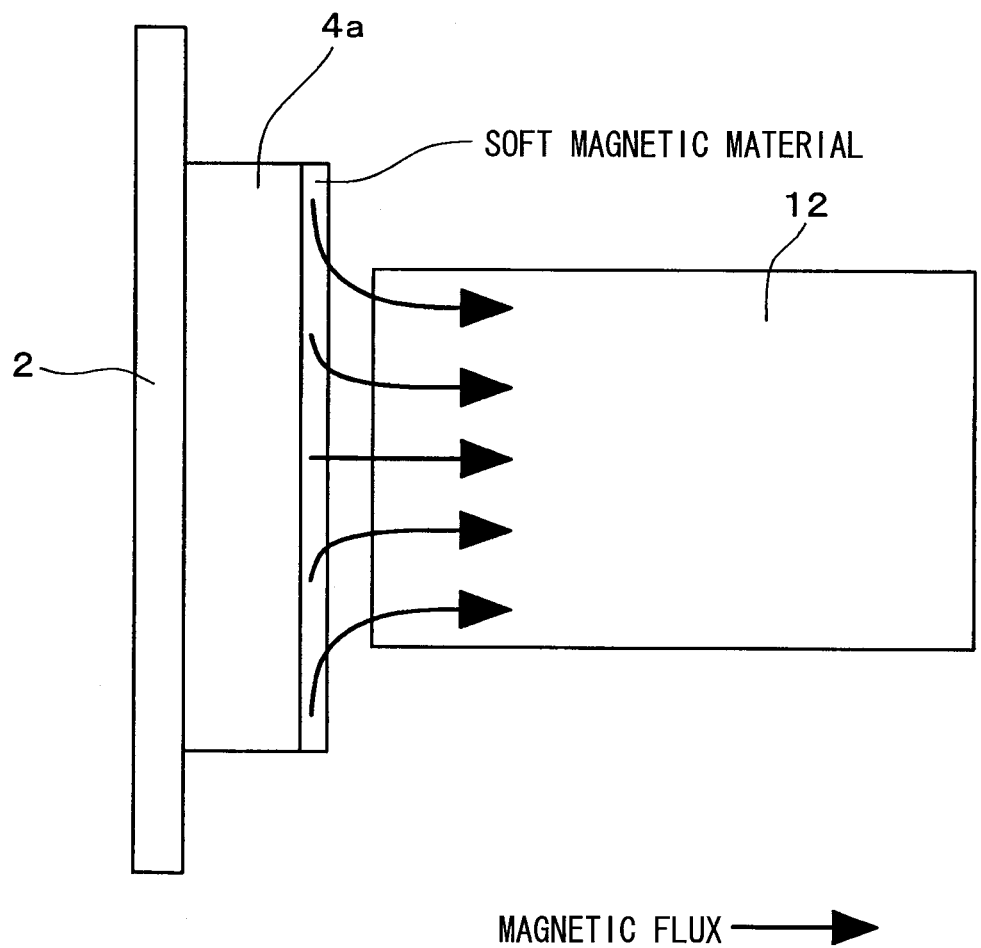
FIG. 50 is a chart showing a magnetic flux flowing through the soft magnetic material according to a conventional art.
Figure 51:
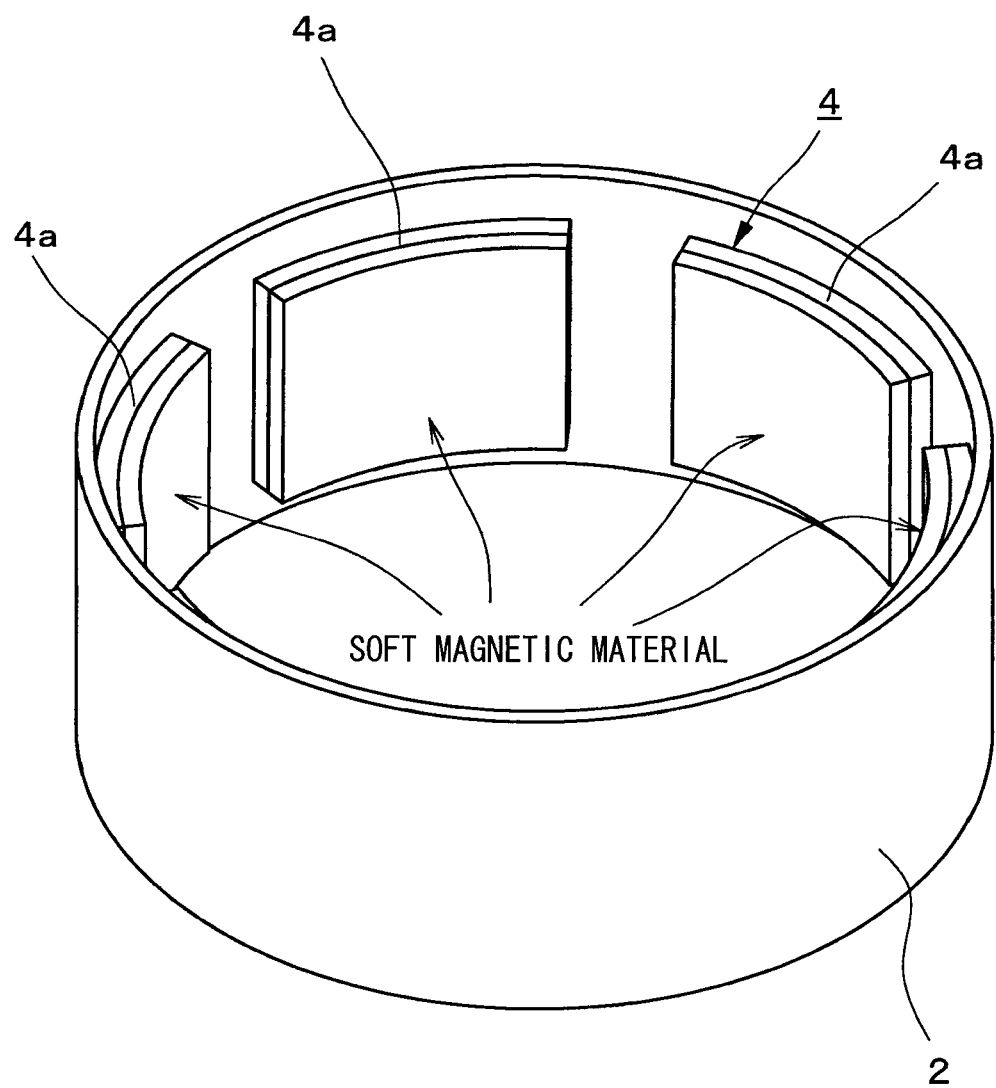
FIG. 51 is a perspective view of a magnet yoke according to a conventional art.

In the eighth to fourteenth embodiments, the magnetic-flux guide ring 105 is fixed to the cylindrical portion 112 of the rotor 103 by caulking the end portions of the magnetic-flux guide ring 105. Referring to FIGS. 42 to 49, methods for fixing the magnetic-flux guide ring 105 will be described hereinafter. FIGS. 42 to 45 show a first method for fixing the magnetic-flux guide ring 105. FIG. 42 is a cross sectional view of the rotor taken along an axis of the motor. FIG. 43 is a plan view showing an end of the cylindrical portion in an axial direction of the motor. FIG. 44 is an enlarged view of an area "M" in FIG. 42. FIG. 45 is an enlarged view of an area "N" in FIG. 42. FIG. 46 shows a second method for fixing the magnetic-flux guide ring 105. FIGS. 47 to 49 show a third method for fixing the magnetic-flux guide ring 105. FIG. 47 is a perspective view showing a rotor to which the magnetic-flux guide ring 105 is fixed. FIG. 48 is a cross sectional view of the rotor taken along an axis of the motor. FIG. 49 is a plan view showing an end of the cylindrical portion in an axial direction of the motor.

According to the first method, as shown in FIG. 42, a first end of the magnetic-flux guide ring 105 is caulked on the cylindrical portion 112, which corresponds to the area "M", and a second end of the magnetic-flux guide ring 105 is brought into contact with the cylindrical portion 112, which corresponds to the area "N". Thus, the magnetic-flux guide ring 105 is fixed to the rotor 103.

More specifically, the rotor 103 has a fixing ring-sheet 103b at one end of the cylindrical portion 112. This fixing ring-sheet 103b has a diameter larger than that of the cylindrical portion 112. The second end of the magnetic-flux guide ring 105 is caulked on the fixing ring-sheet 103b, as shown in FIG. 45.

The first end of the magnetic-flux guide ring 105 is caulked on the cylindrical portion 112, as shown in FIG. 44.

Thus, the magnetic-flux guide ring 105 is fixed to the cylindrical portion of the rotor 103. Besides, in a case that the fixing ring-sheet 103b is made from magnetic material, it is preferable that rectangular wave shape cuts 103c are formed at regular intervals along the peripheral of the fixing ring-sheet 103b in order to restrict a magnetic flux short circuit, as shown in FIG. 43. Meanwhile, in a case that the fixing ring-sheet 103b is made from non-magnetic material, the above rectangular wave shape cuts 103c are unnecessary.

Next, a second method for fixing the magnetic-flux guide ring 105 will be described hereinafter. As shown in FIG. 46, both ends of the magnetic-flux guide ring 105 are caulked on the cylindrical portion 112. Specifically, the cylindrical portion 112 has the fixing ring-sheets 103b at its both ends. Both end of the magnetic-flux guide ring 105 is caulked on the fixing ring-sheets 103b, respectively.

Next, a third method for fixing the magnetic-flux guide ring 105 will be described hereinafter. The motor 101 is a consequent-pole type motor. That is, as shown in FIGS. 47 and 48, the magnet pieces 113 has only one of N-pole and S-pole. The other pole is formed by salient pole cores located between the magnet pieces 113, as a quasi pole 114.

That is, the cylindrical portion 112 has quasi poles 114 at regular intervals. The cylindrical portion 112 has concave portions in which the magnet pieces 113 are respectively provided. In the present embodiment, the magnetic-flux guide ring 105 is engaged with the quasi poles 114 so that the magnetic-flux guide ring 105 is fixed to the rotor 103.

More specifically, when the magnetic-flux guide ring 105 is arranged radially outside of the rotor 103, the axial both ends of the magnetic-flux guide ring 105 protrude from the end surfaced of the cylindrical portion 112. This protruding portion is caulked on the end surfaced of the cylindrical portion 112, so that the magnetic-flux guide ring 105 is engaged with the portions of the quasi poles 114.

Other Embodiments

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

That is, the confronting portion 5a, 105a and the connecting portion 5b, 105b, 105s may be independently formed beforehand. Then, these parts are connected together to form the magnetic-flux guide ring.

In the above embodiments, the motor is used for an automobile. The motor of the present disclosure can be used for marine vessels, airplanes, buildings, houses and the like.

What is claimed is:

1. A motor comprising:
an armature core;
a permanent magnet confronting the armature core; and
a magnetism guiding portion disposed between the permanent magnet and the armature core for introducing a magnetic flux from the permanent magnet to the armature core, wherein:
the permanent magnet has a plurality of magnetic fields which are aligned in such a manner that a magnetic pole alternately changes along a rotation direction of the motor;
the magnetism guiding portion includes a confronting portion which confront each of the magnetic fields and a connecting portion which connects adjacent two confronting portions in the rotation direction of the motor;
a connecting portion includes:
a first connecting portion connecting axial first end portions of adjacent two confronting portions respectively, and
a second connecting portion connecting axial second end portions of said adjacent two confronting portions respectively;
the magnetism guiding portion has an intermediate portion between the first connecting portion and the second connecting portion;
the confronting portion, the first connecting portion, the second connecting portion and the intermediate portion are made from a soft magnetic material; and
only the intermediate portion is non-magnetized by thermal treatment.

2. A motor according to claim 1, wherein:
the magnetism guiding portion is disposed in such a manner that the intermediate portion overlaps with a boundary between said adjacent magnetic fields.

3. A motor according to claim 1, wherein:
an axial length of the permanent magnet in an axial direction of the motor is longer than an axial length of the armature core in the axis direction of the motor; and
an axial length of the magnetism guiding portion is substantially equal to a length of the permanent magnet in the axial direction.

4. A motor according to claim 1, wherein:
the first connecting portion and the second connecting portion are located outside of both ends of the permanent magnet in an axis direction thereof.

5. A motor according to claim 4, wherein:
the magnetism guiding portion has an aperture defined by the first connecting portion, the second connecting portion and said adjacent two confronting portions;
each of the confronting portions has adjacent regions to which the first and the second connecting portion are connected in the rotation direction of the motor;
an end line of each of the adjacent regions in the axial direction is located on an end line of the permanent magnet in the axial direction; and
an end line of the aperture in the axial direction is located outside of the end line of the permanent magnet in the axial direction.

6. A motor according to claim 1, wherein:
the magnetism guiding portion is formed of a single ring member.

7. A motor according to claim 1, wherein:
each axial length of the first connecting portion and the second connecting portion is less than half of a difference between an axial length of the permanent magnet and an axial length of the armature core.

8. A motor comprising:
an armature core;
a permanent magnet confronting the armature core; and
a magnetism guiding portion disposed between the permanent magnet and the armature core for introducing a magnetic flux from the permanent magnet to the armature core, wherein:
the permanent magnet has a plurality of magnetic fields which are aligned in such a manner that a magnetic pole alternately changes along a rotation direction of the motor;
the magnetism guiding portion includes a confronting portion which confront each of the magnetic fields and a connecting portion which connects adjacent two confronting portions in the rotation direction of the motor;
a connecting portion includes:
a first connecting portion connecting axial first end portions of adjacent two confronting portions respectively, and
a second connecting portion connecting axial second end portions of said adjacent two confronting portions respectively;
the magnetism guiding portion has an aperture between the first connecting portion and the second connecting portion;
the magnetism guiding portion is disposed in such a manner that the aperture overlaps with a boundary between said adjacent magnetic fields;
the aperture has an end which extends to at least one of the adjacent two confronting portions in the rotation direction; and
a length of the aperture in an axial direction becomes longer from the end toward a center of the aperture in the rotation direction.

9. A motor according to claim 8, wherein:
the magnetism guiding portion has a second aperture formed adjacent to the aperture in the rotation direction; and a third rectangular aperture formed adjacent to the second rectangular apertures in the rotation direction, wherein:
a width of the second aperture in the rotation direction is narrower than that of the aperture and a width of the third aperture in the rotation direction is narrower than that of the second aperture.

10. A motor comprising:
an armature core;
a permanent magnet confronting the armature core; and
a magnetism guiding portion disposed between the permanent magnet and the armature core for introducing a magnetic flux from the permanent magnet to the armature core, wherein:
the permanent magnet has a plurality of magnetic fields which are aligned in such a manner that a magnetic pole alternately changes along a rotation direction of the motor;
the magnetism guiding portion includes a confronting portion which confront each of the magnetic fields and a connecting portion which connects adjacent two confronting portions in the rotation direction of the motor;

the magnetism guiding portion has a slit at the confronting portion;
the slit is a rectangle slit which extends in the rotation direction of the motor or an axial direction of the motor;
the magnetism guiding portion has a plurality of slits at the confronting portion; and
each of the slits extends in the axial direction of the motor and aligns in the rotation direction at regular intervals.

* * * * *